INVENTORS
R. C. MATLACK
F. W. METZGER
J. H. MILLER
E. VROOM

BY
J. W. Schmied
ATTORNEY

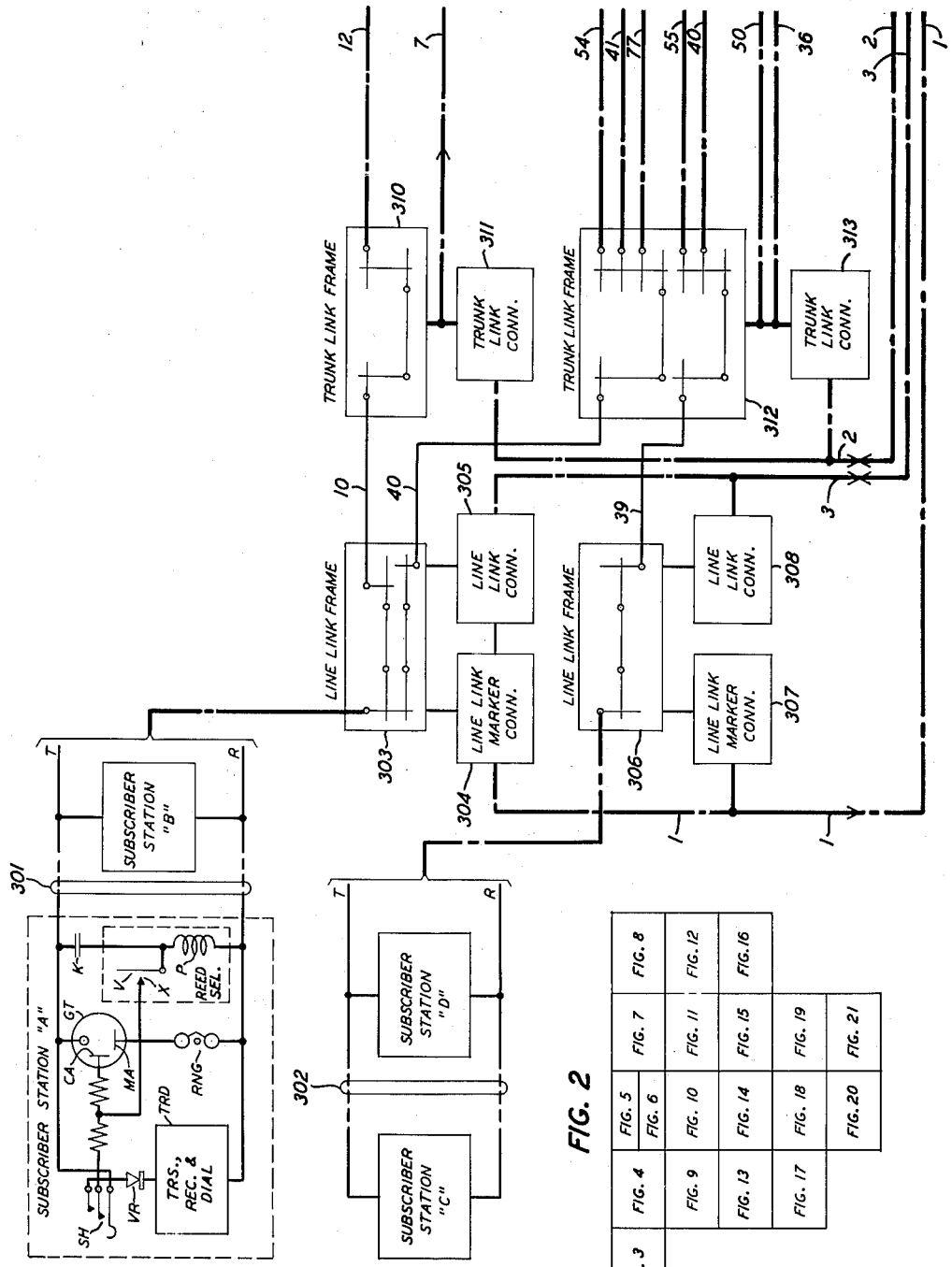

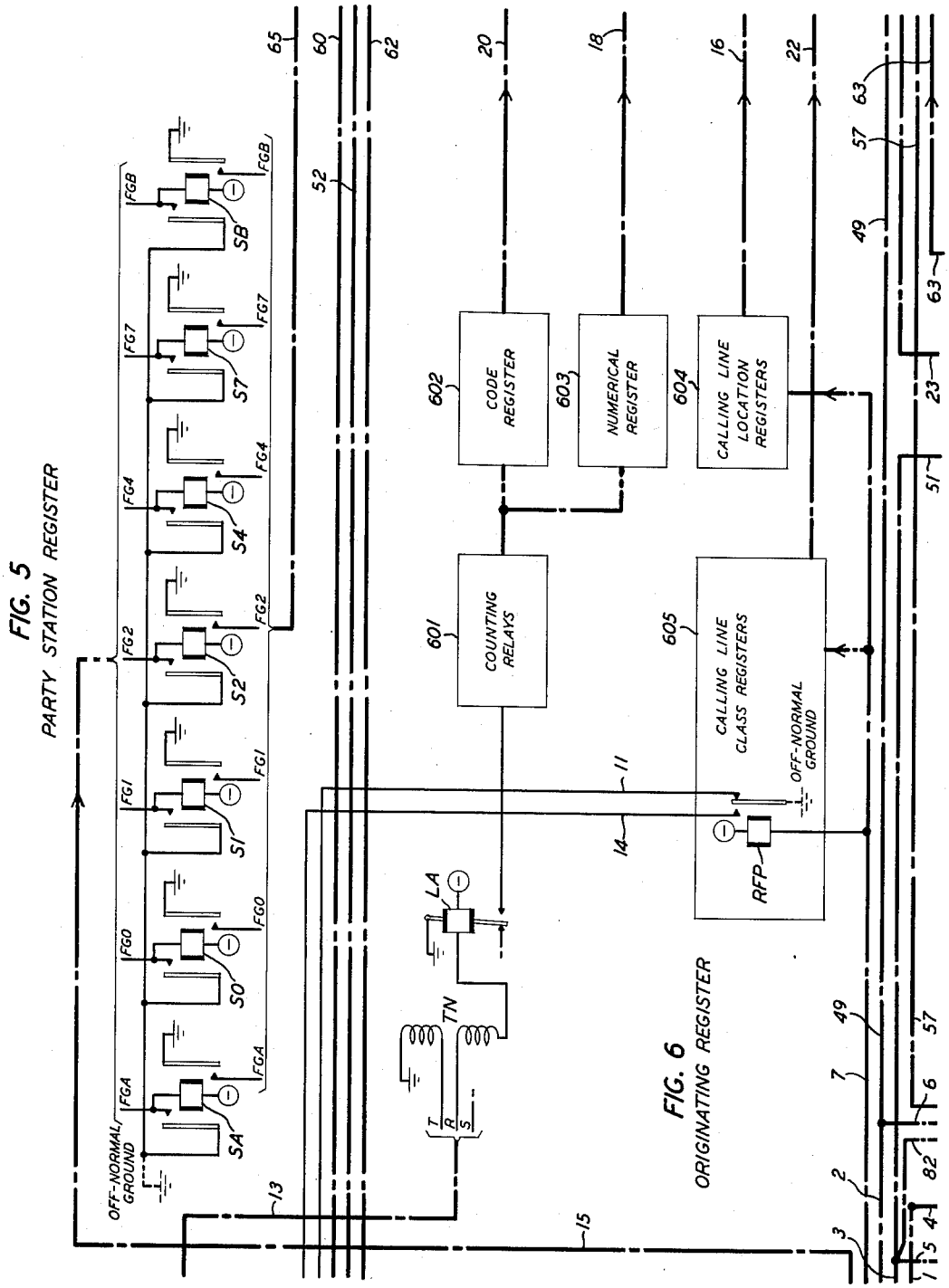

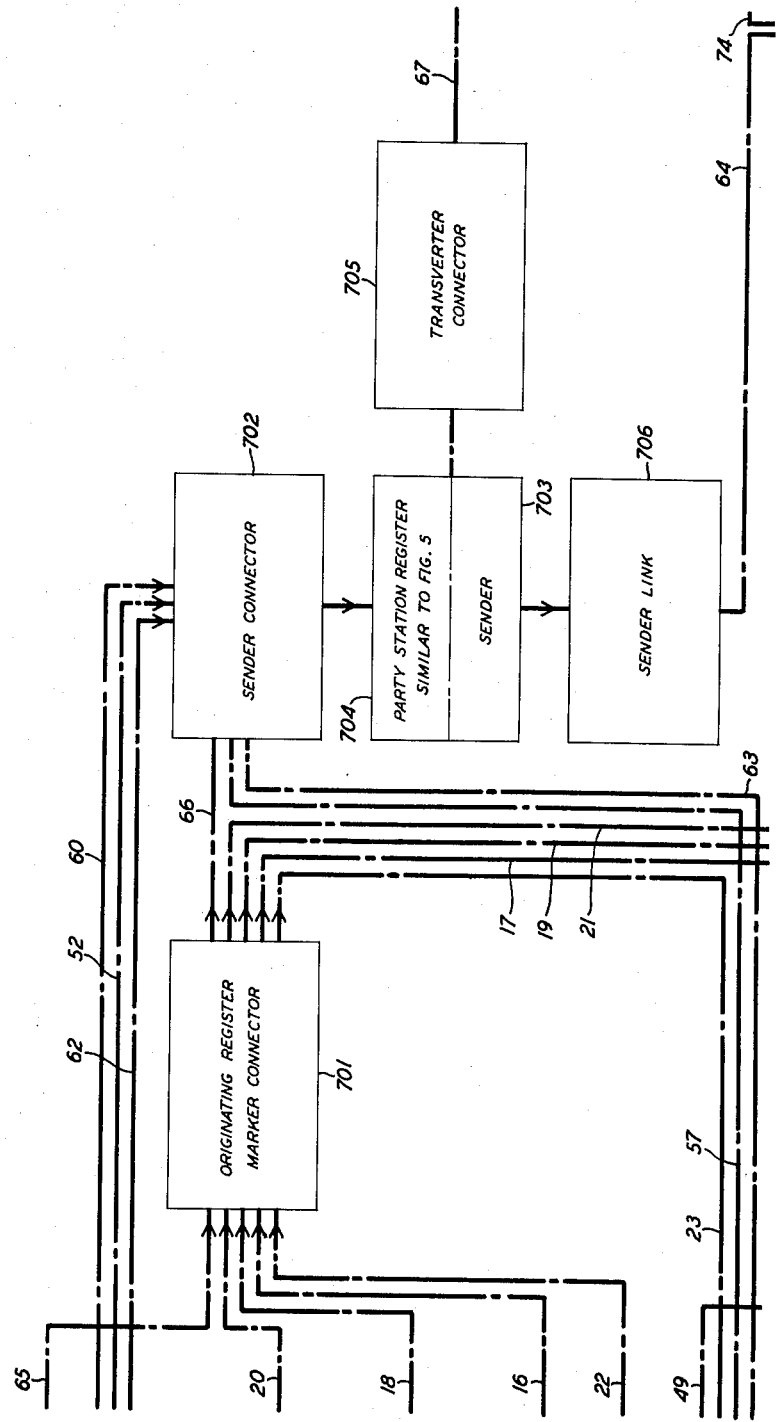

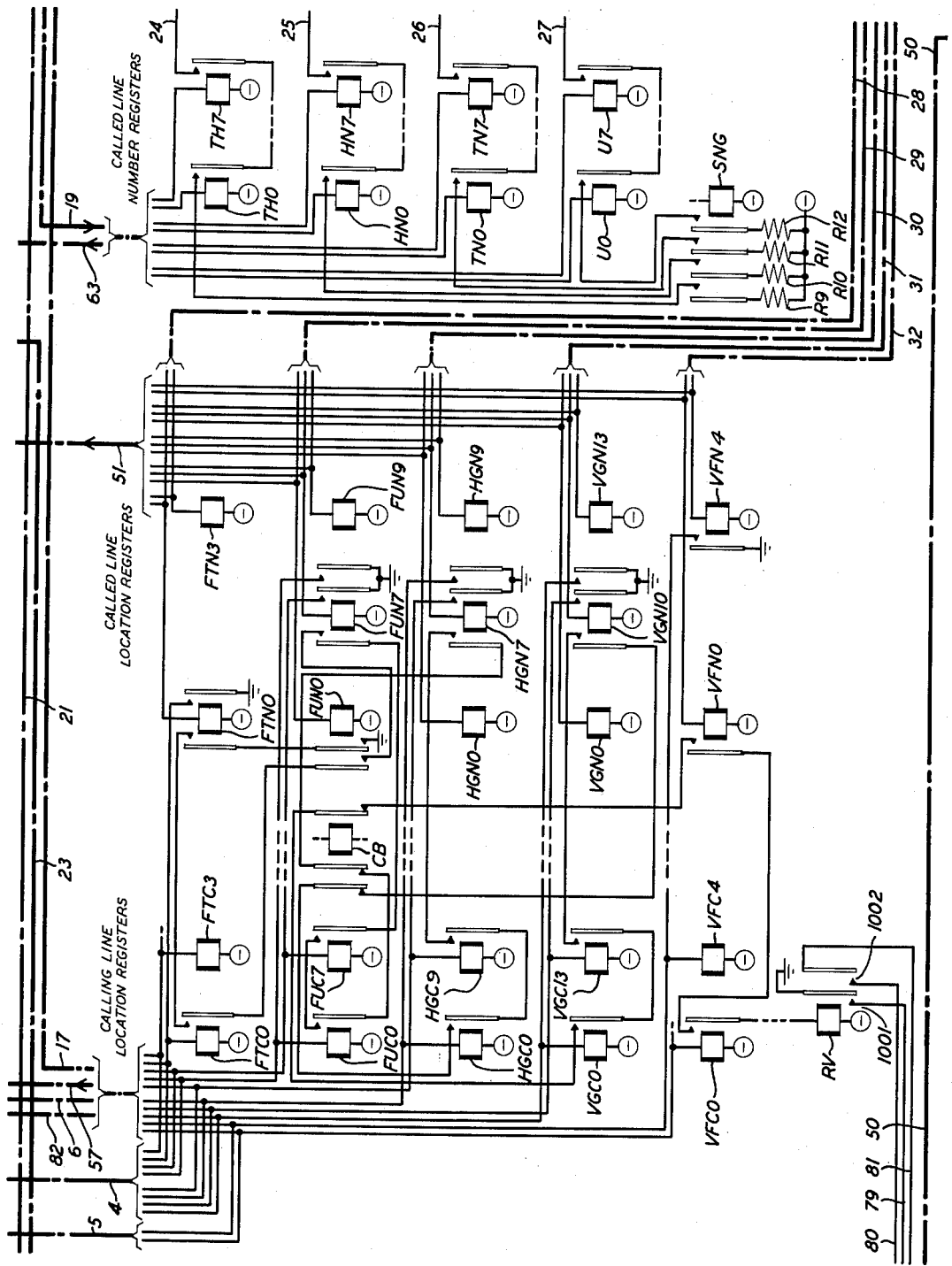

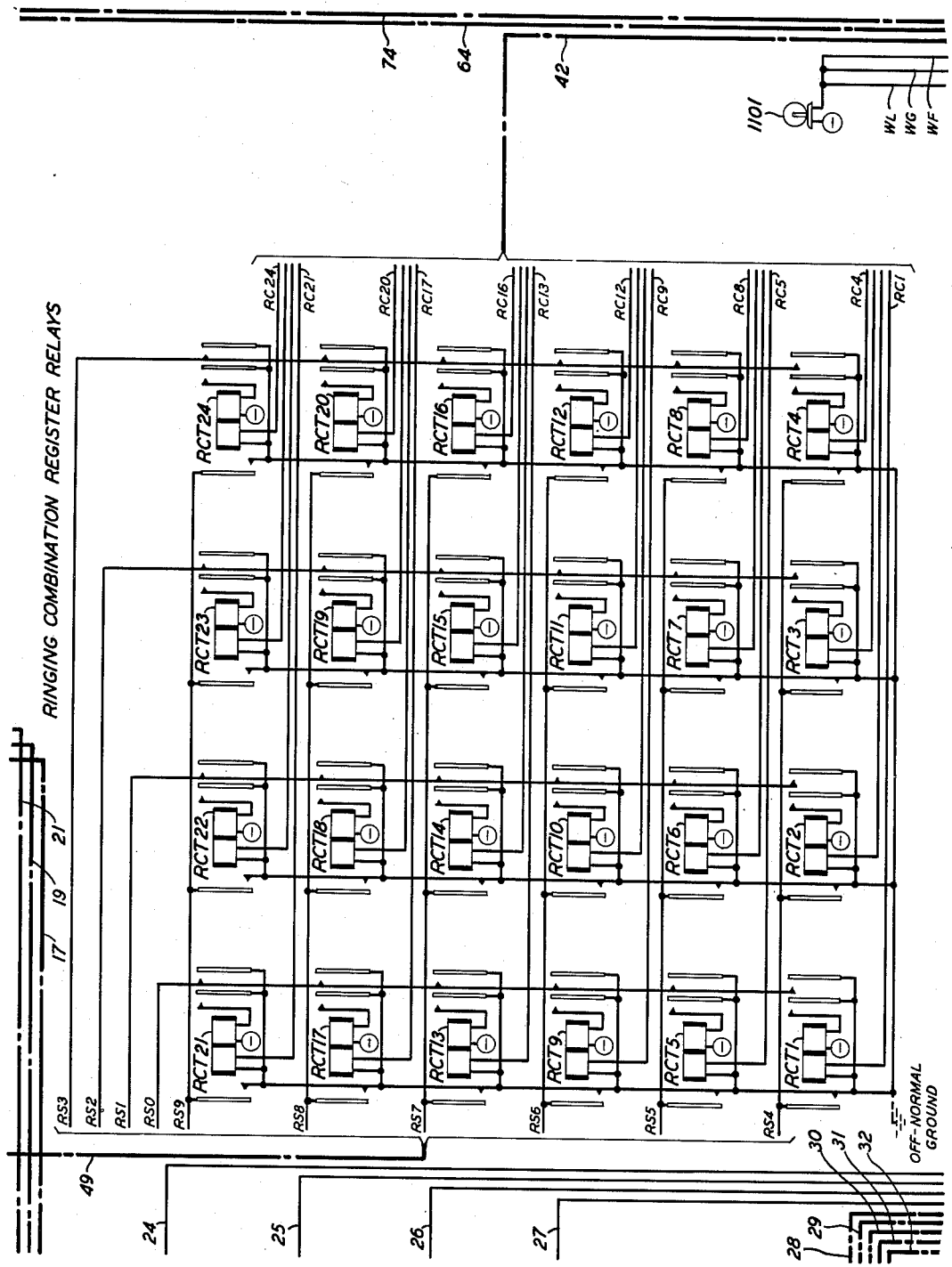

Jan. 31, 1956   R. C. MATLACK ET AL   2,733,297
MULTIPARTY SELECTIVE SIGNALING AND IDENTIFICATION SYSTEM
Filed Aug. 3, 1953   19 Sheets-Sheet 8

INVENTORS
R.C. MATLACK
F.W. METZGER
J.H. MILLER
E. VROOM

BY
J.W. Schmied
ATTORNEY

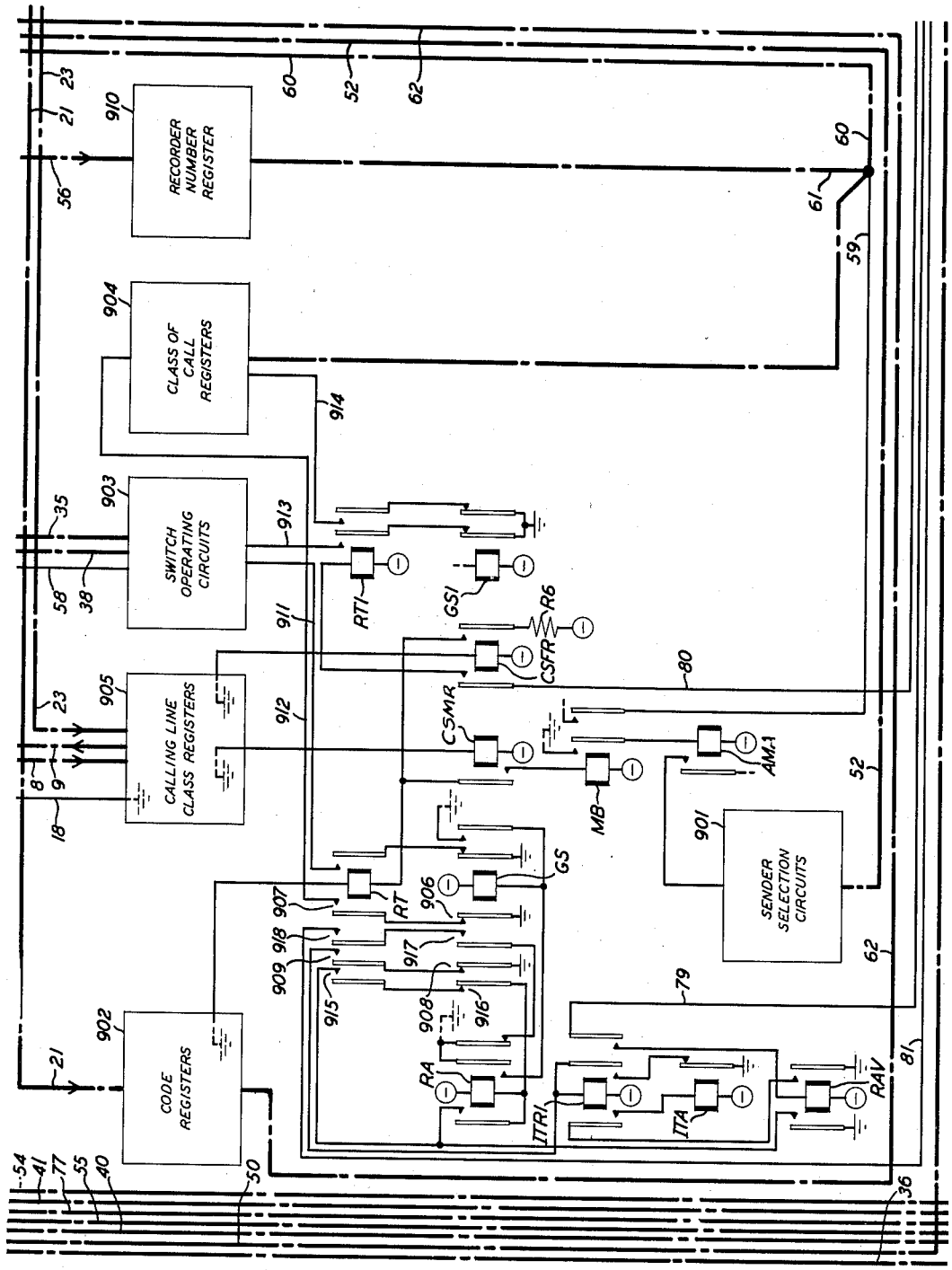

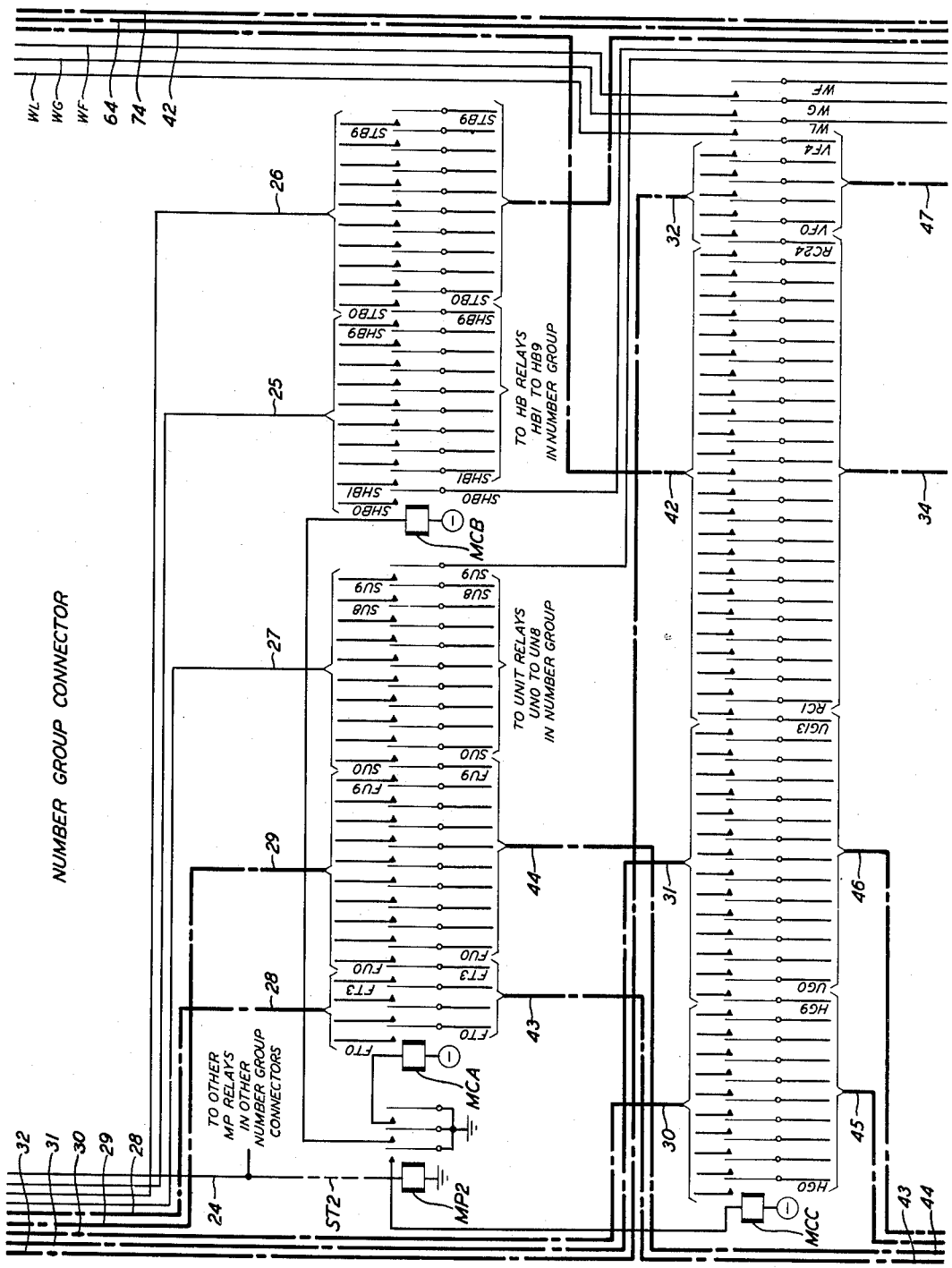

INVENTORS
R. C. MATLACK
F. W. METZGER
J. H. MILLER
E. VROOM

BY J. W. Schmied
ATTORNEY

2,733,297
Patented Jan. 31, 1956

United States Patent Office

2,733,297
MULTIPARTY SELECTIVE SIGNALING AND IDENTIFICATION SYSTEM

Richard C. Matlack, Summit, and Frederick W. Metzger, Rutherford, N. J., James H. Miller, Denver, Colo., and Edward Vroom, Tarrytown, N. Y., assignors to Bell Telephone Laboratories, Incorporated, New York, N. Y., a corporation of New York Application August 3, 1953, Serial No. 372,968

20 Claims. (Cl. 179—17)

This invention relates to improvements in switching systems and more particularly to improved means for station signaling and station identification in an automatic telephone switching system of the crossbar type.

With the expansion of automatic telephone systems to serve larger areas and to provide means for subscriber dialing of toll calls to adjacent areas through the advent of automatic message accounting, it has become imperative that accurate and reliable means be provided for automatically identifying all types of subscribers, on individual or party lines, who originate toll calls in order that charges may be properly billed. Furthermore the incorporation of automatic message accounting equipment in telephone systems will eliminate the necessity for the large number of message registers required for recording the number of calls each message-rate subscriber initiates, as this information can be recorded on the automatic message accounting tapes along with the billing information for the toll calls. Therefore in addition to the necessity for positive identification of all types of subscribers who originate toll calls, it is also desirable to be able to automatically identify message rate subscribers, both individual and multiparty, who originate local calls for which message rate charges are to be made.

Various means have been employed in the past for identifying any of the four parties on a common line. These means generally require a ground return path which frequently is a source of undesirable noise and other interference in the telephone talking circuit. With such systems of the prior art it has not generally been possible to identify more than four subscribers on a common line without the intervention of an operator. Furthermore, to call a party on the same line with the calling subscriber (a reverting call) it has been necessary for the calling subscriber to hang up while the called subscriber was being rung. In some cases this means that the calling subscriber has to wait a reasonable length of time until he believes the called party has answered and then lift his receiver. In other instances both parties are rung and the calling subscriber must wait until ringing has ceased indicating that the called party has answered. Also in the telephone systems of the prior art, it is not possible to positively and automatically identify a particular calling subscriber and a called subscriber on the same multiparty line who are originating and receiving a reverting call. For this reason subscribers on message rate party lines cannot be automatically charged for the reverting calls they originate and they have in the past been permitted to initiate these calls without incurring message rate charges.

One of the objects of the invention is to provide means for automatically and positively identifying any party station originating a call on a party line serving any desirable and, from a practical standpoint, unlimited number of subscribers.

Another object of the invention is to provide improved means for automatic signaling of any individual party on a multiparty line serving any desirable and, from a practical standpoint, unlimited number of subscribers.

Another object is the more effective utilization of apparatus by employing one and the same means at subscribers' stations for selectively ringing party line subscribers and identifying them when they make calls.

A further object of the invention is to provide positive identification of any subscriber originating a call whether over a separate line or a party line without resorting to marginal means or a plurality of differentiating tests as have heretofore been required.

Another object of the invention is to provide means which will permit one subscriber on a multiparty line to call another subscriber on the same line without having to hang up during the signaling period.

A further object of the invention is to provide means for automatic message rate charging of reverting calls originated by any individual message rate subscriber on a message rate multiparty line serving any desirable and, from a practical standpoint, unlimited number of subscribers.

The purpose of the invention is to secure these objects more effectively and reliably without impairing the quality of the talking circuit and with greater economy of apparatus than has heretofore been possible.

The general manner in which these objects are attained is by the use of a tuned vibrating reed selector device installed at the party line telephone subscribers' stations in combination with a plurality of similarly tuned reed selectors installed at the automatic telephone switching office.

Details of a preferred embodiment of the invention are disclosed by the accompanying drawings in which:

Fig. 2 shows how Figs. 3 through 21 should be placed in relation to one another to disclose in more detail the circuits of a telephone system of the crossbar type and associated automatic message accounting equipment in which the present invention has been incorporated.

Fig. 3 shows diagrammatically, subscribers' lines terminating on line link frames and the associated line link marker connectors, line link connectors, trunk link frames and trunk link connectors of a crossbar telephone system;

Fig. 5 shows in schematic form the party station register of the present invention which is added to the originating register circuit of a crossbar telephone system;

Fig. 6 shows in diagrammatic form a part of the originating register circuit of a crossbar telephone system and the modification of the calling line class registers therein to add a reed frequency party line registers;

Fig. 7 shows in diagrammatic form the originating register marker connector, the sender connector, the sender, the sender link and the transverter connector of a crossbar telephone system and shows that the sender has been modified to include a party station register similar to that shown in Fig. 5;

Fig. 9 shows in diagrammatic form a portion of the registers and relays in the marker circuit of a crossbar telephone system;

Fig. 10 shows in schematic form the calling line location registers, called line location registers and called line number registers in the marker circuit of a crossbar telephone system;

Fig. 11 shows in schematic form the ringing combination register relays in the market circuit of a crossbar telephone system;

Fig. 15 shows in schematic form the number group connector circuit of a crossbar telephone system as modified to include additional connecting paths for the additional ringing codes required by the present invention;

Figure 1:
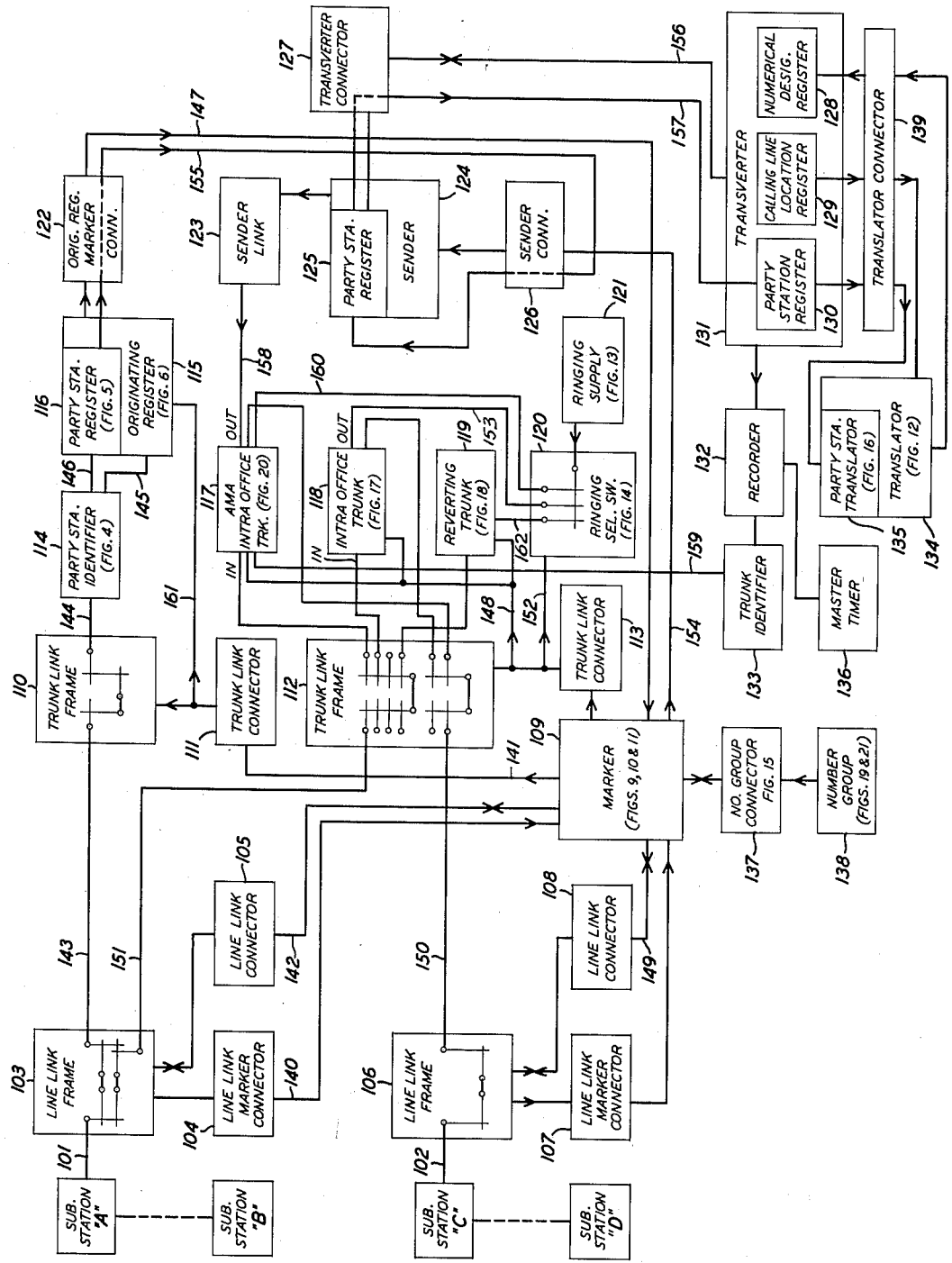
Fig. 1 shows a diagrammatic form a telephone system of the crossbar type with associated automatic message accounting equipment in which the present invention has been incorporated.

Referring now to Fig. 3 of the drawings, the subscriber's novel station circuit appearing in the upper left-hand portion of Fig. 3 in the box designated subscriber's Station "A" will be described. The subscriber's station here disclosed comprises a standard telephone set of the type now commonly employed in dial telephone systems which has been modified as shown by the addition of a vibrating reed relay type selector having a tuned vibratory element V enclosed within a coil P and connected across the tip and ring of a multiparty line 301 through capacitor K. The vibrating reed selected may be of the type disclosed by G. E. Perreault in Patent 2,502,339 issued March 28, 1950, or may be of any other suitable type of narrow-band high Q vibrator having a normally open vibratile contact as illustrated by vibratile contact X in Fig. 3. The ringer RNG of the subscriber's telephone set is connected across the tip and ring of line 301 through the main discharge gap of cold cathode gas tube GT. The control anode CA of gas tube GT is connected to the vibratile contact X of the vibrating reed relay type selector. The circuit also has a varistor VR connected in series across line 301 with the standard transmitter, receiver and dial as represented by box TRD and the switchhook contacts SH as shown in Fig. 3. Each of the subscribers' stations on a multiparty line such as 301 are identical except that each of the stations is equipped with a vibratory element which is tuned to a different frequency.

The vibratory element in the subscriber's set, for example, vibratory element V at Station "A," can be made to vibrate by impressing upon coil P an audio frequency signal which has a frequency corresponding to the natural period of the vibratory element. To signal a given party on the multiparty line of the present invention, a ringing signal, comprising a relatively high potential 20-cycle alternating current signal having superimposed thereon a lower potential selected audio frequency signal in series with a positively poled line battery, is impressed upon the ring conductor of the line and the tip conductor of the line is grounded. This ringing signal is applied to all the party stations on the common multiparty line, but only at the called station is the vibratory element V energized, because this is the only station on the line having its vibratory element tuned to the selected audio signal frequency. The presence in coil P of the signal of selected audio frequency causes element V to vibrate and intermittently close vibratile contact X. As contact X closes, the positively poled 20-cycle ringing current on the ring conductor of the line is connected to the control anode CA of gas tube GT and will initiate a discharge through this tube. The current flow through the main gap of gas tube GT resulting from the breakdown or ionization of this tube will operate ringer RNG which is connected across the line in series with the main gap of the tube. The operation of ringer RNG will signal the called subscriber. Thus any individual subscriber on a common multiparty line can be selectively signaled from the central office. The ringers at the subscribers' stations other than the individual one being called will not be operated because the audio frequency signal required for energizing their vibratory elements will not be impressed upon the line.

When the called subscriber, at Station "A" in Fig. 3 for example, lifts his receiver to answer the call, switchhook contacts SH in his subset will bridge the transmitter receiver dial circuit TRD across the line in series with varistor VR. Switchhook contacts SH will also convert the reed relay type selector in the subset into a self-driven buzzer or oscillator which after being energized is sustained in oscillation by the positively poled battery on the ring conductor of the line from the central office. Because the vibratory element V was vibrating when the switchhook contacts SH closed, it is sustained in vibration by the energy received from the positively poled line battery on the ring conductor of the line through coil P, through the intermittently closed contact X through the lower contact of switchhook contacts SH to the tip conductor of the line and ground at the central office. While acting as a self-driven buzzer or oscillator, vibratory element V interrupts the central office battery on the ring conductor of the line at a rate determined by its natural frequency. Coil P and associated connector K act as a filter so that the signal applied back on the line is substantially a sine wave of the vibratory element frequency. The audio frequency signal generated by the reed type selector in the called subscriber's subset is sent back over the line to a detector circuit in the central office which detects the signal, trips the ringing current and supplies talking battery to the line. Varistor VR in the subset is poled so as to present a high impedance to the ringing current (which is positive pulsating) and a low impedance to the normal flow of talking current (which is from tip to ring). Therefore, the transmitter receiver dial circuit TRD which is bridged across the line when the called subscriber answers, will have no shunting affect upon the operation of the reed type selector, yet will have normal transmission qualities after the ringing has been tripped and talking battery is supplied to the subset.

If the subscriber at Station "A" in Fig. 3 desires to initiate a call, he will remove his handset in the usual manner which will signal the central office. The central office battery standing on the line is poled in such a direction that varistor VR in the subset will present a low impedance and consequently the line circuit in the central office will operate in the normal manner. As will be explained in more detail hereinafter, a tone source at the central office will be connected to the multiparty line 301 which serves the calling subscriber at Station "A". This tone source will send out on line 301 a plurality of audio frequency signals, the frequency of each corresponding to the tuned frequency of a different one of the tuned vibratory elements in the subscribers' stations connected to line 301. These audio frequency signals are sent out over line 301 for an interval of time long enough to insure that all of the vibratory elements in all of the subscribers' sets connected to line 301 have reached their maximum excursion. The audio frequency signals are applied to the line 301 at the central office through a transformer or repeating coil which also supplies battery to the line poled in such a direction that the varistor VR in series with the transmitter receiver dial circuit TRD of the calling subscriber's subset at Station "A" offers a high impedance. This insures that line 301 is not being bridged by the low impedance of the transmitter receiver dial circuit during the indentification interval. After the vibratory elements in all the subscribers' sets connected to line 301 have been excited by the audio frequency signals from the central office and have reached their maximum excursion, the tone source is disconnected from line 301 and the line is connected to an identification circuit. After this transfer has taken place the positively poled battery is still being applied to the ring conductor of line 301. The vibratory element in the calling subscriber's subset at Station "A", which has been converted to a self-sustained buzzer or oscillator circuit by closure of switchhook contacts SH incident to the removal of the handset, will continue to vibrate and interrupt the positively poled battery on the ring conductor of line 301 at a rate determined by its natural frequency. Coil P and associated condenser K act as a filter so that the signal applied on the line from this reed type selector when operating as a sustained buzzer or oscillator is substantially a sine wave of the vibratory element frequency. The audio frequency signal generated by the reed type selector in the calling subscriber's subset is sent back over the line and fed into an amplifier which has a load consisting of as many reed type selectors as there are parties on a line. Each of these reed type selectors is tuned to a different frequency which corresponds to one of the frequencies of the tuned vibratory elements in a different one of the subscriber's sets on the multiparty line. Therefore only one of the reed type selectors in the central office identification circuit will be energized in response to the signal received back over the line from the calling subscriber's subset, the particular one being dependent upon the frequency of the signal. In this manner the central office identification circuit will detect the particular frequency assigned to the calling subscriber and will then register his identity. As soon as a party is identified, the calling subscriber's line will be connected to an originating register circuit at which time battery of the correct polarity to make varistor VR in the calling subscriber's subset a low impedance, is fed over the line. This battery reversal will cause the vibratory element in the calling subscriber's subset to stop vibrating, and the calling subscriber then receives dial tone and may dial the desired number.

The invention is illustrated as applied to a crossbar telephone system of the type disclosed in Patent 2,585,904 which issued to A. J. Busch, February 19, 1952. The call data recording means or automatic message accounting means which functions in association with elements of the crossbar type telephone system and are controlled thereby are of the type disclosed in Patent 2,599,358 which issued to H. D. Cahill, W. W. Carpenter and T. L. Dimond, June 3, 1952 and in the copending application of W. W. Carpenter and R. E. Collis, Serial No. 759,402 filed on July 7, 1947 now Patent 2,688,658, granted September 7, 1954. The disclosures of the above-cited patents and application are incorporated herein by reference.

The telephone system and associated automatic message accounting equipment (referred to hereinafter as AMA equipment) disclosed in the above-cited patents and application are quite extensive and the inclusion in the present application of drawings and descriptions of the whole telephone system as well as the AMA equipment, would greatly expand and complicate the drawings and unduly lengthen the specification. Therefore, only such parts of the telephone system and of the AMA equipment as are essential to disclosure of the present invention are described in detail herein. It is believed that by reference to the above-mentioned patents and application for a more complete understanding of the construction and operation of such parts of the telephone system and AMA equipment as are not herein shown in detail, not only the operation of the present invention but the manner of its integration into a complete telephone system having AMA equipment will be clearly understood.

In the preferred embodiment of the invention disclosed by the drawings, provision is made for as many as 20 parties on a common line. However, it is to be understood that the invention is not limited solely to 20 party lines but that the principles and mode of operation of the invention may be applied to lines having more or less than 20 parties as may be desired. Because the embodiment of the drawing is adapted to 20 party lines, 20 separate signal tone sources are provided in the central office, as indicated by the box labeled "Tone Source (20 tones)" which is a part of the party station identifier shown in Fig. 4. These multifrequency tones may come from vacuum tube oscillators, motor driven tone wheels, or any other sufficiently accurate frequency generating means. A preferred form of tone generator employs vibrating reed selectors, without vibratory contacts, connected in a balanced bridge network as disclosed by Patent 2,514,320 issued February 13, 1951, to A. E. Bachelet.

The telephone system of the crossbar type in which the preferred embodiment of the present invention is illustrated comprises line links by which lines of calling stations are extended; trunk links for further extending the lines of calling stations to trunks; various types of trunks including interoffice trunks, intraoffice trunks and reverting call trunks; originating registers for registering called numbers; markers; number group circuits; outgoing senders for controlling connections to distant offices and for controlling the operation of the automatic message accounting equipment; automatic message accounting equipment which includes one or more recorders, translators, transverters, trunk identifiers, and master timing circuits; and various connectors and links for associating these elements together. All of the elements are indicated diagrammatically in Fig. 1 of the drawings and some are shown in more detail in the circuits of Fig. 3 through 21 of the drawings. For simplicity, only one of each element is shown. These will serve to illustrate the invention but it will be understood that in an actual telephone system and its associated AMA equipment, a plurality of some of the elements are usually provided, the number in each case depending upon the expected usage of the element.

In a telephone system of the crossbar type as disclosed in the above-mentioned Busch patent which is equipped with AMA equipment of the type disclosed in the Cahill et al. patent and the Carpenter et al. application cited above, there are four general types of calls which may be originated.

A call between subscribers on different subscribers' lines which are served by the same office is an intraoffice call. Intraoffice calls may be further classified into two general types depending upon the class of service for which the subscriber has contracted. If the subscriber making an intraoffice call is a flat rate subscriber, the AMA equipment is not involved as there is no need for making a record of the call and therefore this subscriber would use a flat rate intraoffice trunk. On the other hand, if the calling subscriber has contracted for message rate service, a record must be made of each call he originates and the AMA equipment will be called in to make this record. Such a message rate subscriber would therefore utilize an intraoffice trunk arranged for automatic message accounting (AMA intraoffice trunk) in completing intraoffice calls.

A subscriber who makes an outgoing call to another office is connected through a channel to an outgoing trunk. Outgoing trunks may be of several types depending upon the type of call originated; these may be outgoing trunks to other offices within the same local area or outgoing trunks to distant offices outside the local area. A flat rate subscriber who originates a call to another office within the local area would utilize a flat rate outgoing trunk and the AMA equipment would not be involved as the subscriber is not charged for this call. However, if the flat rate subscriber originates a call to a distant office, he would utilize an outgoing trunk arranged for automatic message accounting because he will be charged and billed for this call. A message rate subscriber who originates a call to an office within the same local area will be charged for this call as well as for calls to distant offices and therefore would utilize an outgoing trunk arranged for automatic message accounting.

A reverting call is a call between two subscribers served by the same subscriber line (party line service) and is completed over a channel to a reverting call trunk. Reverting calls may be completed over flat rate or message rate party lines. However, in crossbar telephone systems of the prior art such as the system disclosed in the above-cited Busch patent it is not possible to positively and automatically identify the particular subscriber on a message rate multi-party line who originates a reverting call and for this reason in the past, message rate charges have not been made on this type of call. However, in the present invention both the calling and the called subscribers involved in a reverting call are positively identified and it is therefore possible to charge each party line message rate subscriber for the reverting calls he initiates.

An incoming call is connected to the called subscriber in the office by means of a channel between an incoming trunk and the called subscriber. The automatic message accounting equipment is not involved on this type of call because the call will be charged to the subscriber in the distant office who originated the call.

The multiparty selective signaling and identification system of the present invention may be utilized with and incorporated into a telephone system of the cross-bar type as disclosed in the above-cited Busch patent which is equipped with automatic message accounting equipment of the type disclosed in the Cahill et al. patent and the Carpenter et al. application cited above and thereby provide positive identification of a subscriber originating any of the above described types of calls, whether over a separate line or a party line. Such a system will also enable any subscriber whether on a separate line or a party line, to be automatically and individually signaled on any of the above described types of calls. For a detailed description of the operation of the circuits of a telephone system of the cross-bar type and associated AMA equipment for the above described types of calls from or to subscribers on individual lines, reference may be made to the above-cited Busch patent, Cahill et al. patent and the Carpenter et al. application.

The multiparty selective signaling and identification system of the present invention will be described hereinafter as it relates to flat rate intraoffice calls, intraoffice calls where automatic message accounting is required and reverting calls where automatic message accounting is not required which may be initiated by a subscriber on a multiparty line. It is to be understood, however, that the principles involved in multiparty selective signaling and identification are equally applicable to incoming calls to subscribers on a multiparty line, to outgoing calls from subscribers on a multiparty line and to reverting calls of subscribers on a multiparty line for which automatic message accounting is desired. The operation of the multiparty selective signaling and identification system of the present invention will first be described in a general way with reference to Fig. 1 of the drawings. This general description will be followed by a more detailed description of the invention with reference to Figs. 3 through 21 of the drawings. To simplify the descriptions, both general and detailed, each of the three types of calls described hereafter are treated as if they were the only calls in the office at that particular time. The actual circuits used in this system are arranged in such a manner that a large number of calls can be switched simultaneously without mutual interference.

With reference to Fig. 1 of the drawings it will be noted that a figure number in parentheses is shown in some of the boxes which represent various circuits. For example, box 114 of Fig. 1 which is labeled "Party Station Identifier" also shows Fig. 4 in parentheses therein. This indicates that the party station identifier circuit is shown in more detail in Fig. 4 of the drawings. Similarly some of the other boxes of Fig. 1 which represent the various circuits contain figure numbers in parentheses to indicate that the particular circuit is shown in more detail in one of the Figs. 3 through 21 of the drawings.

General description

The operation of multiparty selective signaling and identification system of the present invention will now be described in a general way with reference to Fig. 1 of the drawings. In the specific embodiment of the invention illustrated by the drawings, provision is made for as many as 20 parties on a common line. With reference to Fig. 1 of the drawings, assume that subscriber's stations "A" and "B" are two parties on multiparty line 101, on which there may be as many as eighteen additional parties and that subscribers' stations "C" and "D" are two parties on multiparty line 102, on which there also may be as many as eighteen additional parties. To simplify the drawing of Fig. 1 subscribers' stations "A," "B," "C" and "D" are shown merely in block form. It is to be understood, however, that in the preferred embodiment, each subscriber's station on a multiparty line is equipped with a tuned reed type selector of the type described in detail hereinbefore and illustrated in detail by the circuit of subscriber Station "A" in the upper left-hand corner of Fig. 3. The only distinction between stations on the same multiparty line such as "A" and "B" or "C" and "D" in Fig. 1 is that each station on the same multiparty line is equipped with a reed type selector which is tuned to a different frequency. Therefore if the circuit of subscriber Station "A" in Fig. 3 of the drawings is substituted for the boxes of stations "A," "B," "C" and "D" in Fig. 1, the general operation of the embodiment of the invention may be clearly understood from the following description.

Establishing the dialing connection

The following general description of the establishment of a dialing connection is identical for all three types of calls to be described herein. To initiate any type of call, the calling subscriber on a multiparty line must receive dial tone prior to dialing. In the present invention the particular party on the multiparty line who is initiating the call is positively identified and his identity is registered before he receives dial tone.

With reference to Fig. 1 of the drawings, when the subscriber at Station "A" for example, removes the handset from the switchhook of his telephone set to initiate a call, a line relay will operate in line link frame 103 in which line 101 which serves Station "A" is terminated. The operation of the line relay associated with line 101 will cause line link frame 103 to inform line link marker connector 104 that a marker is required. Line link marker connector 104 selects an idle marker such as marker 109 and informs the marker that a call has been originated for which an originating register is required. The circuit from line link frame 103, through line link marker 104, to marker 109 is completed over cable 140.

In order to establish a dialing connection between Station "A" on line 101 and an idle originating register such as originating register 115, marker 109 must determine: (a) the class of service and the equipment location of the calling line, that is, the line link frame number and the location of the calling line on that frame, (b) whether an idle originating register is available and the number of the trunk link frame on which it terminates, (c) that a channel between the line and the idle originating register can be obtained.

The equipment location of a calling line is identified in terms of line link frame number, vertical group number, horizontal group member and vertical file number. The number of the line link frame, the vertical group and horizontal group in which line 101 appears in line link frame 103 is transmitted to marker 109 via line link marker connector 104 and cable 140. While marker 109 is recording this information, it is also selecting idle originating register 115 which terminates through party station identifier 114 on trunk link frame 110. Marker 109 selects a trunk link frame such as trunk link frame 110 having one or more idle originating registers such as originating register 115 and connects to that trunk link frame through trunk link connector 111 over cable 141. After marker 109 selects trunk link frame 110, it goes back to line link frame 103 via line link connector 105 and cable 142 and the final data for locating the position of calling line 101, that is, the vertical file number, is transmitted to marker 109 over this path.

After the vertical file number has been recorded in marker 109, the identification of the class of service of calling line 101 is passed to marker 109 from line link frame 103 via line link connector 105 and cable 142. From this class of service information marker 109 recognizes that calling line 101 is a reed frequency party line which indicates that the subscribers' sets on this line are equipped with vibrating reed type selectors. Marker 109 also determines from the class of service information whether calling line 101 is a flat rate line or a message rate line.

Marker 109 transmits the calling line equipment location and the class of service information to originating register 115 via cable 141, trunk link connector 111 and cable 161 and this information is stored in originating register 115 for subsequent use on intraoffice, reverting or outgoing trunk calls.

Marker 109 must now select an idle channel such as channel 143 between the line 101 on line link 103 and the originating register 115. When marker 109 finds an idle channel such as channel 143, it operates select and hold magnets to close through this channel and marker 109 then indicates to originating register 115 the identity of the line link used in the channel and originating register 115 stores this information for later use.

As soon as the class of service information of calling line 101 is registered in originating register 115, this circuit operates the party station identifier 114 which will send out over channel 143 and line 101 a signal comprising 20 audio frequency tones. The frequency of each of the tones will correspond to the tuned frequency of a different one of the tuned vibratory elements in each of the subscribers' stations connected to line 101. As explained hereinbefore, these audio frequency signals are transmitted over line 101 for an interval of time long enough to insure that all the vibratory elements in the subscribers' sets connected to line 101 have reached their maximum excursion. After these audio frequency signals have been applied to line 101 for the measured interval of time, line 101 is disconnected from the tone source (which is part of the party station identifier 114) and is connected to an amplifier and identifier circuit which is also a part of party station identifier 114.

As described hereinbefore, an audio frequency signal of the particular frequency representing the calling subscriber at Station "A" will be transmitted back over line 101 and channel 143 to party station identifier station 114. This audio frequency signal is applied through an amplifier in the party station identifier 114 which has a load consisting of 20 reed type selectors. Each of these reed type selectors is tuned to a different frequency which corresponds to the tuned frequency of a different one of the tuned vibratory elements in each of the subscribers' sets connected to line 101. The audio frequency signal transmitted from Station "A" back over line 101 to the party station identifier 114 will cause the operation of the reed type selector which is tuned to the particular audio frequency assigned to Station "A." This in turn will initiate a discharge through a cold cathode gas tube associated with the energized reed type selector in party station identifier 114. The discharge of this particular cold cathode gas tube will cause the operation over cable 146 of certain relays in the party station registers 116 which are part of originating register 115. The operation of certain of the register relays in party station registers 116 will register a code representing the identity of the calling subscriber at Station "A". After completion of the party station identification by the party station identifier 114 and the registration of its identity in the party station registers 116, line 101 is cut through to originating register 115 over channel 143 and cables 144 and 145.

Before marker 109 transfers control of channel 143 to originating register 115, it checks the connection for continuity. The marker 109 then releases its associated connectors 104 and 105 and itself. Originating register 115 now furnishes dial tone to the calling subscriber at Station "A" and is ready to receive the dialed digits of the called subscriber's directory number.

Upon receiving dial tone, the subscriber at Station "A" dials the digits of the called subscriber's directory number which are received and registered in originating register 115. At the completion of the dialing of the called number, originating register 115 has stored the office code of the called number, the numerical digits of the called number, the equipment location of calling line 101, the class of service of calling line 101, the identification of the particular party (in this case Station "A") on multi-party line 101 which originated the call and the identity of the line link used in establishing the dialing connection.

*Flat rate intraoffice call*

Assume that the subscriber at Station "A" on line 101 is calling the subscriber at Station "C" on line 102 within the same office and therefore the call will be an intraoffice call. Assume further that the subscribers on line 101 have contracted for flat rate service which means, as mentioned above, that the automatic message accounting equipment will not be involved as there is no need for a record of the call. After the calling subscriber at Station "A" completes the dialing of the directory number of the subscriber at Station "C," in the manner described above, originating register 115 will engage an idle marker such as marker 109 through an originating register marker connector 122 over cable 147. Originating register 115 will then transmit to marker 109 via originating register marker connector 122 the line equipment location of calling line 101, the office code and numerical digits of the called number, the class of service information of calling line 101 and the identity of the line link used in establishing the dialing connection. The registration of the identity of the particular party (in this case Station "A") on line 101 which originated the call is retained in party station registers 116 of the originating register 115 until marker 109 determines whether or not this information is needed. This calling party identification information is required only on calls where the automatic message accounting equipment is involved and marker 109 has not as yet determined whether this equipment will be needed. Marker 109 translates the office code of the called subscriber's directory number and determines that called number is the same office as the calling line 101. Marker 109 then proceeds to set up the terminating and originating connections for an intraoffice call. Marker 109 recognizes from the class of service information obtained from originating register 115 that this is a flat rate call and one for which the automatic message accounting equipment will not be required. Therefore marker 109 has determined that a flat rate intraoffice trunk will be required for completing the call.

Marker 109 establishes the terminating connection between called line 102 and a selected flat rate intraoffice trunk first so that if the called line is busy marker 109 can immediately connect the calling line to a busy tone trunk and thus save holding time on equipment. Before the terminating connection can be set up, however, marker 109 must obtain the equipment location of the called line and the setting of ringing selection switch 120 for ringing the called station on that line. Marker 109 gains access to number group 138 through number group connector 137. The selection of the proper number group by marker 109 is dictated by the dialed thousands digit of the called subscriber's directory number and the dialed hundreds, tens and units digits of the called number are transmitted by marker 109 to the selected number group. Number group 138 translates these digits into an equipment location in terms of line link frame number, vertical group number, horizontal group number and vertical file number and transmits this information via number group connector 137 back to marker 109 where it is registered. Number group 138 also furnishes marker 109 via number group connector 137, information for operating ringing selection switch 120 to select the proper ringing combination for signaling Station "C" on line 102. The ringing combination information furnished by number group 138 is in the form of a ringing code and is registered temporarily in marker 109. This code or ringing combination will subsequently enable marker 109 to select the required ringing signal for signaling Station "C" on line 102. This ringing signal comprises a 20-cycle alternating-current signal having superimposed thereon a selected audio frequency signal, the frequency of which corresponds to the frequency of the vibratory element in the subset at Station "C" on line 102.

While marker 109 is obtaining the called line location and ringing combination from number group 138, it is also selecting an idle flat rate intraoffice trunk such as trunk 118 on an idle trunk link frame such as trunk link frame 112. This selection is made through trunk link connector 113 and cable 148.

After marker 109 receives the equipment location of called line 102 and registers this information and during the time it is selecting an idle flat rate intraoffice trunk, it compares the equipment location of calling line 101 which it received from originating register 115 with the equipment location of called line 102 which it received from number group 138. If these two equipment locations differ, marker 109 knows that it may proceed to complete the intraoffice call over the selected flat rate intraoffice trunk 118. However, as will be explained later, if the calling line and called line equipment location are the same, marker 109 will release the selected flat rate intraoffice trunk 118 and will proceed to establish a reverting call.

From the called line equipment location obtained from number group 138, marker 109 determines that called line 102 is located on line link frame 106. Marker 109 seizes line link frame 106 via line link connector 108 and cable 149 after trunk link frame 112 has been seized. Called line 102 is tested for a busy condition and if line 102 is not busy, marker 109 establishes the terminating connection between the "out" appearance of intraoffice trunk 118 on trunk link frame 112 and called line 102 on line link frame 106 over an idle channel such as channel 150. After the terminating connection is established, marker 109 proceeds to set up the originating connection between calling line 101 on line link frame 103 and the "in" appearance of intraoffice trunk 118 on trunk link frame 112. Marker 109 seizes line link frame 103 in which calling line 101 is terminated via line link connector 105 and cable 142. Before marker 109 releases the dialing connection which was established through channel 143 to trunk link frame 110 as described above, it determines whether there is an idle channel such as channel 151 between calling line 101 and the "in" appearance of intraoffice trunk 118 on trunk link frame 112. If there is an idle channel such as channel 151, the dialing connection is released immediately thus enabling marker 109 to use the dialing connection line link as part of the originating connection if necessary. Marker 109 has received from originating register 115 the identity of this line link used in the dial tone connection.

Marker 109 now sets two select magnets in the ringing selection switch 120 via trunk link connector 113 and cable 152 in accordance with the ringing combination obtained from number group 138. After marker 109 sets ringing selection switch 120 it releases itself, originating register 115, and party station identifier 114 from the connection. The dialing connection is thus disengaged and the subscribers at Station "A" on line 101 and Station "C" on line 102 are interconnected through intraoffice trunk 118 and channels 151 and 150. Intraoffice trunk 118 now controls the ringing and supervision of the call and will operate a hold magnet in ringing selection switch 120 via cable 153 to cause the selected ringing signal to be applied to the ring conductor of line 102 through intraoffice trunk 118.

As described hereinbefore the ringing signal comprises a relatively high potential 20-cycle alternating current signal having superimposed thereon a lower potential selected audio frequency signal in series with a positively poled line battery. The 20-cycle alternating-current signal is obtained from ringing supply 121 and the selection of the desired audio frequency signal which is also obtained from ringing supply 121 is made by ringing selection switch 120 under control of marker 109 as described above. This ringing signal is applied to all party stations on line 102, but only at the called station, that is, station "C," is the vibratory element V energized because station "C" is the only station on line 102 having its vibratory element tuned to the selected audio frequency.

The ringing signal is applied to line 102 through a repeating coil or transformer in intraoffice trunk 118. The line side of this coil feeds positively poled battery out over the ring conductor of line 102 until the ringing current has been tripped or the call abandoned. This ringing signal is applied for two seconds and off for four seconds; the ringing and silent intervals being controlled by an interrupter in ringing supply 121. An interrupter in ringing supply 121 also operates a switching relay in intraoffice trunks 118 which switches the primary of the repeating coil from the ringing supply to a cold cathode gas tube in intraoffice trunk 118 during the four second silent interval.

As described hereinbefore the presence of the audio frequency component of this ringing signal at coil P in station "C" causes vibratory element V in station "C" to vibrate and intermittently close vibratile contact X. As contact X closes, the positively poled 20-cycle signal on the ring conductor of line 102 is connected to the control anode CA of gas tube GT and will initiate a discharge through the tube. The current flow through the main gap of gas tube GT resulting from the breakdown of this tube will operate ringer RNG which is connected in series with the main gap of the tube across the tip and ring conductors of line 102. The operation of ringer RNG during the two second ringing interval will signal the called subscriber at Station "C." The ringers at the other subscriber stations on line 102, such as station "D" for example, will not be operated because the audio frequency signal required for energizing their vibratory elements has not been supplied to line 102.

As hereinbefore described when the called subscriber at Station "C" lifts his handset to answer the call, switchhook contacts SH in his subset will convert the reed type selector in the subset into a self-driven buzzer or oscillator which is sustained in oscillation by the positively poled battery on the ring conductor on line 102 from the central office. If the subscriber at Station "C" should answer the call during the two second ringing interval, vibratory element V in his subset will be vibrating and the reed type selector in his subset will be converted into a self sustained buzzer which will continue vibrating during the ensuing four second silent interval. Because the vibratory element V was vibrating when switchhook contacts SH closed, it is sustained in vibration by the energy received from the positively poled line battery on the ring conductor of line 102 during the silent interval. While acting as a self-driven buzzer, vibratory element V interrupts this positively poled line battery at a rate determined by its natural frequency and coil P and associated condenser K in the subset act as a filter so that this interrupted battery signal is applied back on line 102 as substantially a sine wave of the vibratory element frequency. This signal will be detected by a cold cathode gas tube in intraoffice trunk 118 which will break down or ionize and operate a tripping relay to trip the ringing current and to apply talking battery to line 102. The call will then be under control of a supervisory relay in intraoffice trunk 118 and will function in the normal manner.

If the subscriber at Station "C" answers the call during the four second silent interval, vibratory element V in his subset may or may not be vibrating depending upon the elapsed time after termination of the preceding ringing interval. If vibratory element V is not vibrating sufficiently to close the vibratile contact X, ringing current will not be tripped but will be applied to line 102 during the next succeeding ringing interval. During this ringing interval the subscriber at Station "C" will hear a very reduced volume of ringing tone due to high impedance of varistor VR to the positively poled ringing current. During this succeeding ringing interval, the vibratory element V at Station "C" is caused to vibrate as described above and when the following four second silent interval occurs, the reed type selector at Station "C" is converted to a self-driven oscillator, as described above, and applies an audio frequency signal back over line 102 to intraoffice trunk 118 which functions, as above, to trip the ringing current and apply talking battery to line 102. Ringing selection switch 120 releases when the cold cathode gas tube in intraoffice trunk 118 breaks down and trips the ringing current. When the call is finished the originating and terminating connections are broken and intraoffice trunk 118 is released.

*Intraoffice call arranged for automatic message accounting*

Assume that the subscriber at Station "A" on line 101 is calling the subscriber at Station "C" on line 102 within the same office and therefore the call will be an intraoffice call. Assume further that the subscribers on line 101 have contracted for message rate service which means, as mentioned above, that the automatic message accounting equipment will be called in to make a record of the call. After the calling subscriber at Station "A" completes the dialing of the office code and numerical digits of the directory number of the subscriber at Station "C" in the manner described above, originating register 115 will engage an idle marker such as marker 109 through an originating register marker connector 122 over cable 147. Originating register 115 will then transmit to marker 109 via originating register marker connector 122, the line equipment location of calling line 101, the office code and numerical digits of the called subscriber's directory number, the class of service information of calling line 101 and the identity of the line link used in establishing the dialing connection. The registration of the identity of the particular party (in this case Station "A") on line 101 which originated the call is retained in party station register 116 of originating register 115 until marker 109 determines that this information is needed. This calling party identification information is required on all calls where automatic message accounting is required. Marker 109 then translates the office code of the called number and determines that the called number is in the same office as calling line 101. Marker 109 recognizes from this information that the call originated on line 101 is an intraoffice call. Marker 109 also recognizes from the class of service information obtained from originating register 115 that line 101 is a message rate line and that the automatic message accounting equipment must be utilized to make a record of the call. Marker 109 then proceeds to set up the terminating and originating connections for an intraoffice call using an intraoffice trunk arranged for automatic message accounting such as AMA intraoffice trunk 117. The establishment of the originating and terminating connections between the subscriber at Station "A" on line 101 and the subscriber at Station "C" on line 102 and a selected intraoffice trunk is identical to that described above for the flat rate intraoffice call, except that in this case, marker 109 selects and utilizes an idle AMA intraoffice trunk.

The use of automatic message accounting equipment of the type disclosed in the above-cited Cahill et al. patent, provides a flexible arrangement for charging subscriber dialed local and toll calls. It permits charging for overtime on local message rate calls and billing for local and toll messages on either a "bulk billed" or "detail billed" basis. Bulk billing refers to the practice of rating certain calls in a number of message units and showing the total of such message units on the subscriber's bill. In detail billing, the details of the calls including charges appear on the bill. The automatic message accounting equipment records the details of messages as a series of punched holes on a continuous paper tape. Three entries are normally made on each charged call, the initial entry containing information as to the customer to be charged and the charging plan and two more entries showing the time of answer and disconnect. Because the recording equipment is common to a large group of lines and the details of the call are recorded chronologically as they become available, individual entries are ordinarily interspaced between the entries of other calls. Each entry, however, carries an identifying number or call identity index which is a number assigned to the trunk used in completing the call. This permits the assembling of the parts of information relating to a particular call at a later time.

From the class of service information and from the called office code information, marker 109 can determine the message billing index or charging information which is applicable to the calling subscriber at Station "A" on line 101.

While marker 109 is setting up the originating connection between the "in" appearance of AMA intraoffice trunk 117 and the subscriber at Station "A" on line 101 over channel 151 in a manner similar to that described above with respect to flat rate intraoffice trunk 118, it also seizes a sender such as sender 124 via a sender connector such as sender connector 126 and cable 154. Sender 124 is not seized until after marker 109 completes the terminating connection between the "out" appearance of AMA intraoffice trunk 117 over channel 150 to line 102 on line link frame 106 so that if called line 102 is busy no automatic message accounting equipment is engaged. Intraoffice trunks arranged for automatic message accounting are assigned to particular recorders in groups of 100 and the trunk, such as AMA intraoffice trunk 117 must indicate to marker 109 the recorder such as recorder 132 to which it is assigned. Marker 109 now registers the following information in sender 124 via sender connector 126:

(a) Identity of calling line 101 in terms of equipment location, that is, line link frame number, horizontal group number and vertical file number.

(b) The message billing index which marker 109 has determined from class of service information and type of call information received from originating register 115.

(c) The number of the recorder serving AMA intraoffice trunk 117.

(d) The called line designation, that is, the office code and numerical digits of the called subscriber's directory number. Marker 109 also sets up a connection between intraoffice trunk 117 and sender 124 through sender link 123. Because this is an intraoffice call for which automatic message accounting is required, sender 124 must also be furnished the information relative to the identity of the particular party on line 101 which originated the call. Therefore, marker 109 effects a transfer of the party station identity registered in party station register 116 in originating register 115 to the party station register 125 in sender 124 via originating register marker connector 122, cable 155 and sender connector 126. When the above information has been transferred to sender 124 including the transfer of the party station identification to party station registers 125, marker 109 disengages itself, originating register 115 and associated connectors.

In order for recorder 132 to begin perforating the initial entry, the directory number of the calling subscriber at Station "A" on line 101 is required. To obtain this information sender 124 selects a transverter such as transverter 131 through transverter connector 127.

The selected transverter 131 receives the following information from sender 124:

(a) The recorder number which serves AMA intraoffice trunk 117 used on the call. Transverter 131 uses this information to obtain access to the proper recorder.

(b) The equipment location of calling line 101.

(c) The directory number of the called subscriber at Station "C" on line 102.

(d) The party station identification information from party station register 125 in sender 124.

The calling line equipment location is transferred to transverter 131 via transverter connector 127 and cable 156 and is registered in transverter 131 in calling line location register 129. The party station identification information is transferred to transverter 131 from party station register 125 in a sender 124 via transverter connector 127 and cable 157 and is registered in transverter 131 in the party station register 130. Using the line link frame number and vertical group number of calling line 101, transverter 131 connects itself to a proper translator such as translator 134 via translator connector 139. Transverter 131 transfers the equipment location of calling line 101 from calling line location register 129 and the party station identification of Station "A" on line 101 from party station register 130 to translator 134 via translator connector 139. Translator 134 translates the equipment location of calling line 101 and party station translator 135 which is a part of translator 134, translates the calling station identification information and the combination of these two translations will determine the directory number of the subscriber at Station "A" on line 101. The calling subscriber's directory number is then transmitted back to transverter 131 via translator connector 139 and is registered in transverter 131 in numerical designation register 128. After the directory number of the subscriber at Station "A" on line 101 is registered in the numerical designation register 128 of transverter 131, translator 134 and party station translator 135 release.

Transverter 131 now has the directory number of the called subscriber at Station "C" on line 102 and the directory number of the calling subscriber at Station "A" on line 101, and therefore has all of the information required to initiate the perforating of the initial entry on the central office AMA tape, except the message billing index and the call identity index of AMA intraoffice trunk 117. Transverter 131 can engage the proper recorder, such as recorder 132, because it has received the number of this recorder which serves AMA intraoffice trunk 117 from sender 124. Marker 109 has previously primed sender 124 with the message billing index, therefore sender 124 can transmit the message billing index directly to recorder 132 via transverter connector 127, cable 156 and transverter 131 at the appropriate time. To obtain the call identity index, transverter 131 signals AMA intraoffice trunk 117 serving the call to identify itself. This signaling path is via cable 156, transverter connector 127, sender 124, sender link 123 and cable 158. AMA intraoffice trunk 117 then signals trunk identifier 133 via cable 159 and transmits the call identity index of this particular trunk directly to recorder 132. The physical action of perforating the initial entry on the tape is performed by recorder 132 under control of transverter 131.

As soon as the initial entry has been perforated all of the automatic message accounting equipment is released and AMA intraoffice trunk 117 is in control of the call. The subscriber at Station "C" on line 102 is signaled in the same manner as described above with respect to the flat rate intraoffice call. Marker 109 has set two select magnets in ringing selection switch 120 in accordance with the proper ringing combination for signaling Station "C" on line 102 which it received from number group 138. AMA intraoffice trunk 117 now controls the ringing and supervision of the call and will operate a hold magnet in ringing selection switch 120 via conductors 160 to cause the selected ringing signal to be supplied to the ring conductor of line 102 through AMA intraoffice trunk 117.

In the manner hereinbefore described, the ringing signal, which has a selected audio frequency component, is applied to line 102 through a repeating coil in AMA intraoffice trunk 117 and the presence of this audio frequency component at coil P in Station "C" will cause vibratory element V in Station "C" to vibrate and close vibratile contact X. When contact X closes a discharge will be initiated through gas tube GT in Station "C" and ringer RNG will be operated in series with the main gap of gas tube GT across the tip and ring conductors of line 102.

When the called subscriber at Station "C" on line 102 answers the call, an audio frequency signal will be sent back over line 102 to AMA intraoffice trunk 117 which will operate in the manner described above with respect to the flat rate intraoffice call and trip the ringing current and furnish talking battery for the call.

When the called subscriber at Station "C" on line 102 answers, AMA intraoffice trunk 117 also calls in its associated recorder 132 via the trunk identifier 133. Recorder 132 perforates an "answer time" entry on the tape and releases. When the calling subscriber at Station "A" on line 101 disconnects after the call is completed, AMA intraoffice trunk 117 again calls in recorder 132 via trunk identifier 133 and a "disconnect time" entry is made on the tape. Both the "answer time" and "disconnect time" entries on the tape will have the same call identity index as the initial entry on the tape. As previously stated it is by means of this call identity index that the entries for one call are reassociated at a later time. When the call is completed the originating and terminating connections are broken and AMA intraoffice trunk 117 is released.

Reverting call

Assume that the subscriber at station "A" on line 101 is calling the subscriber at station "B" which is also on line 101 and therefore the call will be an intraoffice reverting call. Assume further that the subscribers on line 101 have contracted for flat rate service, which means, as mentioned above, that the automatic message accounting equipment will not be involved as there is no need for a record of the call. After the calling subscriber at station "A" completes the dialing of the office code and numerical digits of directory number of the subscriber at station "B", in the manner described above originating register 115 will engage an idle marker such as marker 109 through an originating register marker connector 122 over cable 147. Originating register 115 will then transmit to marker 109 via originating register marker connector 122, the line equipment location of calling line 101, the office code and numerical digits of the called subscribers number, the class of service information of calling line 101, and the identity of the line link used in establishing the dialing connection. As in the case of the flat rate introffice call described above, the registering of the identity of the particular party, that is station "A" on line 101, which originated the call, is retained in party station register 116 of originating register 115 until marker 109 determines whether or not this information is needed. Marker 109 translates the office code of the called number and determines that the called number in the same office as the calling line 101. Marker 109 does not realize at this time that the called line and calling line are the same and proceeds to set up the terminating and originating connections for a non-reverting intraoffice call. Marker 109 recognizes from the class of service information obtained from originating register 115 that this is a flat rate call and one for which the automatic message accounting equipment will not be required, and therefore marker 109 has determined that a flat rate intraoffice trunk will be required.

Before the terminating connection to a flat rate intraoffice trunk can be set up, marker 109 has to obtain the equipment location of the called number and the setting of ringing selection switch 120. Marker 109 gains access to number group 138 through number group connector 137. The selection of the proper number group by marker 109 is dictated by the dialed thousands digit of the called subscriber's directory number and the dialed hundredths, tenths and units digits of the called number are transmitted by marker 109 to the selected number group. Number group 138 translates these digits into an equipment location in terms of line link frame number, vertical group number, horizontal group number and verticle file number and transmits this information via number group connector 137 back to marker 109 where it is registered.

Number group 138 also furnishes marker 109 via number group connector 137 information for operating ringing selection switch 120 to select the proper combination for signaling station "B" on line 101. The information furnished by number group 138 is in the form of a ringing code and is registered temporarily in marker 109. This code or ringing combination will subsequently enable marker 109 to select the required ringing signal for signaling station "B" on line 101. This ringing signal comprises a 20-cycle alternating-current signal having superimposed thereon a selected audio frequency signal, the frequency of which corresponds to the frequency of the vibratory element in the subset at station "B" on line 101.

While marker 109 is obtaining the called line location and ringing combination from number group 138 as described above, it is also selecting an idle flat rate intraoffice trunk such as trunk 118 on an idle trunk line frame such as frame 112. This selection is made through trunk link connector 113 and cable 148.

After marker 109 receives the equipment location of the called subscriber at station "B" on line 101, and registers this information and during the time it is selecting an idle flat rate intraoffice trunk, it compares the equipment location of calling line 101 which it received from originating register 115 with the equipment location of the called line which it received from number group 138. As soon as marker 109 realizes that the calling subscriber at station "A" and the called subscriber at station "B" are on the same line, that is line 101, it releases the selected intraoffice trunk 118 and seizes a trunk link frame such as 112 on which the idle reverting call trunk such as reverting call trunk 119 appears. Marker 109 then establishes a channel such as channel 151 between line 101 on line link frame 103 and reverting call trunk 119 on trunk link frame 112.

Marker 109 now sets two select magnets in ringing selection switch 120 via trunk link connector 113 and cable 152 in accordance with the ringing combination obtained from number group 138. After marker 109 sets ringing selection switch 120, it releases itself, originating register 115 and party station identifier 114 from the connection. The dialing connection is thus disengaged and the subscribers at station "A" and station "B" on line 101 are interconnected through reverting call trunk 119 over channel 151. Reverting call trunk 119 now controls the ringing and supervision of the call and will operate a hold magnet in ringing selection switch 120 via cable 162 to cause the selected ringing signal to be supplied to the ring conductor of line 101 through reverting call trunk 119.

As previously described, the ringing signal comprises a relatively high potential 20-cycle alternating-current signal having superimposed thereon a lower potential selected audio frequency signal in series with the positively poled line battery. The 20-cycle alternating-current signal is obtained from ringing supply 121 and the selection of the audio frequency signal which is also obtained from ringing supply 121 is made by ringing selection switch 120 under control of marker 109 as described above. This ringing signal is applied to all party stations on line 101, but only at the called station, that is, station "B" is vibratory element V energized because station "B" is the only station on line 101 having its vibratory element tuned to the selected audio frequency. Varistor VR in the subset at station "A" is poled so as to present a high impedance to the positively poled ringing current so that the ringing current applied to the subset at station "B" will not be materially reduced by the shunting effect of the transmitter receiver dial TRD which are bridged across the line 101 by switchhook contacts SH at station "A."

The ringing signal is applied to line 101 through a repeating coil or transformer in reverting call trunk 119. The line side of this coil feeds positively poled battery out over the ring conductor of line 101 until the ringing current has been tripped or the call abandoned. This ringing signal is applied for two seconds and off for four seconds; the ringing and silent intervals being controlled by an interrupter in ringing supply 121. An interrupter in ringing supply 121 also operates a switching relay in reverting trunk 119 which switches the primary of the repeating coil from the ringing supply to a cold cathode gas tube in this trunk during the four second silent interval. This cold cathode gas tube in reverting call trunk 119 functions in the manner described above with respect to the flat rate intraoffice call to detect the audio frequency signal transmitted back over line 101 from station "B" when the subscriber at station "B" answers the call. When this cold cathode gas tube fires or breaks down in response to the audio signal from called station "B" it operates a tripping relay to trip the ringing current and to apply talking battery to line 101. Each time the switching relay in reverting trunk 119 switches the primary of the repeating coil to the cold cathode gas tube in reverting trunk 119 it also applies a negative voltage pulse to a cold cathode stepping tube in reverting call trunk 119. This cold cathode stepping tube is of the type disclosed in Patent 2,575,370 which issued to M. A. Townsend, November 20, 1951. This stepping tube counts the number of negative voltage pulses received from the switching relay in reverting call trunk 119. After the tenth pulse is received, the stepping tube will operate a relay in reverting call trunk 119 which will trip the ringing current applied to line 101 and will apply instead interrupted busy tone to indicate that the called subscriber at station "B" does not answer. Therefore reverting call trunk 119 will apply ringing current to line 101 until the called subscriber at station "B" answers the call and if the called subscriber at station "B" fails to answer, reverting call trunk 119 will continue to apply ringing current to line 101 for ten ringing intervals (approximately one minute) after which the ringing current is removed from the line and an interrupted busy tone is applied.

The operation of the circuits of reverting call trunk 119 are similar to those described above for flat rate intraoffice trunk 118 in respect to the tripping of the ringing signal by the called subscriber answering the call. Ringing selection switch 120 releases when the cold cathode gas tube in reverting call trunk 119 breaks down in response to the audio signal received back over line 101 from station "B" or when the cold cathode stepping tube in reverting call trunk 119 counts the tenth ringing interval and trips the ringing current as described above. When the call is finished, the connection between line 101 and reverting call trunk 119 over channel 151 is released and reverting call trunk 119 is restored to normal.

Operation in detail

The operation of the multiparty selective signaling and identification system of the present invention as generally described above in relation to flat intraoffice calls, intraoffice calls where automatic message accounting is required and reverting calls where automatic message accounting is not required will now be described in greater detail with respect to the same three types of calls and with reference to Figs. 3 through 21 of the drawings when placed in relation to one another as shown in Fig. 2. As pointed out hereinbefore the principles involved in the multiparty selective signaling and identification system described herein are equally applicable to all types of calls, incoming, outgoing, reverting or intraoffice, which may be initiated or received by a flat rate or a message rate subscriber, or any other type subscriber on a multiparty line. A detailed description of the operation of the system as it functions in completing flat rate intraoffice calls, intraoffice calls arranged for automatic message accounting and reverting calls not arranged for automatic message accounting will sufficiently disclose the principles and mode of operation to permit them to be applied to incoming calls, outgoing calls, and reverting calls which require automatic message accounting. Therefore, a detailed description of the system as it functions to complete incoming and outgoing calls and AMA reverting calls will not be given, as it would for the most part be repetitious and would unduly lengthen the specification. It is to be understood, however, that the present invention is not limited in its application to the three types of calls specifically described herein, but is equally applicable to all types of calls.

In the specific embodiment of the invention illustrated in Figs. 3 through 21 of the drawings, provision is made for as many as 20 parties on a common line. With reference to Fig. 3 of the drawings, assume that the subscribers' stations "A" and "B" are two parties on multiparty line 301 and that subscribers' stations "C" and "D" are two parties on multiparty line 302. Both lines 301 and 302 may have as many as 18 additional parties which are not shown. To simplify the drawing of Fig. 3, subscribers' stations "B," "C" and "D" are shown merely in block form. It is to be understood, however, that in the preferred embodiment described herein, each subscriber station on a multiparty line is equipped with a tuned reed type selector of the type described in detail hereinbefore and illustrated in detail by the circuit of subscriber station "A" in the upper left-hand corner of Fig. 3. The only distinction between stations on the same multiparty line such as "A" and "B" or "C" and "D" in Fig. 3 is that each station on the same multiparty line is equipped with a reed type selector which is tuned to a different frequency. Therefore, if the circuit of subscriber station "A" in Fig. 3 is substituted for the boxes of stations "B," "C" and "D" in Fig. 3, the general operation of the embodiment of the invention may be clearly understood from the following description.

*Establishing the dialing connection, detailed description*

The following detailed description of the establishment of a dialing connection is identical for all three types of calls to be described herein. To initiate any type of call the calling subscriber on a multiparty line must receive dial tone prior to dialing. In the present invention, the particular party on a multiparty line who is initiating a call is positively identified and his identity is registered before he is permitted to receive dial tone.

With reference to Fig. 3 of the drawings, when the subscribed at station "A," for example, removes the handset from the switchhook of his subset to initiate a call, a line relay will operate in line link frame 303 in which line 301 which serves station "A" is terminated. Varistor VR in the circuit of the subset at station "A" is poled in such a direction as to present a low impedance to the flow of current from the tip to the ring conductors of line 301 through the windings of this line relay and therefore will permit the operation of this line relay in line link frame 303. The operation of the line relay in line link frame 303 which is connected to line 301 will cause line link frame 303 to inform line link marker connector 304 that a marker is required. Line link marker connector 304 selects an idle marker such as the marker shown in simplified schematic form in Figs. 9, 10 and 11 and informs that marker that a call has been originated for which an originating register is required. Line link marker connector 304 selects the idle marker via cable 1 and cable 58 from line link marker connector 304 in Fig. 3 to the marker switch operating circuit 903 shown in Fig. 9.

In order to establish a dialing connection between station "A" on line 301 and an idle originating register, one of which is shown in simplified schematic form in Fig. 6, the marker must determine the class of service and equipment location of the calling line, whether an idle originating register is available, the number of the trunk link frame on which it appears and whether a channel between the line and the idle originating register can be obtained. The equipment location of a calling line is identified in terms of line link frame number, vertical group number, horizontal group number and vertical file number as described hereinbefore. The number of the line link frame, the vertical group and horizontal group in which line 301 is terminated on line link frame 303 is transmitted to the marker via line link marker connector 304, cable 1 and cable 4. This information is recorded in the marker calling line location registers shown in Fig. 10. The marker calling line location registers have four frame tens digit identification relays FTC0, FTC1, FTC2 and FTC3 of which FTC1 and FTC3 are shown in Fig. 10. The tens digit of the frame number in which calling line is located will be registered in these four relays. The marker calling line location registers have five frame units digit identification relays designated FUC0, FUC1, FUC2, FUC4 and FUC7 of which FUC0 and FUC7 are shown in Fig. 10. The units digit of the frame number in which calling line is located will be registered in these five relays on a two out of five basis. The marker calling line location registers have 10 horizontal group identification relays designated HGC0 through HGC9 of which HGC0 and HGC9 are shown in Fig. 10 and are used to register the particular horizontal group number in the line link frame in which the calling line is located. Similarly, the marker calling line location registers have 14 vertical group identification relays VGC0 through VGC13 of which VGC0 and VGC13 are shown in Fig. 10. The vertical group number in line link frame in which the calling line is located is registered in these 14 relays. While the marker is recording the above information, it is also selecting an idle originating register which terminates on an idle trunk link frame such as frame 310 shown in Fig. 3 through a party station identifier circuit shown in Fig. 4. The marker switch operating circuits 903 of Fig. 9 select a trunk link frame such as frame 310 having one or more idle originating registers terminated thereon and connects the marker to that trunk link frame through trunk link connector 311 via cable 35 and cable 2. After the marker selects trunk link frame 310 it goes back to line link frame 303 via line link connector 305, cable 3 and cable 5 and the final data for locating the position of calling line 301 in line link frame 303, that is the vertical file number, is transmitted to the marker over this path. The vertical file number in which calling line 301 is located in line link frame 303 is registered in the marker calling line location registers in five vertical file identification relays VFC0 through VFC4, of which VFC0 and VFC4 are shown in Fig. 10.

After the vertical file number has been recorded in the marker, the identification of the class of service of the calling line 301 is passed to the marker from line link frame 303 via line link connector 305, cable 3 and cable 8 and is registered in the marker calling line class registers 905 shown in Fig. 9. From this class of service information the marker recognizes that calling line 301 is a reed frequency party line which indicates that the subscribers' sets on this line are equipped with vibrating reed type selectors. The marker also determines from the class of service information whether calling line 301 is a flat rate line or a message rate line.

The marker now transmits the frame tens digit number, frame units digit number, the horizontal group number, the vertical group number and vertical file number as registered in the calling line location registers of Fig. 10 to the calling line location registers 604 of the originating register shown in Fig. 6 via cable 6, cable 2, trunk link connector 311 and cable 7. Thus the marker has transmitted the calling line equipment location to the originating register shown in Fig. 6. The marker also transmits the class of service information of calling line 301 which is registered in marker calling line class registers 906 of Fig. 9 to calling line class registers 605 of the originating register shown in Fig. 6 via cable 9, cable 2, trunk link connector 311, and cable 7.

The marker must now select an idle channel such as channel 10 shown in Fig. 3 between line 301 on line link frame 303 and trunk link frame 310 upon which the idle originating register terminates. When the marker finds an idle channel such as channel 10, it operates select and hold magnets to close through this channel. The marker then indicates to the originating register the identity of the line link used in this channel and the originating register stores this information for later use.

As soon as the orignating register has been selected by the marker, an off-normal ground is supplied to the back contact of the RFP relay in the calling line class registers 605 of the originating register shown in Fig. 6. This ground is extended through the back contact of the RFP relay over conductor 11 to the winding of relay 401 in the party station identifier of Fig. 4. When this off-normal ground is applied to the winding of relay 401, the relay operates and closes the tip, ring and sleeve conductors from trunk link frame 310 through to the originating register shown in Fig. 6 via cable 12 and cable 13. During the course of analyzing the class of service information of calling line 301 obtained from line link frame 303, the market determines whether the calling line is a single party line or a multiparty line. If the marker should determine that the calling line is a single party line, the operation of relay 401 in the party station identifier of Fig. 4 as described above will complete the connection from the calling subscriber to the originating register shown in Fig. 6 and the originating register is ready to transmit dial tone to the calling subscriber and to receive the impulses of the dialed digits of the called number. However, under the assumed conditions the calling subscriber at station "A" is a subscriber on multiparty line 301 and the stations connected to line 301 are each equipped with reed type selectors. When the marker determines that calling line 301 is a multiparty line, it transmits a ground from the marker calling line class registers 905 of Fig. 9 to the winding of the RFP relay in the calling line class registers 605 of the originating register shown in Fig. 6 via cable 18, cable 2, trunk link connector 311 and cable 7. This ground, which operates the RFP relay, is a signal to the originating register of Fig. 6 that the calling line is a multiparty line and one for which a party station identification must be made. The operation of the RFP relay will remove the off-normal ground from conductor 11 which in turn will cause relay 401 of the party station identifier of Fig. 4 to release. The above-described operation of relay 401 and the subsequent operation of the RFP relay in Fig. 6 which in turn causes the release of relay 401 in Fig. 4 takes place while the marker has been selecting an idle channel such as channel 10 between line 301 on line link frame 303 and truck line frame 310 upon which the idle originating register terminates. By the time the selection of the idle channel has been completed, and by the time the tip, ring and sleeve conductors are cut through from line 301 on line link frame 303, to the party station identifier of Fig. 4, relay 401 has released and is in the unoperated position. As soon as relay 401 releases, the tip conductor of the line is connected through a back contact of relay 401, through the upper secondary winding of transformer TR1, to ground and the ring conductor of the line is connected through a back contact of relay 401, through the lower secondary winding of transformer TR1 to positive battery. The primary winding of transformer TR1 is connected through back contacts of relay 403 to tone source 409.

As described hereinbefore, tone source 409 provides 20 separate audio frequency signals each of which correspond to the tuned fraquency of a different one of the tuned vibratory elements in the subscribers' stations which may be connected to a multiparty line. These individual audio frequency signals may come from vacuum tube oscillators, motor driven tone wheels, or any other frequency generating means. The simultaneous application of the 20 separate audio frequency signals to the primary winding of transformer TR1 will cause these signals to be induced in the secondary winding transformer TR1 and applied to the tip and ring conductors of line 301. These signals on line 301, as explained hereinbefore, will cause all of the vibratory elements in all of the subsets connected to line 301 to vibrate.

Figure 4:
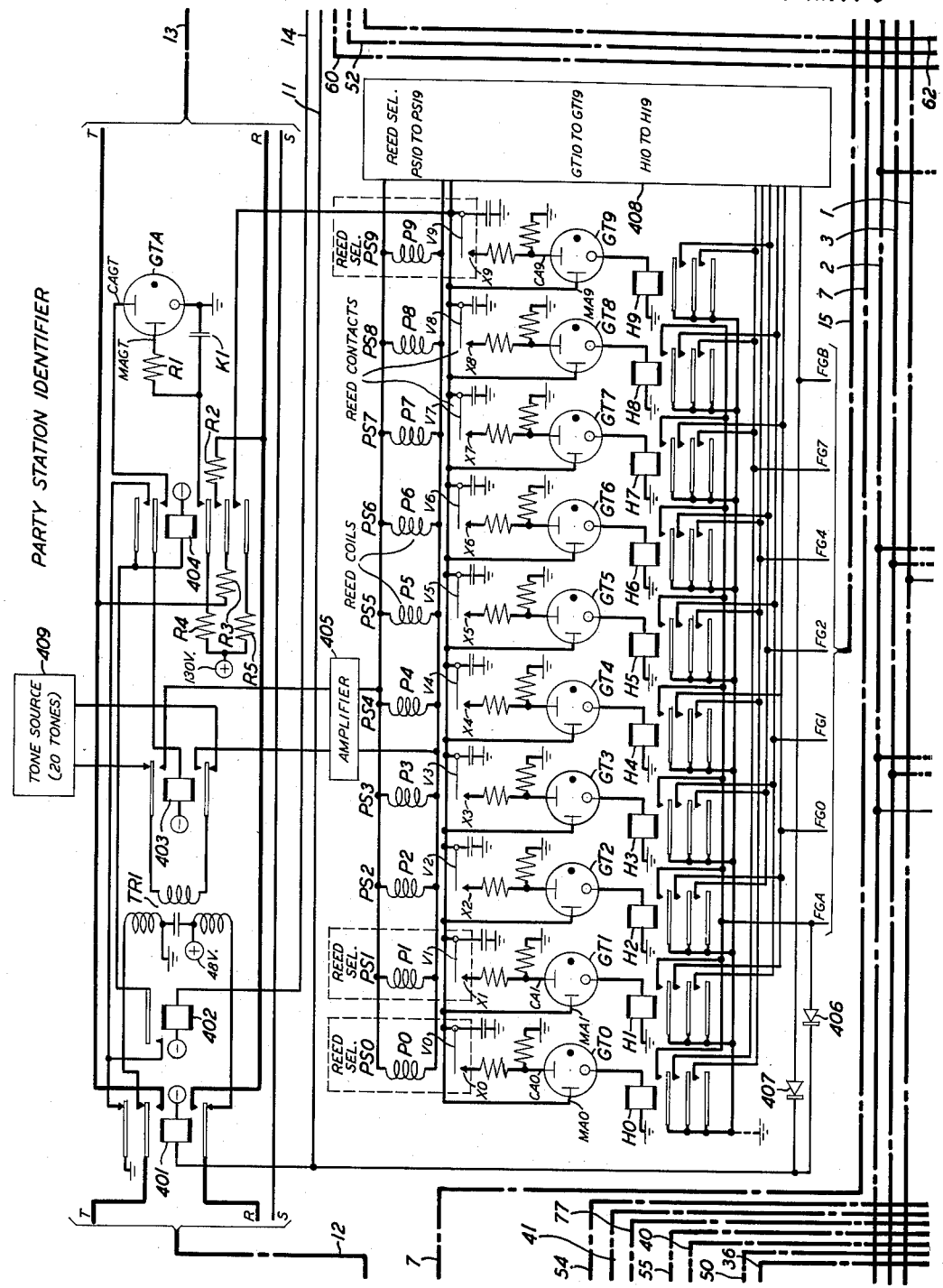
Fig. 4 shows in schematic form the circuit of the party station identifier of the present invention in its application to a telephone system of the crossbar type.

Referring again to the RFP relay of Fig. 6, when this relay operated in response to the ground from the marker calling line class registers 905 of Fig. 9, the off-normal ground is removed from conductor 11 and is transferred through the front contacts of the RFP relay to conductor 14 and applied to the winding of relay 402 in Fig. 4. When relay 402 operates in response to this off-normal ground it closes a circuit from ground at a back contact of relay 401, through the front contacts of relay 402 to the winding of relay 404. Relay 404 operates and locks operated to ground at the back contact of relay 401. Relay 404 in operating supplies the main anode potential to the main anode MAGT of cold cathode gas tube GTA, supplies the main anode potential to the respective main anodes MA0 through MA19 of cold cathode gas tubes GT0 through GT19 and places a resistance bridge from the tip of the line through resistance R3, front contact of relay 404 and resistance R2 to the ring conductor of the line toward the originating register of Fig. 6 in order to prepare that circuit so that there will be no delay in the dial tone connection after the party station identification has been completed. Relay 404 in operating also closes a path from the winding of transformer TR1 from tone source 409 to amplifier gas tube GTA. When condenser K1 in the cathode circuit of cold cathode gas tube GTA acquires sufficient charge from the positive potential applied through resistance R4, gas tube GTA fires and operates relay 403. Relay 403 in operating, transfers the primary winding of transformer TR1 from one source 409 to amplifier 405. The firing time of gas tube GTA is determined by the time constant of condenser K1 and resistance R4 and is sufficient to permit all of the vibratory elements in all of the subscribers' stations connected to line 301 to be excited to their maximum excursion by the 20 audio frequency signals applied to line 301 before tube GTA fires and operates relay 403 to disconnect tone source 409 from the line. Thus tone source 409 transmits on line 301 the 20 audio frequency signals for an interval of time sufficient in duration to insure that the vibratory elements in the subscribers' stations connected to line 301 have all been excited to their maximum excursion and then tone source 409 is disconnected.

As hereinbefore described the vibrating reed type selector at station "A" has been converted to a self sustained buzzer or oscillator by the closure of switchhook contacts SH. Therefore at station "A", vibratory element V will continue to vibrate and interrupt the positive battery connected to the ring conductor of the line 301 from the secondary winding of transformer TR1 after tone source 409 is disconnected from line 301. The operation of the reed type selector in the subset of station "A" will, when operating as a sustained buzzer, transmit over line 301 an audio frequency signal, the frequency of which corresponds to the natural frequency of its tuned vibratory element V. This signal is applied to the secondary of transformer TR1 and is induced into the primary of transformer TR1 and applied through front contacts of relay 403 to amplifier 405. The output of load of amplifier 405 is an identification or detector circuit and consists of 20 reed type selectors PS0 through PS19 of which PS0 through PS9 are shown in detail in Fig. 4 and PS10 through PS19 are indicated in block form in the box labeled "408".

Each of the reed type selectors PS0 through PS19 which are connected to the output of amplifier 405 has a coil, a vibratory element and a vibratile contact, such as P0, V0, and X0 for reed type selector PS0. Each of the reed type selectors PS0 through PS19 also has an associated cold cathode gas tube GT0 through GT19 respectively and an associated relay H0 through H19. Cold cathode gas tubes GT0 through GT9 and relays H0 through H9 associated with reed type selectors PS0 through PS9 are shown in detail in Fig. 10 while gas tubes GT10 through GT19 and relays H10 through H19 are indicated in block form in the box labeled "408" in Fig. 10. The windings of each of the relays H0 through H19 are connected between ground and the cathode of its associated cold cathode gas tube GT0 through GT19. Vibratory elements V0 through V19 of reed type selectors PS0 through PS19 are each tuned to a separate frequency which corresponds to one of the frequencies of the vibratory elements V in the subscribers' stations which may be connected to a multiparty line such as line 301. Any one of the tuned vibratory elements V0 through V19 when properly excited by the application of its own frequency to its associated coil P0 through P19 will vibrate and intermittently close its associated vibratile contact X0 through X19. The closure of one of the contacts X0 through X19 will cause a positive potential to be applied to the control anode CA0 through CA19 of the associated cold cathode gas tube GT0 through GT19. The application of this positive potential to the control anode of one of the gas tubes GT0 through GT19 will cause this tube to ionize and conduct current through the winding of its associated relay H0 through H19. Relays H0 through H19 are each operated by the discharge of its associated cold cathode gas tube GT0 through GT19.

Relays H0 through H19 are divided into two groups of ten, H0 through H9 being the first group, and H10 through H19 the second group. These 20 relays are connected to the party station register of Fig. 5 on the well-known 2 out of 5 coding scheme. The operation of any one of the relays H0 through H9 in the first group will cause a ground to be applied to lead FGA which is connected to the party station register of Fig. 5 by cable 15 and will cause the operation of relay SA in the party station register circuit. Similarly, the operation of any one of the relays H10 through H19 (comprising the second group) which are indicated by the block labeled "408" in Fig. 4 will cause a ground to be applied to lead FGB which is connected to the party station register of Fig. 5 by cable 15 and will cause the operation of relay SB in the party station register circuit. Also the operation of any relay H0 through H9 in the first group or any relay H10 through H19 in the second group will ground 2 out of 5 leads according to the well-known coding scheme wherein 2 out of 5 leads designated, 0, 1, 2, 4 and 7, represent 10 combinations corresponding to the numbers 0 to 9 inclusive. Therefore, ground will be applied to 2 of the 5 leads FG0, FG1, FG2, FG4 and FG7 which are connected to the party station register of Fig. 5 by cable 15 and will operate 2 of the 5 relays S0, S1, S2, S4 and S7.

As described hereinbefore, the vibratory element in the subset of the calling party will continue to vibrate as a sustained buzzer, activated by the positive battery fed over the ring conductor of the line from the secondary winding of transformer TR1 and will transmit a signal corresponding to its natural frequency back over the line to the secondary winding of transformer TR1. This tone is then induced in the primary winding of transformer TR1 and is applied to amplifier 405. The tone is detected by the one of the 20 reed type selectors PS0 through PS19, which is similarly tuned and causes one of the 20 cold cathode gas tubes GT0 through GT19 to fire and operate its associated one of the relays H0 through H19. The operation of one of the relays H0 through H19 will cause the operation of three relays, the SA or SB and two of the relays S0, S1, S2, S4 and S7 of the party station register shown in Fig. 5. Therefore, the calling subscriber is positively identified and his identity is registered in the party station register of Fig. 5.

Assume now that the vibratory element V in the subset at station "A" is tuned to a frequency which corresponds to the frequency of the vibratory element V1 in reed selector PS1 in the party station identifier of Fig. 4. The audio frequency signal which is transmitted over line 301 from station "A" is applied to amplifier 405, which in turn amplifies the signal and applies it to all of the coils P0 through P19 of all the reed type selectors PS0 through PS19. Because the frequency of this signal, as assumed above, corresponds to the natural frequency of the vibratory element V1, the presence of the signal at coil P1 will cause vibratory element V1 to vibrate and intermittently close vibratile contact X1. The closure of vibratile contact X1 will cause a positive potential to be applied to the control anode CA1 of gas tube GT1 which in turn will cause gas tube GT1 to ionize and to operate its associated relay H1. The operation of relay H1 will connect ground to leads FGA, FG0, and FG1 in cable 15 which in turn will cause the operation of relays SA, S0 and S1 in the party station register shown in Fig. 5. Thus, the identity of station "A," on line 301, has been determined and registered.

In a similar manner if it is assumed that the vibratory element V in a subset at station "A" is tuned to a frequency which corresponded to the frequency of vibratory element V6 in reed selector PS6 in the party station identifier of Fig. 4, the audio frequency signal which is transmitted over line 301 from station "A" will energize reed selector PS6 and in turn will cause the ionization of cold cathode gas tube GT6 and the operation of relay H6. The operation of relay H6 will connect ground to leads FGA, FG2 and FG4 in cable 15 and cause the operation of relays SA, S2 and S4 in the party station register of Fig. 5.

The ground applied to leads FGA or FGB as a result of the operation of one of the relays H0 through H19 will also be applied to the winding of relay 401 in Fig. 4 through varistors 406 or 407. Varistors 406 and 407 are so poled that a ground on lead FGA will be applied only to the winding of relay 401 and not back on lead FGB and similarly ground on lead FGB will be applied only to the winding of relay 401 and not back on lead FGA. Relay 401 operates in response to the ground through varistors 406 or 407 from leads FGA and FGB respectively and in operating closes the tip, ring and sleeve conductors from trunk link frame 310 to tone coil TN and relay LA of the originating register circuit shown in Fig. 6 via cable 12 and cable 13. The operation of relay 401 also removes the locking ground for relay 404 which releases. The release of relay 404 removes the anode potential from gas tubes GTA and GT0 through GT19 and releases relay 403. The release of relay 404 also opens the resistance bridge across the tip and ring conductors of the line leading to the originating register circuit of Fig. 6. Relays 401 and 402 remain operated until the originating register of Fig. 6 has completed its function and is released from the trunk link connector circuit by the marker.

The subscriber at station "A" on line 301 is now connected to the originating register circuit of Fig. 6 and receives dial tone from tone coil TN in the manner described in detail in the above-cited Busch patent. Pulsing relay LA of the originating register circuit in Fig. 6 is operated over the calling subscriber's loop; varistor VR in the circuit of the subscriber's subset at station "A" being poled so as to present a low impedance to the flow of current in the subscriber's loop thus permitting relay LA to operate. Before the marker transfer the control of the connection between station "A" on line 301 and the originating register circuit of Fig. 6 it checks the connection for continuity. The marker then releases itself and its associated connectors.

Upon receiving dial tone, the subscriber at station "A" dials the digits of the called subscriber's number. The opening and closing of the calling subscriber's loop in response to the operation of the dial at station "A" will operate relay LA in the originating register circuit shown in Fig. 6 which in turn will operate counting relays 601. Counting relays 601 will count the pulses of the dialed digits and record the digits representing the office code in code register 602 and the numerical digits of the called number in numerical register 603 of the originating register circuit shown in Fig. 6. At the completion of the dialing of the called number, the originating register of Fig. 6 has stored the office code of the called number, the numerical digits of the called number, the equipment location of the calling line 301, the class of service of calling line 301, the identification of the particular party (in this case station "A") on line 301 which originated the call, and the identity of the line link used in establishing the dialing connection.

*Flat rate intraoffice call, detailed description*

Assume that the subscriber at station "A" on line 301 in Fig. 3 is calling the subscriber at station "C" on line 302 within the same office and has completed the dialing of the directory number of station "C" in the manner described above. Assume further that the subscribers on line 301 have contracted for flat rate service which means, as mentioned above, that the automatic message accounting equipment will not be involved on the call as there is no need for making a record. After the calling subscriber at station "A" completes the dialing of the office code and numerical digits comprising the directory number for the subscriber at station "C" in the manner described above, the originating register shown in Fig. 6 will engage an idle marker such as the marker shown in Figs. 9, 10 and 11 through originating register marker connector 701 shown in block form in Fig. 7. The originating register will transmit the line equipment location of calling line 301 which is now registered in calling line location registers 604 of Fig. 6 to the marker calling line location registers shown in Fig. 10 via cable 16, originating register marker connector 701 and cable 17. The frame tens digit will be registered in the relays FTC0 through FTC3, the frame units digit will be registered in the relays FUC0, FUC1, FUC2, FUC4 and FUC7, the horizontal group number will be registered in the relays HGC0 through HGC9, the vertical group number will be registered in the relays VGC0 through VGC13, and the vertical file number will be registered in the relays VFC0 through VFC4. Thus the equipment location of calling line 301 has been re-registered in the marker.

The marker contains called line number registers for registering the numerical digits of the called subscriber's number. These registers register the called number on the well-known 2 out of 5 coded scheme. The marker called line number registers as shown in Fig. 10, comprise relays TH0, TH1, TH2, TH4 and TH7 of which TH0 and TH7 are shown, for registering the thousands digit of the called number; relays HN0, HN1, HN2, HN4 and HN7 of which HN0 and HN7 are shown for registering the hundreds digit of the called number; relays TN0, TN1, TN2, TN4 and TN7 of which TN0 and TN7 are shown for registering the tens digits of the called number; and relays U0, U1, U2, U4 and U7 of which U0 and U7 are shown for registering the units digit of the called number. The originating register transmits the numerical digits of the called subscriber's directory number from numerical register 603 shown in Fig. 6 to the above-described marker called line number registers shown in Fig. 10 via cable 18, originating register marker connector 701 of Fig. 7 and cable 19. The originating register transmits the office code of the called subscriber's directory number from code register 602 shown in Fig. 6 to the marker code registers 902 shown in Fig. 9 via cable 20, originating register marker connector 701 of Fig. 7 and cable 21. The originating register also transmits the class of service information of calling line 301 from calling line class registers 605 shown in Fig. 6 to the marker calling line class registers 905 shown in Fig. 9 via cable 22, originating register marker connector 701 of Fig. 7 and cable 23. The originating register also transmits the identity of the line link used in establishing the dialing connection to the marker. The registration of the identity of the particular party (in this case station "A") on line 301 who originated the call, is retained in the party station register of Fig. 5 until the marker determines whether or not this information is needed.

The marker translates the office code of the call designation or directory number of station "C" which is registered in the marker code registers 902 of Fig. 9 and determines that called number is in the same office as calling line 301. The registration of the called office code in the marker code registers 902 of Fig. 9 will cause a ground to be applied to the upper winding of a route relay such as relay RT shown in Fig. 9. The marker has several route relays, one for each type of call. If the code registered in code registers 902 was a code for a distant office, an appropriate route relay would be operated for routing the call to the distant office. However, as assumed above, station "A" on line 301 is calling station "C" on line 302 in the same office and therefore the call is an intraoffice call. The code which is registered in the marker code registers 902 will cause a ground to be applied to the upper terminal of the winding of route relay RT which is the route relay for routing the call within the same office. From the class of service information registered in marker calling line class registers 905 of Fig. 9, the marker can determine whether calling line 301 is a flat rate or a message rate line. The registration of the calling line class information in the marker calling line class registers 905 will operate a class relay such as relay CSMR for message rate lines or relay CSFR for flat rate lines. Under the assumed conditions the subscribers on calling line 301 have contracted for flat rate service, therefore upon the registration of this class information in the marker calling line class registers 905, class relay CSFR of Fig. 9 will be operated by ground obtained from the marker calling line class registers 905 through the winding of the relay to battery. The operation of relay CSFR will apply battery through resistance R6, through front contacts of relay CSFR, through the winding of relay RT, to the ground applied to the upper terminal of the winding of relay RT by code registers 902 as described above and will operate relay RT. The operation of relay RT in Fig. 9 will close a circuit from ground on the right-hand back contact of relay GS in Fig. 9, through the right-hand front contacts of relay RT, over lead 911, to the marker switch operating circuits 903 of Fig. 9. Ground will also be applied through back contacts 906 of relay GS, through front contacts 907 of relay RT, over lead 912, to the marker class of call registers 904 shown in Fig. 9 which will register the type of call being originated. The operation of relay RT of Fig. 9 will also close a circuit from ground through back contacts 908 of relay GS, through front contacts 909 of relay RT, through the winding of relay ITR1 to battery. Relay ITR1 operates and locks operated to ground at the back contact of relay ITA.

From the translation of the office code information of the called subscriber's number and the class of service information of calling line 301, the marker determines that the call which has been originated on line 301 is an intraoffice call and that it is a flat rate call and one for which the automatic message accounting equipment will not be required. As a result of this translation the marker has determined that a flat rate intraoffice trunk will be required to complete the call and in response to the ground applied on lead 911 to the marker switch operating circuits 903 of Fig. 9 as described above, the marker will select an idle flat rate intraoffice trunk as will be described later. The marker then proceeds to establish the terminating and originating connections for an intraoffice call over the selected flat rate intraoffice trunk. The marker establishes the terminating connection first so that if the called line is busy the marker can immediately connect the calling line to a busy tone trunk and thus save holding time on equipment.

Before the terminating connection can be set up, the marker has to obtain the equipment location of the called line and the proper ringing combination for ringing the called station on this line. As described above the marker has received the numerical digits of the called number and has registered them in the marker called line number registers shown in Fig. 10. The line equipment location of the called line which has been assigned the particular called number registered in the marker called line number registers is obtained from a number group circuit and is indicated by a line link frame number, a horizontal group, a vertical group and a vertical file in the indicated line link frame. In addition, the marker must also obtain from the number group circuit the correct ringing combination for ringing the called station on the called line.

Figure 19:
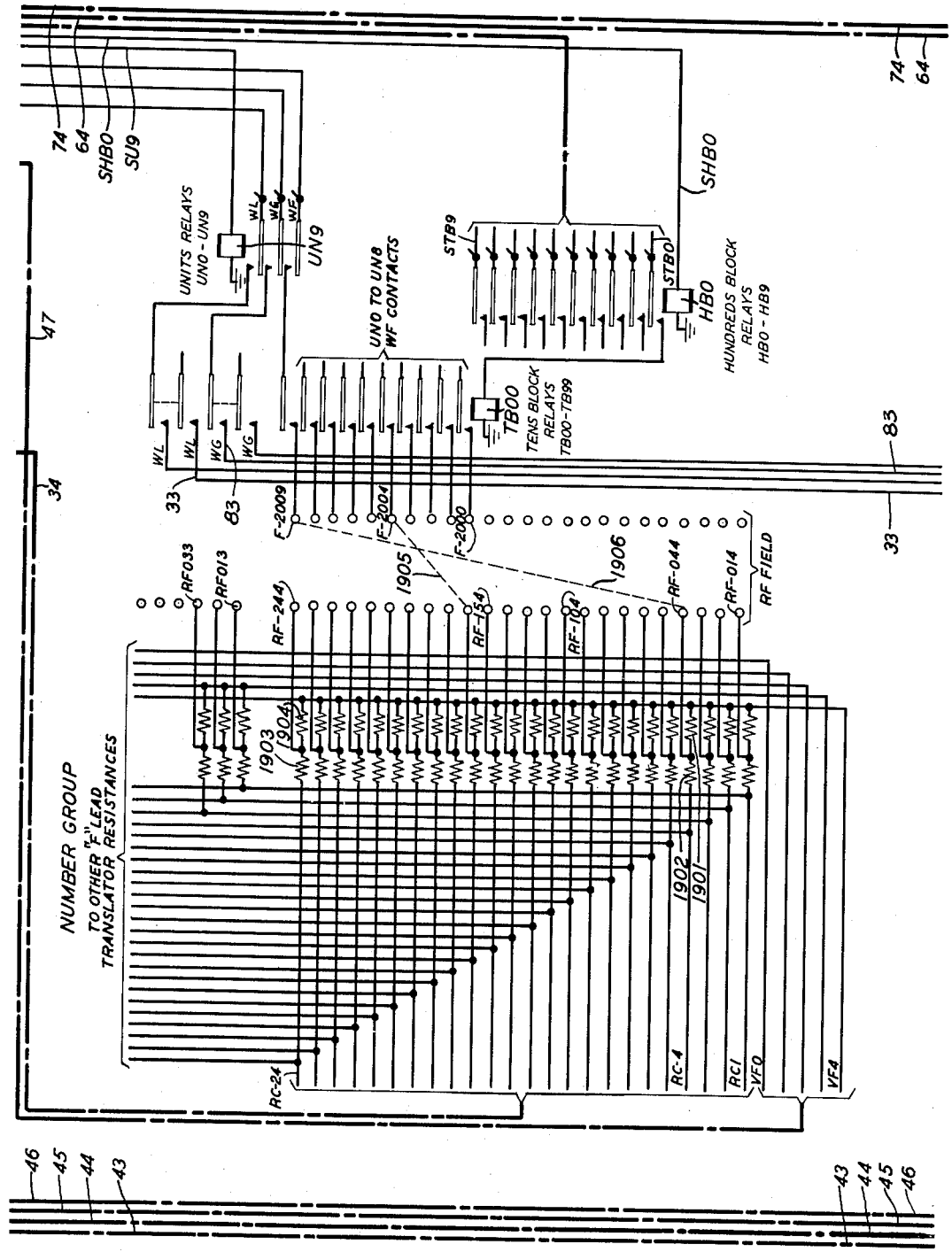
Fig. 19 shows in simplified schematic form a portion of the number group circuit of a crossbar telephone system.
Figure 21:
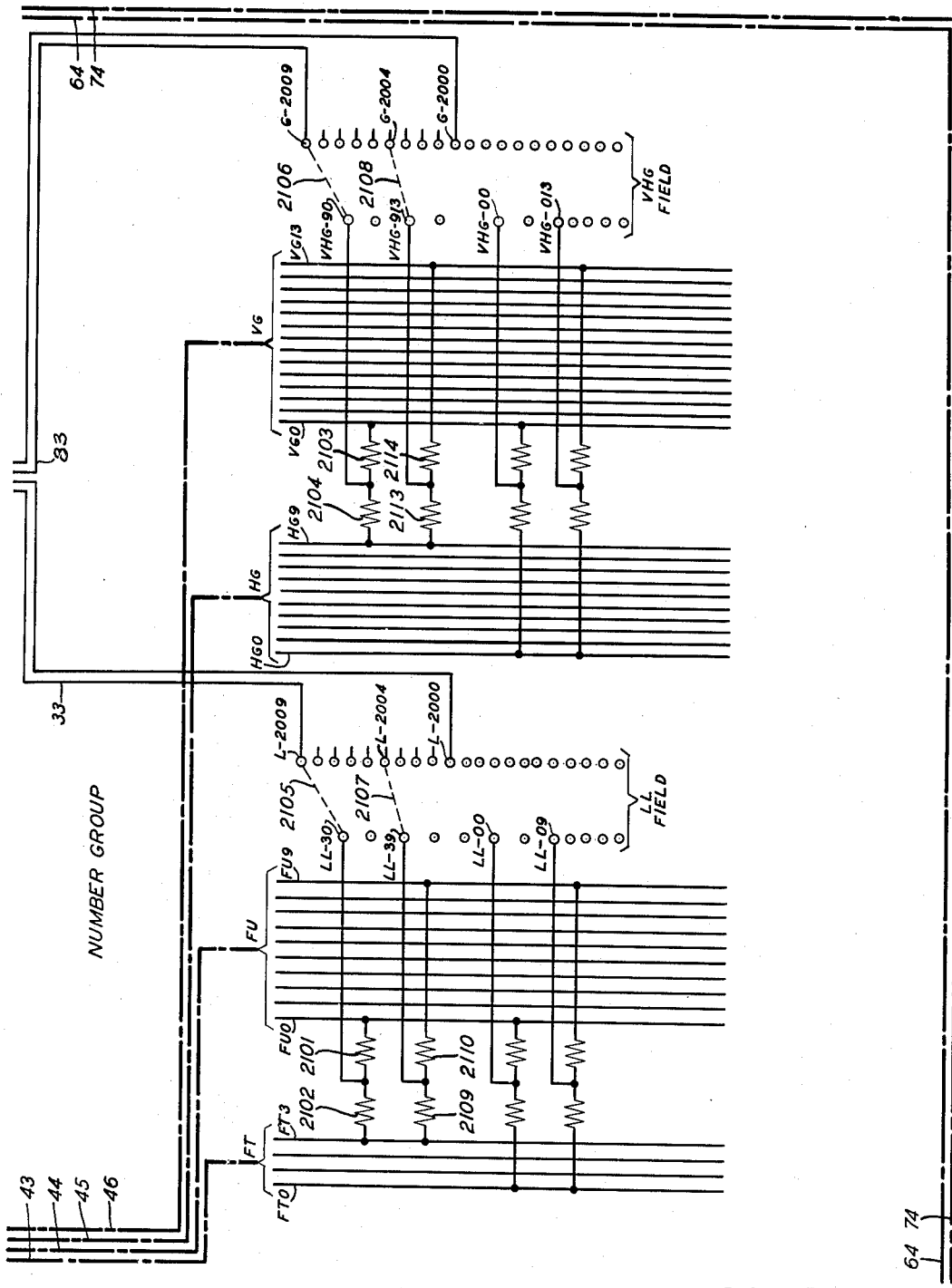
Fig. 21 shows in simplified schematic form the remainder of the number group circuit not shown in Fig. 19.

The number group circuit shown in Figs. 19 and 21 is identical to the number group circuit disclosed and described in the above-cited Busch patent except for the addition of additional ringing code combinations. Number group circuits such as shown in Figs. 19 and 21 are arranged to serve 1000 consecutive directory numbers. The number group circuit has three cross-connecting fields, the LL field shown in Fig. 21 serves to identify the line link frame number in which the called line is located. The RF field shown in Fig. 19 serves to identify the correct ringing combination for signaling the called station on the called line and the number of the vertical file in the indicated line link frame in which the called line is located. The VHG field shown in Fig. 21 serves to identify the number of the vertical and horizontal groups in the indicated line link frame in which the called line is located. Each of these cross-connecting fields consists of an array of 1000 terminals in numerical sequence representing directory numbers and an array of terminals representing specific equipment locations or ringing combinations. Part of the terminals in these cross-connecting fields are shown in Figs. 19 and 21. For example, the RF field in Fig. 19 shows directory number terminals F2000 through F2009 which are the F terminals for directory numbers 2000 through 2009. The RF field of Fig. 19 also shows equipment terminals RF014 through RF244 and RF013 through RF033. These represent respectively, ringing combinations 01 through 24 for vertical file 4 and ringing combinations 01 through 03 for vertical file 3. The VHG field of Fig. 21 shows directory number terminals G2000 through G2009 which are the G terminals for directory numbers 2000 through 2009. The VHG field of Fig. 21 also shows equipment terminal VHG013, VHG00, VHG913 and VHG90. These represent respectively horizontal group 0 and vertical group 13, horizontal group 0 and vertical group 0, horizontal group 9 and vertical group 13, and horizontal group 9 and vertical group 0. The LL field of Fig. 21 shows directory number terminals L2000 through L2009 which are the L terminals for directory numbers 2000 through 2009. The LL field of Fig. 21 also shows equipment terminals LL09, LL00, LL39 and LL30. These represent respectively line link frame 09, 00, 39 and 30.

It will be observed that there are three terminals, an F terminal, a G terminal and an L terminal for each directory number. A translation is accomplished by means of cross-connecting jumpers between the terminals, F, G and L, for a particular directory number to the correct equipment terminals, RF, VHG and LL, which identify the location of the line assigned to that directory number and which indicate the proper ringing combination required for ringing the particular station on this line which has been assigned this directory number. Take for example, directory number 2004, the L terminal of which is cross-connected to equipment terminal LL39 by jumper 2107 in Fig. 21, the G terminal of which is cross-connected to equipment terminal VHG913 by jumper 2108 in Fig. 21 and the F terminal of which is cross-connected to equipment terminal RF154 by jumper 1905 in Fig. 19. This translation indicates that the line which has been assigned to directory number 2004 is located in vertical file 4, vertical group 13, horizontal group 9 in line link frame 39 and that the proper ringing combination for the subscriber assigned this directory number is 15.

For multiparty lines, each party station on a party line will be assigned a different directory number. This means of course that the line equipment location for the directory numbers of all the party stations on the same multiparty line will be identical. However, because the present invention makes possible full selective signaling on multiparty lines, each party station on the same multiparty line will be assigned a different ringing combination.

Because each of the number group circuits serves only 1000 directory numbers, the marker must select the particular number group in which the called subscriber's directory number is located. The choice of the proper number group is dictated by the thousands digit of the called subscriber's directory number which is registered in the marker called line number register relays TH0, TH1, TH2, TH4 and TH7 shown in Fig. 10. The marker gains access to the proper number group in competition with other markers through a number group connector circuit such as that shown in Fig. 15. The particular selected number group is then only concerned with the hundreds, tens and units digits of the called subscriber's number. The marker selects the desired number group such as the number group shown in Figs. 19 and 21 by operating relay SNG shown in Fig. 10. The operation of relay SNG will extend battery through resistance R9, through the operated register relays TH0, TH1, TH2, TH4 and TH7 to one of the ten leads, ST0 through ST9, in cable 24. The particular lead of these ten leads to which this potential is connected will depend upon the registration contained in the relays. For example, if the thousands digit of the called number is a 5, this potential will be applied to lead ST5 in cable 24 and will operate a number group connector similar to that shown in Fig. 15 associated with the number group which serves the directory numbers 5000 to 5999. Assume, however, that the thousands digit of the directory number for the subscriber at station "C" on line 302 is the digit 2, therefore a potential will be applied to lead ST2 in cable 24 from the called line number registers of Fig. 10 and will be extended in cable 24 to the winding of relay MP2 in the number group connector of Fig. 15 which is associated with the number group shown in Figs. 19 and 21.

The marker transmits the hundreds, tens and units digits of the called number as registered in the marker called line number register relay of Fig. 10 to the selected number group connector of Fig. 15 by three sets of ten leads. The first set, leads SHB0 through SHB9 in cable 25, are used to transmit the hundreds digit; the second set, leads STB0 through STB9 in cable 26 are used to transmit the tens digit; and the third set, leads SU0 through SU9 in cable 27 are used to transmit the units digit. The operation in the marker of the SNG relay of Fig. 10 as above described will extend battery through resistance R10 through the operated register relays HN0, HN1, HN2, HN4 and HN7 to one of the ten leads, SHB0 through SHB9, in cable 25. The operation of the SNG relay of Fig. 10 will also extend battery through resistance R11 through the operated register relays TN0, TN1, TN2, TN4 and TN7 to one of the ten leads STB0 through STB9, in cable 26. Similarly relay SNG of Fig. 10 in operating will extend battery through resistance R12, through the operated register relays U0, U1, U2, U4 and U7 to one of the ten leads SU0 through SU9, in cable 27. The particular lead of the ten leads SHB0 through SHB9 in cable 25 to which a potential will be applied will depend upon the registration contained in relays HN0, HN1, HN2, HN4 and HN7. Similarly the particular lead in the ten leads STB0 through STB9 in cable 26 and in the ten leads SU0 through SU9 in cable 27 to which a potential will be applied will depend upon the registration contained in the groups of register relays TN0, TN1, TN2, TN4 and TN7 and U0, U1, U2, U4 and U7 respectively.

Assume now that the directory number of the called subscriber at station "C" on line 302 is 2009 and that these digits are registered in the respective thousands digit, hundreds digit, tens digit and units digit relays of the marker called line number registers of Fig. 10. Because, as described above, the hundreds and tens digits of this number are the digits 00, battery will be applied to lead SHB0 of cable 25 and lead STB0 of a cable 26 to the number group connector shown in Fig. 15. Similarly because the units digit of this number is the digit 9, battery will be applied to lead SU9 of cable 27 to the number group connector shown in Fig. 15.

The potential applied in the marker to lead ST2 in cable 24 which terminates on the winding of relay MP2 in the number group connector of Fig. 15 as described above, will cause the operation of relay MP2. The operation of relay MP2 in the number group connector circuit of Fig. 15 will in turn operate number group connector relays MCA, MCB and MCC shown in Fig. 15. The operation of relays MCA, MCB and MCC will extend the above-described leads from the marker called line number registers of Fig. 10 to the relays of the number group circuit shown in Fig. 19.

The number group circuit shown in Figs. 19 and 21 has ten hundreds block relays HB0 through HB9 and each of the ten leads SHB0 through SHB9 in cable 25 over which the marker transmits the hundreds digit of the called number will be connected to the winding of one of these relays. Only one of these hundreds block relays, relay HB0, is shown in Fig. 19 and is connected to lead SHB0 through front contacts of relay MCB in the number group connector of Fig. 15 via cable 25 to the hundreds digit relays of the marker called line number registers of Fig. 10. Each of the hundreds block relays such as HB0 has ten sets of contacts and the ten leads STB0 through STB9 in cable 26 over which the marker transmits the tens digit of the called number are connected in multiple to the springs of all of the hundreds block relays. The ten front contacts of each hundreds block relay are connected to the windings of 10 tens block relays. In all there are 100 tens block relays TB00 through TB99. Each of the tens block relays thus represents 10 consecutive directory numbers. Tens block relay TB00 shown in detail in Fig. 19 is connected to lead STB0 through contacts of hundreds block relay HB0 and represents the directory numbers 2000 through 2009 inclusive since it is operated only when the number 0 hundreds lead that is lead SHB0 and the number 0 tens, that is lead STB0 have potential on them. Each of the tens block relays has 30 sets of contacts or 3 sets of ten and each set is connected to one of the three arrays of directory number terminals mentioned above.

In addition to the hundreds block relays HB0 through HB9 and the tens block relays TB00 through TB99 described above, the number group circuit shown in Figs. 19 and 21 has ten units relays UN0 through UN9 and the winding of each is connected to one of the ten leads, SU0 through SU9 in cable 27 over which the marker transmits the units digit of the called number. Only one of these relays, relay UN9, is shown in Fig. 19 and is connected to lead SU9 in cable 27. To effect a translation of any directory number the marker applies a potential on three leads, WL, WG and WF, which connect to the number group circuit. The potential is applied through resistance lamp 1101 shown in Fig. 11 and is extended by means of leads WL, WG and WF through fronts contacts of the number group connector relay MCC shown in Fig. 15 to the springs of the number group units relays UN0 through UN9 as shown in Fig. 19. Each of the units relays UN0 through UN9 has three springs and the WL, WG and WF leads from the marker are connected in multiple to the three springs of each relay. From the front contacts of the ten units relays UN0 through UN9 there are thus a total of 30 leads, three from each and these 30 leads are connected in multiple to the thirty springs of each of the tens block relays TB00 through TB99.

When a relay in the hundreds block group, in the tens block group and in the units group of the number group circuit of Fig. 19 are operated in the manner described above, the WL lead from the marker will be extended to an L directory number terminal in the LL field of the number group. Similarly, the WF lead will be extended from the marker to the F terminal of the same directory number in the RF field and the WG lead from the marker will be extended to the G terminal of the same directory number in the VHG field. Of the one thousand terminals in each of the three fields, therefore, only one terminal in each will be connected to the WL, WF and WG leads and thus will have potential on it through the marker resistance lamp 1101, shown in Fig. 11. These terminals will be cross-connected to equipment terminals representing the equipment location and ringing combination by jumpers such as 1905 in Fig. 19, and 2107 and 2108 in Fig. 21.

The number of the line link frame in which the called line is located is indicated to the marker over two sets of leads; a set of four FT leads to indicate the tens digit of the frame number and a set of ten FU leads to indicate the units digit of the frame number, as shown in Fig. 21. By use of a resistance network, such as resistances 2109 and 2110, shown in Fig. 21, it is possible to couple the two pieces of data indicating the frame tens digit and the frame units digit with only one jumper connector. As shown in Fig. 21, battery on the L directory terminal 2004 from the marker will be extended to equipment location terminal LL39 by means of jumper 2107. As a result of this potential current will flow through resistance 2109 out over the FT3 lead to the marker to indicate that the frame tens digit is 3 and current will flow through resistance 2110 over the FU9 lead to the marker to indicate that the frame units digit is 9. An arrangement similar to that above described is used for combining the vertical and horizontal group information. The possible 140 combinations can be accompanied by ten HG leads for horizontal groups and 14 VG leads for the vertical groups. Similarly for vertical file and ringing combination information the 120 possibilities are cared for by 24 RC leads for ringing combinations and 5 VF leads for vertical files.

The FT, FU, HG, VG and VF leads which indicate the location of the called line in terms of line link frame number, horizontal group number, vertical group number and vertical file number return to the marker via the number group connector, shown in Fig. 15. Lead FT0 through FT3 which indicate the frame tens digit are contained in cable 43 from the number group of Fig. 21 to the number group connector of Fig. 15 and are contained in cable 28 from there to the marker called line location registers of Fig. 10. Leads FU0 through FU9 which indicate the frame units digit are contained in cable 44 from the number group to the number group connector and from there in cable 29 to the marker called line location register of Fig. 10. Similarly leads HG0 through HG9 which indicate the horizontal group number, leads VG0 through VG13 which indicate the vertical group number and leads VF0 through VF4 which indicate the vertical file number are contained in cables 45, 46 and 47 respectively from the number group circuit to the number group connector and from there in cables 30, 31 and 32 respectively, to the marker called line location registers of Fig. 10.

The marker called line location registers comprise four frame tens digit identification relays, FTN0 through FTN3 of which FTN0 and FTN3 are shown in Fig. 10. The tens digit of the number of the line link frame in which the called line is located will be registered in these four relays. The marker called line location registers have ten frame units digit identification relays FUN0 through FUN9 of which FUN0, FUN7 and FUN9 are shown in Fig. 10 and are used to register the units digit of the number of the line link frame in which the called line is located. There are also ten horizontal group identification relays in the marker called line loation registers. These relays are designated HGN0 through HGN9 of which HGN0, HGN7 and HGN9 are shown in Fig. 10 and are used to register the horizontal group number in the indicated line link frame in which the called line is located. Similarly, the marker called line location registers contain fourteen vertical group identification relays, VGN0 through VGN13 of which VGN0, VGN10 and VGN13 are shown in Fig. 10 and are used to register the vertical group number in the indicated line link frame in which the called line is located. The marker called line location registers also have five vertical file identification relays, VFN0 through VFN4 of which VFN0 and VFN4 are shown in Fig. 10 and are used to register the vertical file number in the indicated line link frame in which the called line is located. The equipment location of the called line, which is obtained from the number group shown in Figs. 19 and 21 is registered in above-described marker called line location registers.

The marker also has a group of ringing combination register relays RCT1 through RCT24 shown in Fig. 11 in which the proper ringing combination for signaling the called station is registered. This ringing combination is obtained from the number group circuit, shown in Fig. 19 by way of leads RC1 through RC24 in cable 34 to the number group connector of Fig. 15 and leads RC1 through RC24 in cable 42 from the number group connector to the marker ringing combination register relays of Fig. 11. This ringing combination will be used subsequently by the marker for operating the ringing selection switch, shown in Fig. 14 to select the particular audio frequency signal which corresponds to the tuned frequency of the vibratory element at called station "C" on line 302. This enables the marker to select the proper audio frequency signal for ringing the called subscriber.

The operation of the number group circuit of Figs. 19 and 21 and the number group connector of Fig. 15 will now be specifically described as they function to determine the equipment location of called line 302 and the proper ringing combination for signaling called station "C" on line 302. As assumed above, the directory number for called station "C" on line 302 is the number 2009. In the manner hereinbefore described, this number has been registered in the marker called line number registers of Fig. 10 by the originating register of Fig. 6. The translation of the called subscriber's directory number, 2009, as registered with the marker called line number registers of Fig. 10 into line equipment location and ringing combination by the number group circuit of Figs. 19 and 21 and the registration of this information in the marker called line location registers and the marker ringing combination registers will be described. Because the thousands digit of the called number is the digit 2, battery will be applied through front contacts of operated SNG relay of Fig. 10 in the marker as described hereinbefore, through the thousands digit relays TH0, TH1, TH2, TH4 and TH7 of the marker called line number registers to lead ST2 in cable 24. Lead ST2 is extended by cable 24 to relay MP2 in number group connector of Fig. 15. Relay MP2 in Fig. 15 will operate in response to the battery on lead ST2 and will in turn operate relays MCA, MCB and MCC in the number group connector of Fig. 15 which will extend the leads from the hundreds, tens and units relays of the marker called line number registers to the number group circuit of Figs. 19 and 21. The operation of relay MCC of Fig. 15 will also extend the WL, WG and WF leads from the marker resistance lamp 1101 of Fig. 11 to the number group circuit of Figs. 19 and 21. The hundreds digit 0 of called number 2009 will, as above described, cause a potential to be applied through front contacts of the operated SNG relay of Fig. 10 in the marker, through the hundreds digit identification relays HN0, HN1, HN2, HN4 and HN7 of the marker called line number registers to the SHB0 lead in cable 25. This battery on lead SHB0 in cable 25 will be extended through front ontacts of relay MCB of the number group connector of Fig. 15 to the hundreds block relay HB0 of the number group shown in Fig. 19. This potential will operate hundreds block HB0. The tens digit 0 of the called number 2009 will, as above described, cause a potential to be applied through front contacts of the operated SNG relay of Fig. 10 in the marker, through the tens digit identification relays TN0, TN1, TN2, TN4 and TN7 of the marker called line number registers to the STB0 lead in cable 26. Ths battery on lead STB0 in cable 26 will be extended through the front contacts of relay MCB of the number group connector of Fig. 15, through front contacts of operated hundreds block relay HB0 of Fig. 19 in the number group circuit, to tens block relay TB00 and cause the operation of this relay. The units digit 9 of the called number 2009 will, as above described, cause a potential to be applied through front contacts of operated SNG relay of Fig. 10 in the marker, through the unit identification relays U0, U1, U2, U4 and U7 of the marker called line number registers to lead SU9 in cable 27. The potential on lead SU9 in cable 27 will be extended through front contacts of relay MCA in the number group connector of Fig. 15 to units relay UN9 of the number group circuit in Fig. 19 and cause the operation of this relay. The operation of units relay UN9 will extend the WL, WG and WF leads from the marker resistance lamp 1101 and battery through to the 2209 directory terminal in the LL, VHG and RF fields of the number group. The potential on the WL lead from the marker will be extended through front contacts of units relay UN9 of Fig. 19 over conductor 33 to directory terminal number L2009 in the LL field, and then by jumper 2105 to equipment terminal LL30. When this potential is applied to equipment terminal LL30, current will flow through resistance 2102 over lead FT3 in cable 43, through front contacts of relay MCA in the number group connector of Fig. 15, via lead FT3 in cable 28 to the frame tens digit identification relays FTN0 through FTN4 of the marker called line location registers and will cause the operation of these relays to register the frame tens digit (in this case the digit 3) of the number of the line link frame in which called line 302 is located. Current flow through resistance 2101 as a result of potential applied to equipment terminal LL30 will be extended over lead FU0 in cable 44, through front contacts of relay MCA in the number group connector of Fig. 15, via lead FU0 in cable 29 to the units digit identification relays FUN0 through FUN4 of the marker called line location registers and will cause the operation of these relays to register the units digit (in this case the digit 0) of the number of the line link frame in which called line 302 is located.

Potential on lead WG from the marker will be extended through contacts of units relay UN9 in the number group, over conductor 83 to directory number terminal G2009 in the VHG field and then to equipment terminal VHG90 via jumper 2106. When this potential is applied to equipment terminal VHG90 current will flow through resistance 2104 over lead HG9 in cable 45, through front contacts of relay MCC in the number group connector of Fig. 15, via lead HG9 in cable 30 to the horizontal group identification relays HGN0 through HGN9 of the marker called line location registers of Fig. 10 and will cause the operation of these relays to register the number of the horizontal group (in this case 9) in line link frame 30 in which the called line 302 is located. Current flow through the resistance 2103 as a result of the potential applied to equipment terminal VHG90 will be extended over lead VG0 in cable 46, through front contacts of relay MCC in the number group connector of Fig. 15, via lead VG0 in cable 31 to the vertical group identification relays VGN0 through VGN13 of the marker called line location registers and will cause the operation of these relays to register the number of the vertical group (in this case 0) in line link frame 30 in which called line 302 is located.

The potential on the WF lead from the marker will be extended through front contacts of units relay UN9 of Fig. 19 in the number group, through front contacts of tens block relay TB00 of the number group, to the directory number terminal F2009 in the FR field and then via jumper 1906 to equipment terminal RF044. When this potential is applied to equipment terminal RF044 current will flow through resistance 1902 over lead RC4 in cable 34 through front contacts of relay MCC in the number group connector of Fig. 15 and via lead RC4 in cable 42, through winding of the marker ringing combination register relay RCT4 of Fig. 11 to off-normal ground. Relay RCT4 operates and locks operated to the same off-normal ground, shown in Fig. 11. The operation of relay RCT4 registers the ringing combination which will be required for operating the ringing selection switch of Fig. 14 to select the proper ringing frequency for signaling the called party at station "C" on line 302. The potential on equipment terminal RF044 in Fig. 19 will cause current to flow through resistance 1901 over lead VF4 in cable 47, through front contacts of relay MCC in the number group connector of Fig. 15, via lead VF4 in cable 32 to the vertical file identification relays VFN0 through VFN4 of the marker called line location registers in Fig. 10 and will operate these relays to register the number of the vertical file (in this case 4) in line link frame 30 in which called line 302 is located.

In the manner above described, the marker has obtained the equipment location of the line assigned to the called subscriber at station "C" and the proper ringing combination required for signaling this station. The marker may now proceed to establish the intraoffice call.

Figure 17:
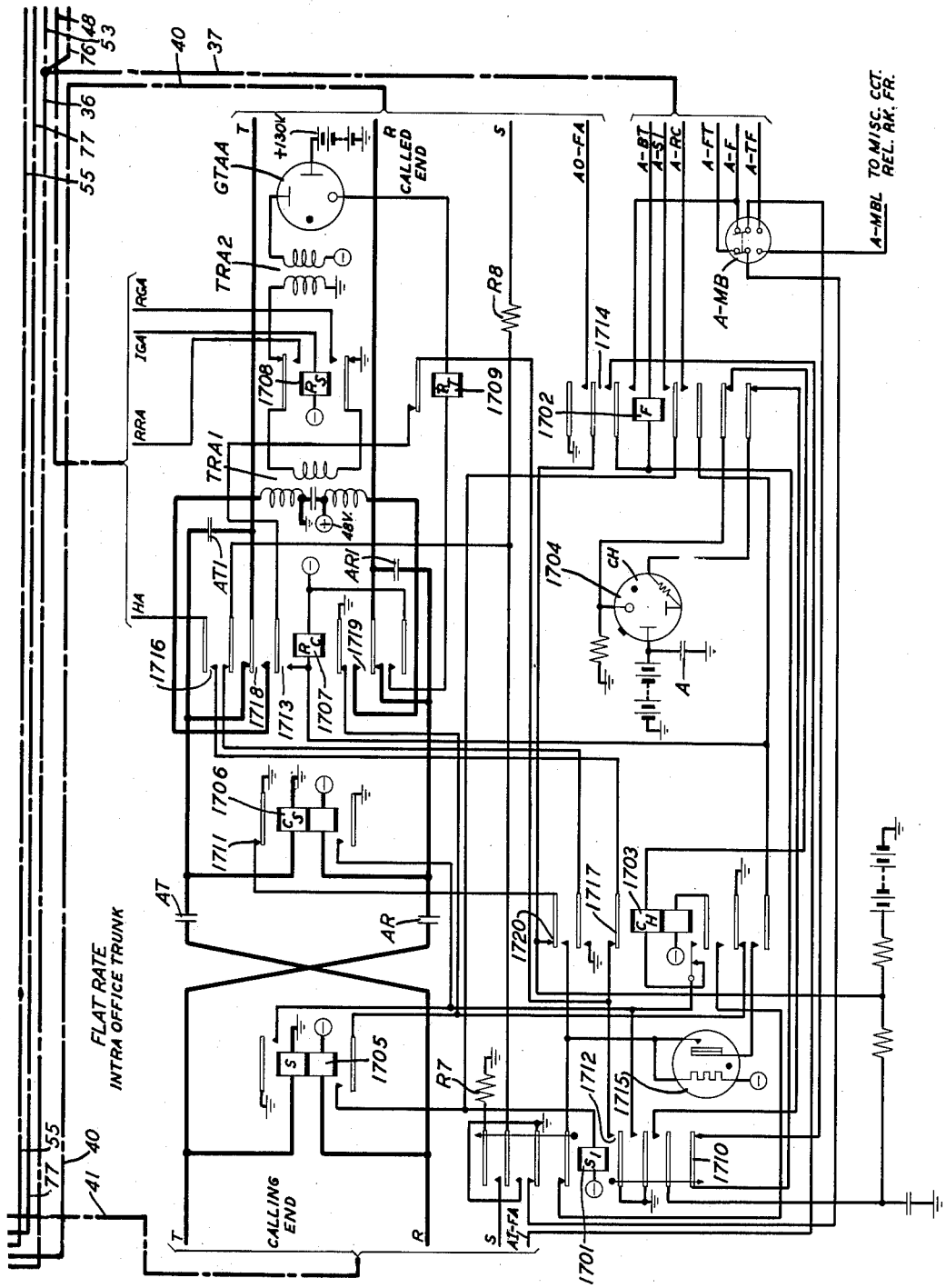
Fig. 17 shows in schematic form a flat rate intra-office trunk.

While the marker is obtaining the called line location and ringing combination from the number group, as above described, it is also selecting an idle flat-rate intraoffice trunk, such as the trunk shown in Fig. 17, which terminates on an idle trunk link frame, such as trunk link frame 312 shown in Fig. 3. The ground applied to the marker switch operating circuits 903 shown in Fig. 9 via lead 911 as above described, will initiate the flat-rate intraoffice trunk selection circuits of the marker. The selection of the flat-rate intraoffice trunk of Fig. 17 is made by the marker switch operating circuits 903 over a selecting path comprising cable 35, cable 2, trunk link connector 313, cable 36 and cable 37 to the flat-rate intraoffice trunk shown in Fig. 17. There is a frame test lead for each trunk link frame on which flat-rate intraoffice trunks appear. This FT lead such as lead A-FT for the trunk of Fig. 17 and an F lead such as lead A-F for the trunk of Fig. 17 which will be discussed below, are multipled between trunks in a cross-connecting field on the trunk link frame. Each idle trunk, such as the trunk shown in Fig. 17, supplies ground to the FT lead, lead A-FT for the trunk of Fig. 17, through normally closed contacts of relay 1701 and make busy switch A-MB as shown in Fig. 17. The ground on the A-FT lead is extended to the marker switch operating circuits 903 of Fig. 9, via the selecting path traced above. The marker knows that there is at least one idle flat-rate intraoffice trunk on each trunk link frame which has a grounded FT lead. The marker selects one of the trunk link frames, such as trunk link frame 312, with available trunks and supplies a ground via the selecting path traced above on the A-F lead in cable 37 to the trunk. Ground on the A-F lead from the marker via cable 37 will be extended to the left-hand terminal of the winding of relay 1702 in the flat-rate intraoffice trunk of Fig. 17, through normally closed contacts of the make busy switch A-MB and back contacts 1710 of relay 1701. The marker selects the flat-rate intraoffice trunk of Fig. 17 by supplying battery over the selecting path traced above on the A-BT lead in cable 37 to operate relay 1702. Relay 1702 locks operated to the ground on the A-F lead in cable 37 from the marker via the selecting path traced above.

Relay 1702 in operating supplies ground to two FA leads to the trunk link circuit, the calling end FA lead in cable 41 designated AI-FA for the trunk of Fig. 17 and the called end FA lead in cable 40 designated AO-FA for the trunk of Fig. 17. The ground supplied to the calling end AI-FA lead is obtained through normally closed back contacts 1711 of relay 1706, back contacts 1720 of relay 1703 and front contacts 1714 of relay 1702 to insure that these contacts are closed before the marker sets up the connection on this trunk. The ground on leads AI-FA and AO-FA cause the trunk link circuit to perform the necessary functions in conjunction with the marker to set up the connection between the subscribers at station "A" on line 301 and station "C" on line 302. The two sleeve leads, that is the calling end S lead and called end S lead, are transferred to the marker for testing. The tip and ring leads of the calling end and called end of the trunk of Fig. 17 are transferred to the marker for a continuity check to the subscribers' lines. The A–S1 lead in cable 37 is extended from ground in the marker via the selecting path traced above through front contacts in relay 1702 to the winding of relay 1701 in the trunk of Fig. 17 and operates relay 1701. Relay 1701 in operating makes the trunk busy by opening the A–F lead and removes the ground from the A–FT lead. Relay 1701 in operating also supplies 10-ohm ground to the calling end sleeve lead through resistance R7 and 10-ohm ground to the called end sleeve lead through resistance R8 to hold the hold magnets operated and thus maintain the connection between the called subscriber's line and the calling subscriber's line.

After the marker receives the equipment location of called line 302 from the number group circuit of Figs. 19 and 21, as above described, and registers this information in the marker called line location registers of Fig. 10, and during the time it is selecting an idle flat-rate intraoffice trunk, such as the trunk shown in Fig. 17, as above described, it compares the equipment location of calling line 301, which it received from the originating register of Fig. 6 and registered in the marker calling line location registers shown in Fig. 10 with the equipment location of called line 302 which is registered in the marker called line location registers also shown in Fig. 10. If these two equipment locations differ, the marker knows that it may proceed to complete the intraoffice call over the selected flat-rate intraoffice trunk. However, as will be explained later, if the calling line and called line equipment locations are the same, the marker will release the selected flat-rate intraoffice trunk and will proceed to establish a reverting call. The way the marker compares the called line and calling line equipment locations is shown schematically in Fig. 10. After both locations are registered in their respective registers, shown in Fig. 10, a continuity check is made through the operated called line location register relays and the operated calling line location register relays. If the registration in both sets of registers is the same, ground will be supplied from a front contact of the called line location register relay FTN0 through all of the operated relays in both groups of registers to the winding of the RV relay of Fig. 10. Therefore, if the called line equipment location and the calling line equipment location are the same, relay RV in Fig. 10 will be operated and will cause the marker to release the selected intraoffice trunk and proceed to establish a reverting call as will be described hereinafter. Under the assumed conditions however, the calling subscriber, that is station "A" on line 301, and called subscriber, station "C" on line 302, are on different lines and, therefore, the registration of the two equipment locations for the calling line and the called line in the registers of Fig. 10 will not be the same and relay RV will not be operated. After making this comparison, the marker knows that it may proceed with the establishment of the terminating and originating connections to the selected flat-rate intraoffice trunk.

The marker can proceed with the establishment of the terminating connection between called line 302 and the selected flat-rate intraoffice trunk of Fig. 17 because it has obtained the line equipment location of called line 302 from the number group of Figs. 19 and 21. The marker determines from the information recorded in the called line location registers of Fig. 10 that called line 302 is located on line link frame 306, shown in Fig. 3. The marker switch operating circuits 903 of Fig. 9 will operate in conjunction with the marker called line location register relays of Fig. 10 to seize this line link frame via cable 38, cable 3 and line link connector 308 from the marker switch operating circuits 903 and cable 51, cable 3 and line link connector 308 from the called line location register of Fig. 10. The marker tests called line 302 for a busy condition and if line 302 is not busy, the marker establishes the terminating connection between the "out" appearance or called end of the flat-rate intraoffice trunk shown in Fig. 17, and called line 302 on line link frame 306. The terminating connection is completed over an idle channel, such as channel 39 shown in Fig. 3, between line link frame 306 and trunk link frame 312 and cable 40 to the flat-rate intraoffice trunk of Fig. 17. After the terminating connection is established, the marker proceeds to set up the originating connection between calling line 301 and the "in" appearance or calling end of the flat-rate intraoffice trunk shown in Fig. 17. From the equipment location information of calling line 301 as registered in the marker calling line location registers of Fig. 10, the marker determines that calling line 301 is located on line link frame 303. The marker switch operating circuit 903 of Fig. 9 will operate in conjunction with the marker calling line location register of Fig. 10 to seize line link frame 303 via cable 38, cable 3 and line link connector 305 from the marker switch operating circuits 903 and cable 82, cable 3 and line link connector 305 from the marker calling line location registers of Fig. 10. Before the marker releases the dialing connection, which was established through channel 10, as described above in connection with the establishment of the dialing connection, it determines whether there is an idle channel, such as channel 40, between line link frame 303 and trunk link frame 312. If there is an idle channel, such as channel 40 in Fig. 3, the dialing connection is released immediately enabling the marker to use the dialing connection line link as part of the originating connection, if necessary. The marker has received from the originating register the identity of this line link used in the dial tone connection. The connection between calling line 301, which terminates on line link frame 303 and the calling end or "in" appearance of the flat-rate intraoffice trunk of Fig. 17 is completed over channel 40 between line link frame 303 and trunk link frame 312 and cable 41 to the calling end of the flat-rate intraoffice trunk, shown in Fig. 17. After the marker has selected the flat-rate intraoffice trunk in Fig. 17 as described above, it will supply a ground on the A–RC lead in cable 37 from the marker switch operating circuits 903 over the selecting path traced above to the winding of relay 1707 in the trunk circuit of Fig. 17. Relay 1707 in operating locks operated to ground supplied through the front contacts 1712 of relay 1701 over a path traced from battery through the winding of relay 1707, through front contacts 1713 of relay 1707, through back contacts of tripping relay 1709, through front contacts 1712 of relay 1701 to ground.

Figure 14:
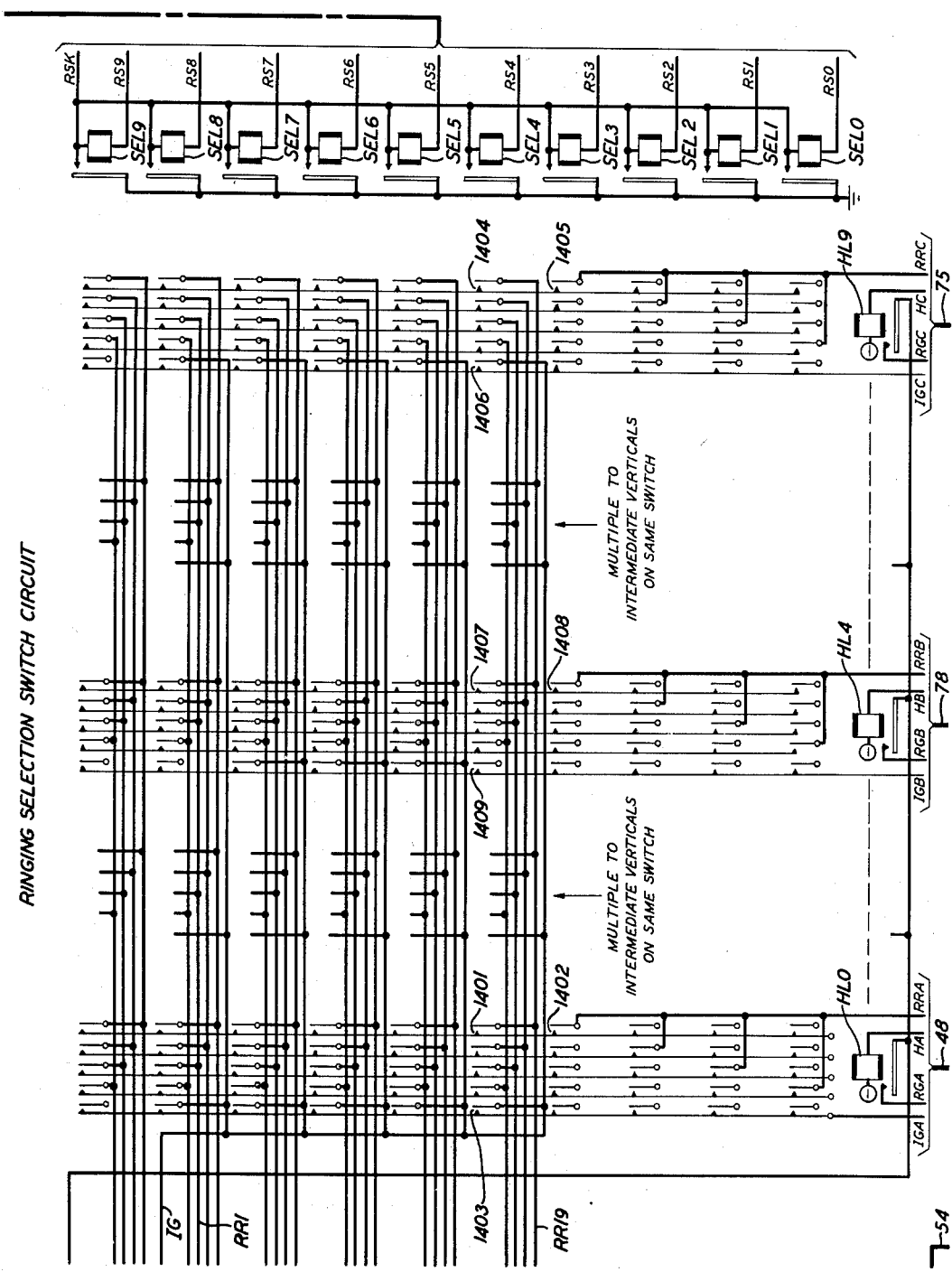
Fig. 14 shows in schematic form the ringing selection switch circuit of a crossbar telephone system.

The marker is now ready to operate the ringing selection switch circuit of Fig. 14 in accordance with a ringing combination which it received, as described above, from the number group circuit of Figs. 19 and 21 and registered in the marker ringing combination register relay RCT4 shown in Fig. 11.

The ringing selection switch circuit of Fig. 14 comprises a crossbar switch circuit which is common to a group of trunks. The verticals of the switch are allocated to several trunk circuits to which the circuit is common and the select magnets are selectively operated by the marker. The operation of any two of the ten select magnets SEL0 through SEL9 will cause a selected ringing combination to be applied to any trunk which has operated its associated hold magnet in the ringing selection switch. The ringing selection switch is described in the above-cited Busch patent and in still more detail in the Patent 2,535,675 issued to M. C. Goddard December 26, 1950. The ringing selection switch disclosed in the Busch and Goddard patents has been modified to provide the required ringing combinations for the various parties on the multiparty lines of the telephone system of the present invention.

37

Figure 13:
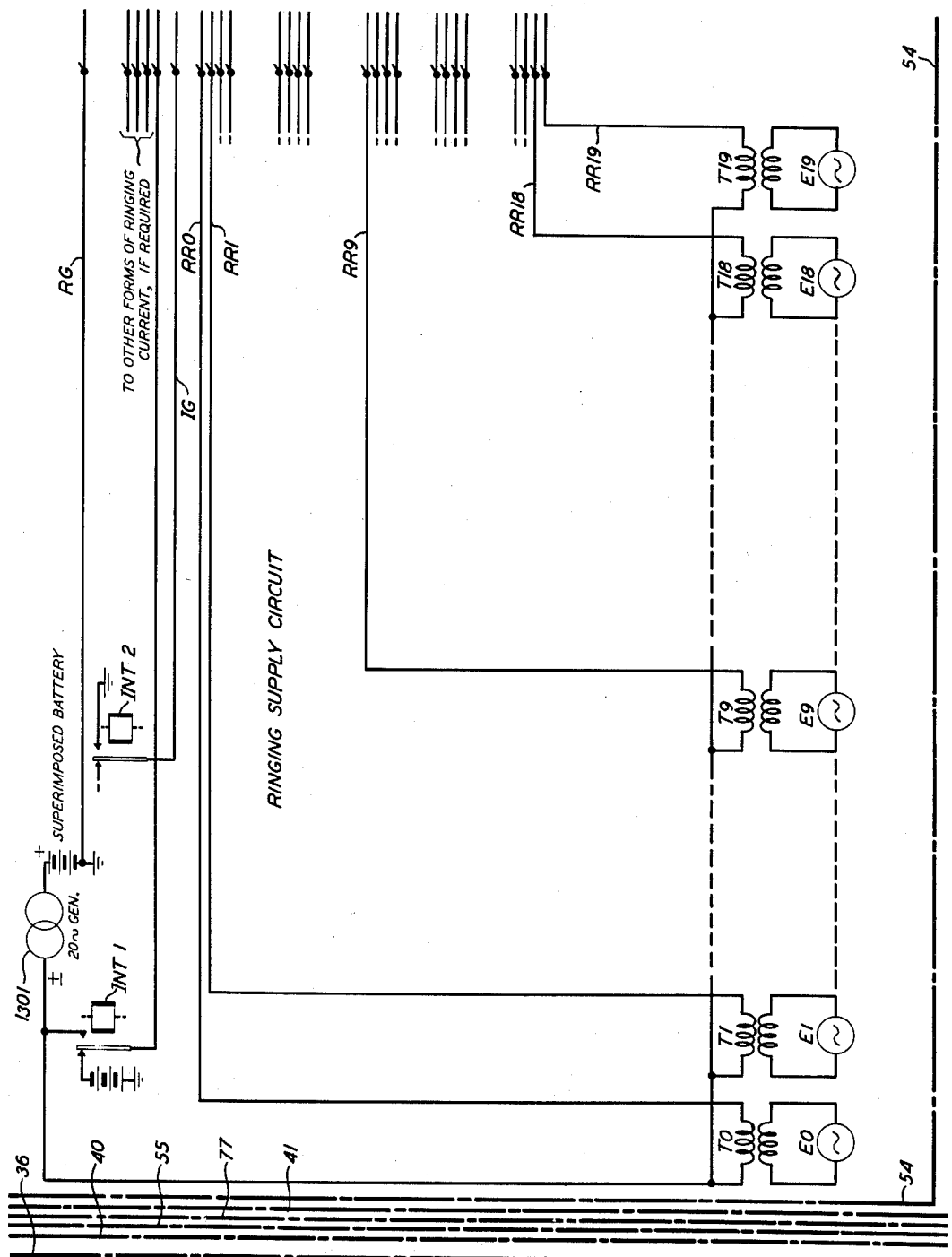
Fig. 13 shows in schematic form the ringing supply circuit of a crossbar telephone system.

The ringing supply circuit of Fig. 13 is the source of the ringing signals required for signaling the stations on the multiparty lines. This circuit comprises a 20-cycle signal generator 1301 which furnishes a relatively high potential 20-cycle alternating-current signal. In addition, the ringing supply circuit contains 20 audio frequency tone generators E0 through E19. These tone generators may be vacuum tube oscillators, motor-driven tone wheels or any other frequency generating means. Each of the tone generators E0 through E19 generates a different audio frequency signal and the frequency of each will correspond to the tuned frequency of a different one of the tuned vibratory elements in the subscribers' stations connected to any party line of the telephone system. Because in the specific embodiment described herein provision is made for 20 parties on a single multiparty line, the ringing supply circuit of Fig. 13 has 20 audio frequency generating sources. The output of each of the tone generators E0 through E19 is fed into the primary winding of an associate transformer T0 through T19. The output of 20-cycle signal generator 1301 is fed into the secondary windings of all of the transformers T0 through T19. In this manner the audio frequency signal generated by a particular tone generator is superimposed upon the 20-cycle alternating-current signal obtained from the 20-cycle signal generator 1301. The combined result at the output on secondary winding of each of the transformers T0 through T19 is therefore a 20-cycle alternating-current signal having superimposed thereon a lower potential audio frequency signal. These outputs are fed to the ringing selection switch of Fig. 14 over leads RR0 through RR19. The ground from the ringing supply is fed to the ringing selection switch over lead RG. In addition to the above components the ringing supply circuit of Fig. 13 also contains two interrupters INT1 and INT2. Interrupter INT2 supplies interrupted ground to the ringing selection switch of Fig. 14 over lead IG. The marker now proceeds to operate two of the select magnets SEL0 through SEL9 in the ringing selection switch of Fig. 14 in accordance with the ringing combination which it received from the number group circuit and registered in ringing combination register relay RCT4 of Fig. 11. The operation of relay RCT4 as above described will ground 2 of the 10 leads RS0 through RS9 in cable 49. In this case the operation of relay RCT4 will place a gound on leads RS4 and RS3. These leads are extended via cable 49, cable 2, trunk link connector 313, and cable 50 to the select magnets SEL0 through SEL9 of the ringing selection switch of Fig. 14. Trunk link connector 313 supplies battery on the RSK lead of cable 50 to the windings of all of the select magnets SEL0 through SEL9 and the select magnets in this group which have ground connected to their associated leads RS0 through RS9 will be operated. Because the operation of relay RCT4 of Fig. 11 placed a ground on leads RS4 and RS3 as above described, select magnets SEL3 and SEL4 in the ringing selection switch of Fig. 14 will be operated.

The operation of relay 1707 in the flat-rate intraoffice trunk of Fig. 17 in response to ground on lead A-RC in cable 37 from the marker as above described will close a circuit through front contacts 1716 of relay 1707 for the application of ground to lead HA in cable 48 to the ringing selection switch of Fig. 14. The closure of front contacts 1716 of relay 1707 as above described will cause the operation of hold magnet HL0 in the ringing selection switch of Fig. 14 which is connected from battery to lead HA in cable 48. The circuit for the operation of hold magnet HL0 in the ringing selection switch of Fig. 14 may be traced from ground through front contacts 1712 of relay 1701, through back contacts 1717 of relay 1703, through front contacts 1716 of relay 1707, over lead HA in cable 48, through the winding of hold magnet HL0 in the ringing selection switch of Fig. 14 to battery. The operation of hold magnet HL0 in the ringing selection switch of Fig. 14 will complete a circuit for the ringing

38 ground supply over lead RG from the ringing supply circuit of Fig. 13 through front contacts of hold magnet HL0, over lead RGA in cable 48, to the lower front contact of relay 1708 in the flat-rate intraoffice trunk in Fig. 17. The operation of the select magnets SEL3 and SEL4 as above described completes a circuit for the application of a ringing signal on lead RRA in cable 48 to the flat-rate intraoffice trunk of Fig. 17 as will be described below.

When the marker has completed its functions for this call it will release relay 1702 in the flat-rate intraoffice trunk of Fig. 17. The release relay 1702 will open leads A-F, A-S1 and A-RC which extend to the marker via cable 37 and the selecting path traced above. The opening of the A-S1 lead opens the operating circuit for relay 1701, however relay 1701 does not release at this time as it is a slow release relay. The opening of the A-RC lead opens the operating circuit for relay 1707, however relay 1707 does not release as it is locked operated under control of tripping relay 1709 as described above. The release of relay 1702 of Fig. 17 will also remove ground from lead AI-FA in cable 41 and lead AO-FA in cable 40 to the trunk link circuit. The removal of ground from these two leads, that is, leads AI-FA and AO-FA, will cause the trunk link circuit to complete the connections between the calling subscriber at station "A" on line 301 and called subscriber at station "C" on line 302 to the flat-rate intraoffice trunk of Fig. 17. Upon the completion of the connection between station "A" on line 301 and the intraoffice trunk of Fig. 17 as above described, relay 1705 in the trunk will operate over the subscriber's loop to station "A." Relay 1705 in operating will reestablish a circuit to hold relay 1701 operated which, as described above, lost its operating path when relay 1702 released. Relay 1701 is slow in releasing and will hold over this interval.

When the marker has completed its functions for this call it also releases itself, the originating register, the party station identifier and the associated connectors from the connection. The dialing connection is thus disengaged and the subscribers at station "A" on line 301 and station "C" on line 302 are interconnected through the flat-rate intraoffice trunk of Fig. 17 and channels 39 and 40 of Fig. 3. The intraoffice trunk of Fig. 17 now controls the ringing and supervision of the call.

The operation, as above described, of the two select magnets SEL3 and SEL4 in the ringing selection switch of Fig. 14 has selected a particular ringing signal which has an audio frequency component corresponding to the frequency of the vibratory element in called station "C" on line 302. In this particular case the operation of the two select magnets SEL3 and SEL4 has completed a circuit from the secondary winding of transformer T19 in the ringing supply circuit of Fig. 13, over lead RR19, through crosspoint contacts 1401 and 1402 in the ringing selection switch of Fig. 14, over lead RRA in cable 48 to the upper front contact of relay 1708 in the flat-rate intraoffice trunk of Fig. 17. As above described the operation of hold magnet HL0 in Fig. 14 completed a circuit from the ringing ground lead RG in the ringing supply circuit of Fig. 13 to the lower front contact of relay 1708. The operation of interrupter INT2 in the ringing supply circuit of Fig. 13 will connect a ground over lead IG, through crosspoint contacts 1403 of the ringing selection switch, over lead IGA in cable 48, to the flat-rate intraoffice trunk of Fig. 17. Ground on lead IGA in cable 48 will cause the operation of relay 1708 in the trunk circuit. Relay 1708 in operating will complete a circuit from the primary winding of transformer TRA1 in Fig. 17 to the RRA and RGA leads in cable 48. In this manner the selected ringing signal which comprises a 20-cycle alternating-current signal having superimposed thereon a selected audio frequency signal is applied to the primary winding of transformer TRA1. The secondary windings of transformer TRA1 are connected to the tip and ring conductors of called line 302. The connection to the tip conductor may be traced from ground through the upper secondary winding of transformer TRA1 through front contacts 1718 of relay 1707, to the tip conductor of the called line. The connection to the ring conductor of the called line may be traced from positive battery through the lower secondary winding of transformer TRA1, through front contacts 1719 of relay 1707 to the ring conductor of the called line. The ringing signal is therefore applied to the ring conductor of the called line in series with a positively poled battery. This ringing signal is applied for two seconds and is off for four seconds. Interrupter INT2 in the ringing supply circuit of Fig. 13 will operate at this rate in order to provide a two-second ringing interval and a four-second silent interval. After the ringing interval is completed, interrupter INT2 in the ringing supply circuit of Fig. 13 releases and remains released for a four-second interval. The release of interrupter INT2 will remove ground from lead IGA in cable 48 which will release relay 1708. The release of relay 1708 will complete a circuit from ground through the primary winding of transformer TRA2, through the upper back contacts of relay 1708, through the primary winding (which is utilized as a secondary winding now) of transformer TRA1, through the lower back contacts of relay 1708 to ground.

As described hereinbefore the presence of the audio frequency component of the ringing signal applied to line 302 in coil P at station "C" causes vibratory element V in station "C" to vibrate and intermittently close vibratile contact X. As soon as vibratile contact X at station "C" closes, the positively poled 20-cycle ringing signal on the ring conductor of line 302 is connected to the control anode CA of gas tube GT in the subscriber's set at station "C" and will initiate a discharge through the tube. Current flowing through the main gap of gas tube GT in the subset at station "C" resulting from the breakdown of this tube will operate ringer RNG which is connected in series with the main gap of tube across the tip and ring conductors of line 302. The operation of ringer RNG during the two-second ringing interval will signal the called subscriber at station "C." The ringers at the other subscribers' stations on line 302, such as station "D" for example, will not be operated, because the audio frequency signal required for energizing their vibratory elements has not been supplied to line 302 by the ringing selection switch of Fig. 14.

As hereinbefore described when the subscriber at station "C" lifts his handset to answer the call, switchhook contacts SH in his subset will convert the reed type selector in the subset to a self-driven buzzer or oscillator which will be sustained in oscillation by the positively poled battery on the ring conductor of line 302 from the lower secondary winding of transformer TRA1 in the flat-rate intraoffice trunk of Fig. 17. If the subscriber at station "C" on line 302 should answer the call during the two-second ringing interval, vibratory element V in his subset will be vibrating and the reed type selector in his subset will be converted into a sustained buzzer which will continue vibrating during the ensuing four-second silent interval. While acting as a self-driven buzzer, vibratory element V interrupts the positively poled line battery at a rate determined by its natural frequency and coil P and associated condenser K in the subset act as a filter so that this interrupted battery signal is applied back on line 302 as substantially a sine wave of the vibratory element frequency. This signal will be applied through the secondary windings of transformer TRA1 in the trunk circuit of Fig. 17 and induced into the primary winding of this transformer. This induced signal in the primary winding of transformer TRA1 is in turn fed into the primary winding of transformer TRA2 in Fig. 17 where it is stepped up and applied to the control anode of gas tube GTAA in the trunk circuit.

When this signal is applied to the control anode of gas tube GTAA it causes the tube to ionize and conduct current through the winding of tripping relay 1709. Tripping relay 1709 operates in response to the discharge in gas tube GTAA and opens the locking circuit for relay 1707. Relay 1707 releases and in turn opens the operating circuit for hold magnet HL0 in the ringing selection switch circuit of Fig. 14. The operation of tripping relay 1709 and the subsequent release of relay 1707 will remove ringing current from the tip and ring conductors of called line 302 and complete a connection through the windings of relay 1706 over the tip and ring conductors of the called line to the called subscriber. Relay 1706 furnishes talking battery to the called subscriber through its windings and operates over the called subscriber's loop. The release of relay 1707 also completes the talking connection between the tip and ring conductors of line 301 from the calling subscriber at station "A" and the tip and ring conductors of line 302 to the called subscriber at station "C" through condensers AT and AR. The call will then be under the control of the supervisory relays in the flat-rate intraoffice trunk of Fig. 17 as is described in detail in the above-cited Busch patent.

If the subscriber at station "C" on line 302 answers the call during the four-second silent interval, the vibratory element V in his subset may or may not be vibrating depending upon the elapsed time after termination of the preceding ringing interval. If vibratory element V is not vibrating sufficiently to close vibratile contact X in the subset at station "C," ringing current will be applied to line 302 during the next succeeding ringing interval in the same manner as above described. During this ringing interval the subscriber at station "C" will hear a very reduced volume of ringing tone due to the high impedance of varistor VR to the positively poled ringing current. During this succeeding ringing interval the vibratory element V at station "C" is caused to vibrate as described above and when the following four-second silent interval occurs, the reed type selector at station "C" is converted to a self-driven oscillator as described above and applies an audio frequency signal back over line 302 to the intraoffice trunk of Fig. 17 which functions, as above, to trip the ringing current and apply talking battery to the line. The ringing selection switch of Fig. 14 will release when the hold magnet HL0 releases after the release of relay 1707 in the trunk circuit of Fig. 17. When the call is finished, the originating and terminating connections are broken as described in detail in the above-cited Busch patent and the intraoffice trunk of Fig. 17 is released.

*Intraoffice call arranged for automatic message accounting, detailed description*

Assume that the subscriber at station "A" on line 301 in Fig. 3 is calling the subscriber at station "C" on line 302 within the same office and has completed the dialing of the directory number of station "C" in the manner described above. Assume further that the subscribers on line 301 have contracted for message rate service which means, as mentioned above, that the automatic message accounting equipment will be called in to make a record of the call. After the calling subscriber at station "A" completes the dialing of the office code and numerical digits of the directory number of the subscriber at station "C" in the manner described above, the originating register shown in Fig. 6 will engage an idle marker such as the marker shown in Figs. 9, 10 and 11 through originating register marker connector 701 shown in block form in Fig. 7. The originating register of Fig. 6 will transmit the line equipment location of calling line 301 which is registered in calling line location registers 604 of Fig. 6 to the marker calling line location registers shown in Fig. 10 via cable 16, originating register marker connector 701 and cable 17. The originating register of Fig. 6 will also transmit the numerical digits of the called subscriber's directory number from numerical register 603 to the marker called line number registers of Fig. 10 via cable 18, originating register marker connector 701 and cable 19. The originating register of Fig. 6 will transmit the office code of the called subscriber's directory number from code register 602 to the marker code registers 902 shown in Fig. 9, via cable 20, originating register marker connector 701 and cable 21. In addition, the originating register of Fig. 6 will transmit the class of service information of calling line 301 from calling line class registers 605 shown in Fig. 6 to the marker calling line class registers 905 shown in Fig. 9 via cable 22, originating register marker connector 701 and cable 23. The originating register also transmits the identity of the line link used in establishing the dialing connection to the marker. The registration of the identity of the particular party (in this case station "A") on line 301 which originated the call is retained in the party station register of Fig. 5 until the marker determines whether or not this information is needed.

The marker translates the office code of the called designation or directory number of station "C" which is registered in the marker code registers 902 of Fig. 9 and determines that the called number is in the same office as calling line 301. The registration of the called office code in the marker code registers 902 of Fig. 9 causes a ground to be applied to the upper terminal of the winding of route relay RT shown in Fig. 9. As described hereinbefore, route relay RT is the appropriate route relay for controlling the routing of the call to a subscriber in the same office as the calling line (an intraoffice call). From the class of service information registered in the marker calling line class registers 905 of Fig. 9, the marker can determine whether calling line 301 is a flat rate or a message rate line. Under the assumed conditions the subscribers on line 301 have contracted for message rate service; therefore upon the registration of this class information in the marker calling line class registers 905 of Fig. 9, class relay CSMR of Fig. 9 which is a class relay for a message rate line will be operated by ground obtained from the marker calling line class registers 905 through the winding of the class relay to battery. The operation of class relay CSMR will close a circuit for the operation of route relay RT and message billing relay MB of Fig. 9 in series. The marker contains several message billing relays only one of which, relay MB of Fig. 9, is shown. Each of these message billing relays, such as relay MB of Fig. 9 will, when operated furnish the required message billing index for a particular call which requires automatic message accounting. From the class of service information of the calling line and from the called office code information, the marker can determine the appropriate message billing index or charging information which is applicable to the call and the marker will by the operation of the appropriate message billing relay such as relay MB of Fig. 9, select this message billing index. The operation of relay MB of Fig. 9 will in turn apply ground to the winding of relay AMA of Fig. 9 and operate this relay. Relay AMA in operating will close a circuit to the marker sender selection circuits 901 shown in block form in Fig. 9 which in turn controls the sender connector 702 of Fig. 7 via cable 52. The operation of relay AMA of Fig. 9 is a signal to the marker that the call which was originated over line 301 is a call for which the automatic message accounting equipment will be required.

The operation of relay RT in Fig. 9 as above described will close a circuit from ground through the right-hand back contacts of relay GS in Fig. 9, through the right-hand front contacts of relay RT over lead 911 to the marker switch operating circuits 903 of Fig. 9. Ground will also be applied through back contacts 906 of relay GS, through front contacts 907 of relay RT, over lead 912 to the marker class of call registers 904 shown in Fig. 9 which will register the type of call being originated. The operation of relay RT will also close a circuit from ground through back contacts 908 of relay GS, through front contacts 909 of relay RT, through the winding of relay ITR1 to battery. Relay ITR1 operates and locks operated to ground at the back contact of relay ITA.

From the translation of the office code information of the called subscribers' number, and from the class of service information of calling line 301, the marker has determined that the call which was originated on line 301 is an intraoffice call and that it is a message rate call and one for which the automatic message accounting equipment will be required. As a result of this translation the marker has determined that an AMA intraoffice trunk will be required to complete the call, and in response to the ground applied on lead 911 to the marker switch operating circut 903 of Fig. 9 as described above, the marker will select an idle AMA intraoffice trunk as will be described later. Furthermore, the marker has determined the message billing index which a applicable to the call. The marker will now proceed to establish an AMA intraoffice call.

Figure 20:
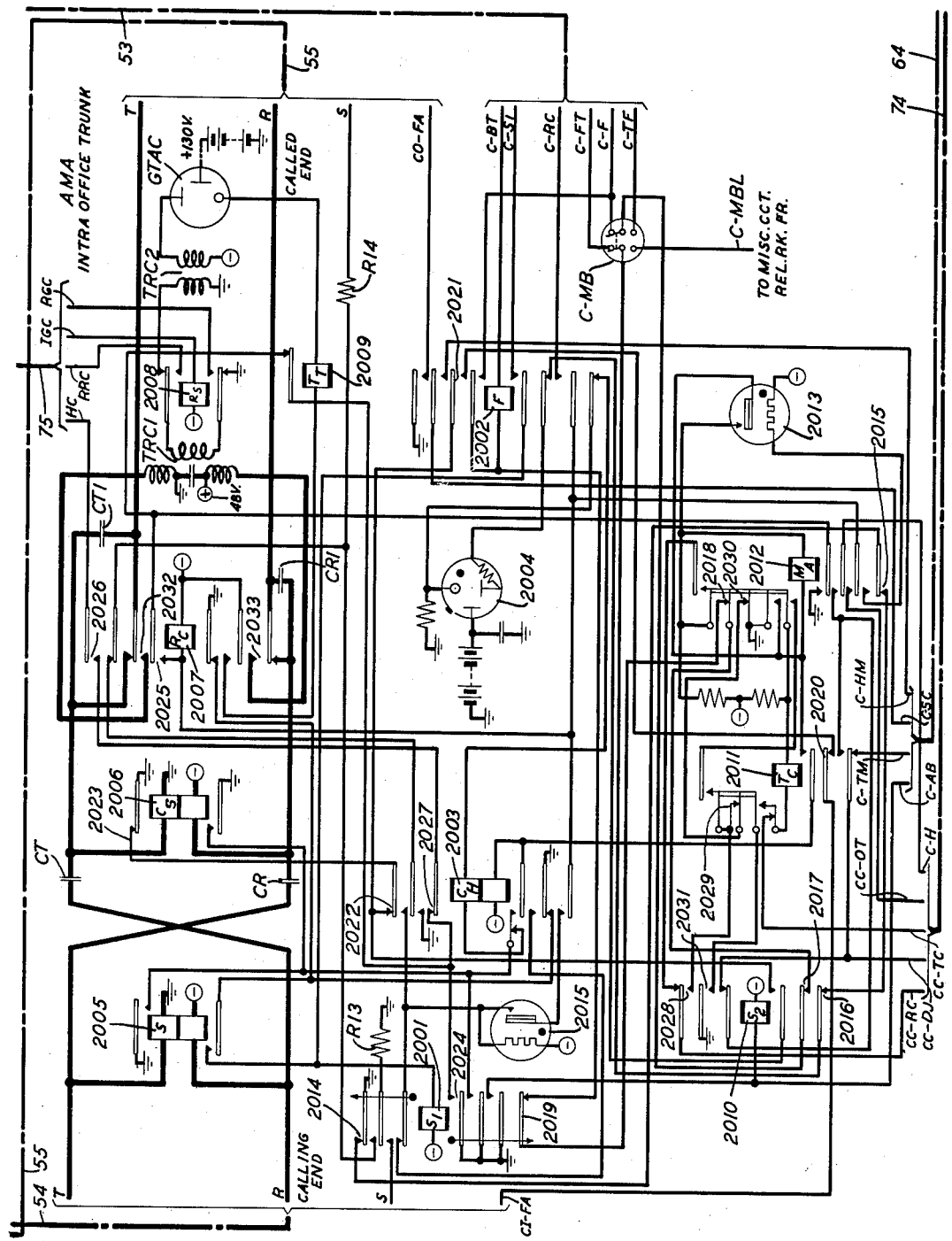
Fig. 20 shows in schematic form an intraoffice trunk circuit arranged for automatic message accounting.

The marker functions in a manner similar to that described above in connection with the flat rate intraoffice call in establishing the terminating and originating connections to an AMA intraoffice trunk such as the trunk shown in Fig. 20. Before the terminating connection can be set up, the marker must obtain the equipment location of the called line and the proper ringing combination for ringing the called station on this line. As described above the marker selects the proper number group, such as the number group shown in Figs. 19 and 21, through the number group connector of Fig. 15. The marker transmits the digits of the called subscriber's directory number to the selected number group. The selected number group in turn will translate this information into an equipment location in terms of line link frame number, horizontal group number, vertical group number and vertical file number and transmits this information back again to the marker where it is registered in the marker called line location registers of Fig. 10 in the manner hereinbefore described. The marker also received from the number group circuit of Figs. 19 and 21 the correct ringing combination for signaling called station "C" on line 302 and registers this information in the marker ringing combination register relays of Fig. 11.

While the marker is obtaining the called line location and ringing combination from the number group as described above, it is also selecting an idle AMA intraoffice trunk such as the trunk shown in Fig. 20 which terminates on an idle trunk link frame such as trunk link frame 312 shown in Fig. 3. The marker selects an idle AMA intraoffice trunk in a manner similar to that described above with respect to flat rate intraoffice trunk of Fig. 17. The selection is made by the marker switch operating circuits 903 in response to the ground applied to lead 911 and is completed over a selecting path comprising cable 35, cable 2, trunk link connector 313, cable 36 and cable 53. There is a frame test lead for each trunk link frame on which AMA intraoffice trunks appear, this FT lead such as lead C–FT for the trunk of Fig. 20 and an F lead such as lead C–F for the trunk of Fig. 20 which will be discussed below, are multiplied between trunks in a cross connecting field on the trunk link frame. Each idle AMA intraoffice trunk such as the trunk shown in Fig. 20 supplies ground to the FT lead, lead C–FT for the trunk of Fig. 20, through back contacts 2014 of relay 2001, back contacts 2015 of relay 2012, back contacts 2016 of relay 2010 and through make busy switch C–MB shown in Fig. 20. The ground on the C–FT lead is extended to the marker switch operating circuits 903 of Fig. 9 via the selecting path traced above. The marker knows that there is at least one idle AMA intraoffice trunk on each trunk link frame which has a grounded FT lead. The marker selects one of the trunk line frames such as trunk link frame 312 with available trunks and supplies a ground via the selecting path traced above on the C-F lead in cable 53 to the trunk. Ground on the C-F lead from the marker via cable 53 will be extended to the left-hand terminal of the winding of relay 2002 in the AMA intraoffice trunk of Fig. 20 through normally closed contacts of a make busy switch C-MB, back contacts 2017 of relay 2010, back contacts 2018 of relay 2012 and back contacts 2019 of relay 2001. The marker selects the AMA intraoffice trunk of Fig. 20 by supplying battery over the selecting path traced above on the C-BT lead in cable 53 to operate relay 2002 in the trunk. Relay 2002 locks operated to the ground on the C-F lead in cable 53 from the marker via the selecting path traced above.

Relay 2002 in the AMA intraoffice trunk of Fig. 20 in operating supplies ground to two FA leads to the trunk link circuit, the calling end FA lead in cable 54 designated CI-FA and the called end FA lead in cable 55 designated CO-FA for the trunk of Fig. 20. The ground supplied to the calling end lead CI-FA is obtained through normally closed back contacts 2023 of relay 2006, back contacts 2022 of relay 2003, front contacts 2021 of relay 2002 and back contacts 2020 of relay 2011 to the CI-FA lead. This insures that these contacts are closed before the marker sets up a connection to this trunk. The ground on leads CI-FA and CO-FA cause the trunk link circuit to perform the necessary functions in conjunction with the marker to set up the connection between the subscribers at station "A" on line 301 and station "C" on line 302. The two sleeve leads, that is the calling end S lead and the called end S lead are transferred to the marker for testing. The tip and ring leads of the calling and called end of the trunk of Fig. 20 are transferred to the marker for a continuity check to the subscribers' lines. The C-S1 lead in cable 53 is extended from ground in the marker via the selecting path traced above through front contacts in relay 2002, to the winding of relay 2001 in the trunk of Fig. 17 and operates relay 2001. Relay 2001 in operating makes the trunk busy by opening the C-F lead and removes the ground from the C-FT lead. Relay 2001 in operating also supplies 10-ohm ground to the calling end sleeve lead through resistance R13 and 10-ohm ground to the called end sleeve lead through resistance R14 to hold the hold magnets operated and thus maintain the connection between the called subscriber's line and the calling subscriber's line. Relay 2001 in operating also operates relay 2010.

After the marker receives the equipment location of called line 302 from the number group circuit of Figs. 19 and 21 and registers this information in the marker called line location registers of Fig. 10, and during the time it is selecting an idle AMA intraoffice trunk as above described, it may proceed as described hereinbefore to make a comparison between the called line location and the calling line location. Under the assumed conditions, the called line and the calling line are two separate lines, that is lines 302 and 301 and therefore there will be no continuity check between the two registered line locations and the RV relay of Fig. 10 will not be operated. After this continuity check, the marker knows then that it may proceed with the establishment of the terminating and originating connections to the selected AMA intraoffice trunk because as hereinbefore described the marker knows that the intraoffice call being made is a non-reverting intraoffice call.

The marker can proceed with the establishment of the terminating connection between called line 302 and the selected AMA intraoffice trunk of Fig. 20 because it has obtained the line equipment location of called line 302 from the number group of Figs. 19 and 21. The marker determines from the information recorded in the called location registers of Fig. 10 that called line 302 is located on line link frame 306. The marker switch operating circuits 903 of Fig. 9 will operate in conjunction with the marker called line location register relays of Fig. 10 to seize this line link frame via cable 38, cable 3 and line link connector 308 from the marker switch operating circuits 903 and cable 51, cable 3 and line link connector 308 from the called line location registers of Fig. 10. The marker tests called line 302 for a busy condition and if line 302 is not busy the marker establishes the terminating connection between the "out" appearance or called end of the AMA intraoffice trunk shown in Fig. 20 and called line 302 on line link frame 306. The terminating connection is completed over an idle channel such as channel 39 shown in Fig. 3 between line link frame 306 and trunk link frame 312 and cable 55 to the AMA intraoffice trunk shown in Fig. 20. After the terminating connection is established the marker proceeds to set up the originating connection between calling line 301 and the "in" appearance or calling end of the AMA intraoffice trunk shown in Fig. 20. From the equipment location information of calling line 301 as registered in the marker calling line location register of Fig. 10, the marker determines that calling line 301 is located on line link frame 303. The marker switch operating circuits 903 of Fig. 9 will operate in conjunction with the marker calling line location registers of Fig. 10 to seize line link frame 303 via cable 38, cable 3 and line link connector 305 from the marker switch operating circuit 903 and cable 82, cable 3 and line link connector 305 from the marker calling line location registers of Fig. 10. Before the marker releases the dialing connection which was established through channel 10, as above described in connection with the establishment of the dialing connection, it determines whether there is an idle channel such as channel 40 between line link frame 303 and trunk link frame 312. If there is an idle channel such as channel 40 in Fig. 3 the dialing connection is released immediately enabling the marker to use the dialing connection line link as part of the originating connection if necessary. The marker has received from the originating register the identity of this line link used in the dial tone connection. The connection between calling line 301 which terminates on line link frame 303 and the calling end or "in" appearance of the AMA intraoffice trunk of Fig. 20 is completed over channel 40 between line link frame 303 and trunk link frame 312 and cable 54 to the AMA intraoffice trunk shown in Fig. 20.

While the marker is setting up the originating connection between the "in" appearance or calling end of the AMA intraoffice trunk of Fig. 20 and the subscriber at station "A" on line 301 as above described, it also seizes a sender such as sender 703 shown in block form in Fig. 7. The operation of relay AMA shown in Fig. 9 as above described will cause the marker sender selection circuits 901 to seize sender 703 of Fig. 7 via cable 52 and sender connector 702. Sender 703 is not seized until after the marker completes the terminating connection between the called end or "out" appearance of AMA intraoffice trunk shown in Fig. 20 to line 302 on line link frame 306 so that if line 302 is busy the automatic message accounting equipment will not be engaged.

Figure 8:
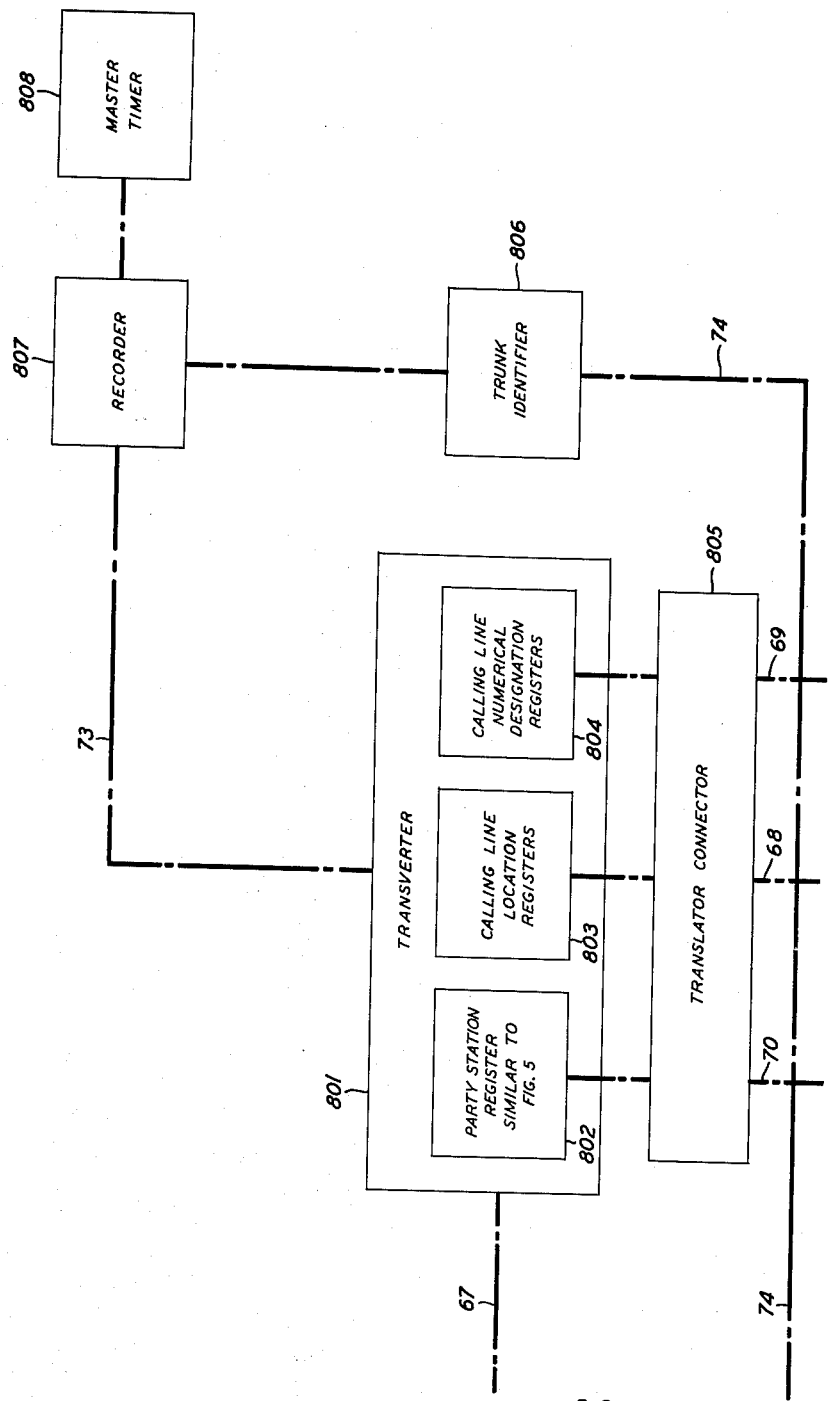
Fig. 8 shows in diagrammatic form the transverter, translator connector, recorder, trunk identifier and master timer of the automatic message accounting equipment and shows that the transverter has been modified to include a party station register similar to that shown in Fig. 5.

AMA intraoffice trunks are assigned to particular recorders in groups of 100 and the trunk such as the trunk shown in Fig. 20 must indicate to the marker the recorder number such as recorder 807 shown in Fig. 8 to which it is assigned. Each AMA intraoffice trunk terminated on a line link frame has associated relays on that frame which operate when the particular trunk is selected by the marker. These operated relays apply a ground potential over a lead to a cross-connecting field on the trunk link frame. By means of cross-connecting jumpers a particular trunk may be assigned to work with a particular recorder. This information is carried to the marker and is recorded there. For example, the selection of the AMA intraoffice trunk of Fig. 20 by the marker will operate relays associated with this trunk on trunk link frame 312. The operation of these relays in turn will cause the registration of the particular recorder number such as the number assigned to recorder 807 of Fig. 8 in the marker recorder number register 910 of Fig. 9. The recorder number information is transmitted from trunk link frame 312 to the marker recorder number register 910 of Fig. 9 via trunk link connector 313, cable 2 and cable 56. In this manner the marker learns the identity of the particular recorder associated with the selected trunk.

For assisting an intraoffice call requiring automatic message accounting it is necessary to associate a sender with the intraoffice call to provide a place to record the initial entry data registered in the marker so as to avoid holding the marker until the recording of initial entry on the AMA central office tape by the recorder is completed. As soon as the marker has seized a sender such as sender 703 of Fig. 7 as described above, the marker transmits the following information to seized sender:

(a) The line equipment location of calling line 301. The line link frame number, horizontal group number, vertical group number and vertical file number which make up this information are transmitted to sender 703 from the marker calling line location registers of Fig. 10 via cable 57 and sender connector 702.

(b) The message billing index. This information is transmitted to sender 703 through the operated marker message billing relay MB of Fig. 9 via cable 59, cable 60 and sender connector 702.

(c) The number of the recorder serving the selected AMA intraoffice trunk of Fig. 20. This number is transmitted from the marker recorder number register 910 of Fig. 9 to sender 703 via cable 61, cable 60 and sender connector 702.

(d) The called subscriber's directory number. The office code of this number is transmitted to sender 703 from the marker code registers 902 of Fig. 9 via cable 62 and sender connector 702. The numerical digits of the called subscriber's directory number are transmitted to sender 703 from the marker called line number registers of Fig. 10 via cable 63 and sender connector 702.

Because this is an intraoffice call for which automatic message accounting is required, sender 703 must also be furnished the identity of the particular party on line 301 who originated a call. As hereinbefore described this information has been registered in the party station register of Fig. 5 and was left there awaiting determination by the marker of its need. The operation in the marker of the AMA relay shown in Fig. 9 as above described is a signal to the marker to call in the automatic message accounting equipment and in addition notifies the marker that the calling party identity as registered in the party station register of Fig. 5 will be required. The marker, by operating sender connector 702 of Fig. 7 as above described closes a circuit for the transfer of the party station identification information from the party station register of Fig. 5 to the sender party station register 704 in sender 703. The party station register 704 are shown in block form in Fig. 7 within sender 703 and are a part of sender 703. The circuit for these registers is similar to that of the party station register of Fig. 5 and has been omitted from Fig. 7 in order to simplify the drawings. As described hereinbefore relays SA, S0 and S1 of the party station register of Fig. 5 have been operated by the party station identifier of Fig. 4 to register the identity of the calling subscriber at station "A" on line 301. The operation of these relays will in turn operate similarly designated relays in the party station register 704 of sender 703. The circuit for operating the register relays of the party station register 704 of sender 703 may be traced from the operated relays of the party station register of Fig. 5 via cable 65, originating register marker connector 701, cable 66 and sender connector 702. The marker also establishes a connection between the selected AMA intraoffice trunk of Fig. 20 and sender 703 of Fig. 7 via cable 64 from the trunk and sender link 706 of Fig. 7.

Sender 703 now seizes a transverter such as transverter 801 via transverter connector 705 and cable 67.

Transverter 801 receives the following information from sender 703:

(a) The recorder number serves the AMA intraoffice trunk of Fig. 20. The transverter will use this information to obtain access to the proper recorder.

(b) The equipment location of calling line 301. This information will be registered in calling line location registers 803 of transverter 801.

(c) The directory number of the called subscriber at station "C" on line 302.

(d) The calling party station identity registered in party station register 704 of outgoing sender 703. The party station identification information contained in the party station register 704 of sender 703 is transmitted to a similar party station register 802 of transverter 801. The circuit of the transverter party station register 802 is similar to that shown in Fig. 5 and has been omitted from Fig. 8 in order to simplify the drawings.

Before recorder 807 of Fig. 8 can begin perforating the initial entry on the AMA central office tape, the directory number of the calling subscriber at station "A" on line 301 is required. To obtain this information transverter 801 seizes a translator such as the translator shown in Fig. 12 with its associated party station translator shown in Fig. 16 via translator connector 805 of Fig. 8.

Figure 12:
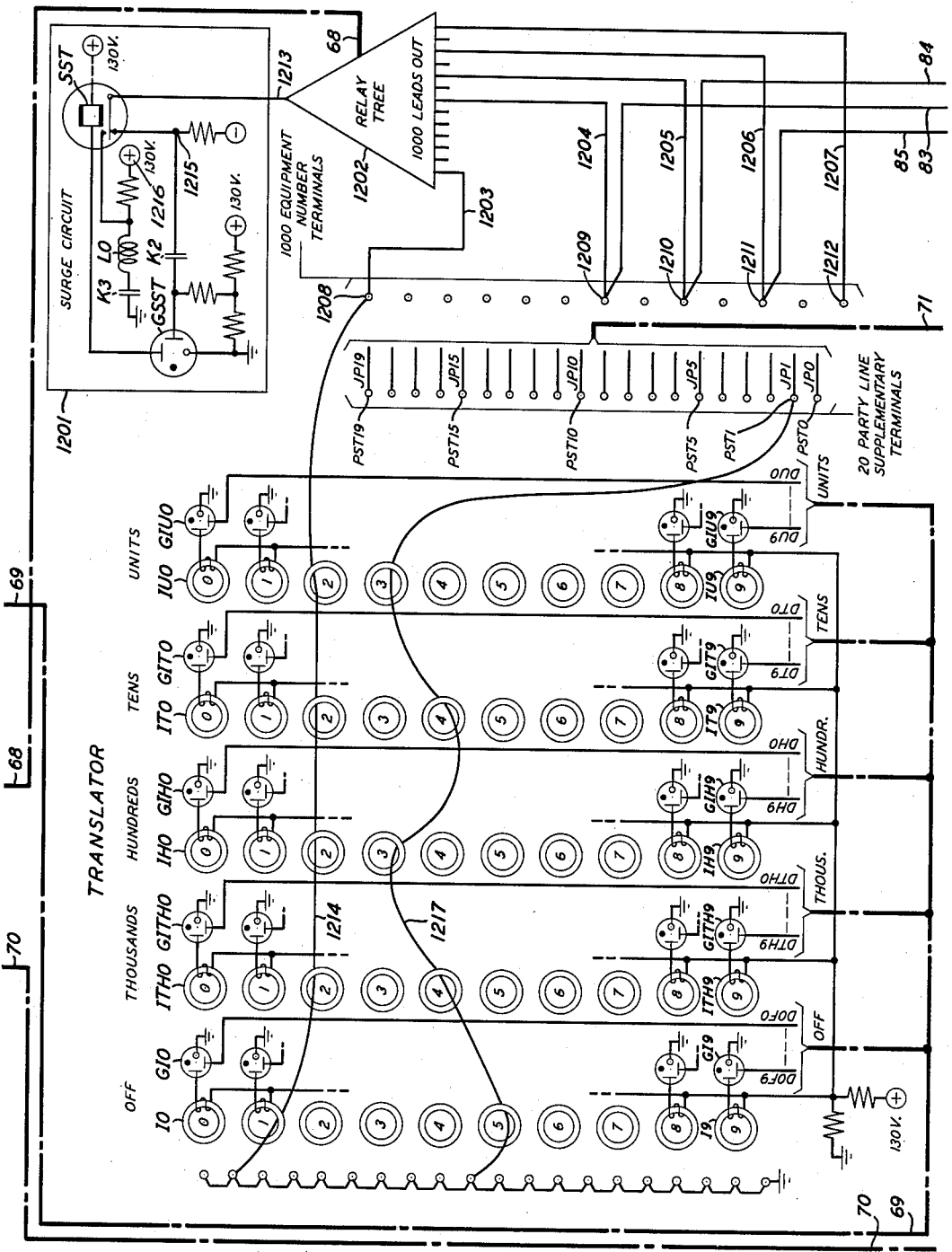
Fig. 12 shows in simplified schematic form the translator circuit of the automatic message accounting equipment.

The translator shown in Fig. 12 comprises a surge circuit enclosed within the box labeled "1201," a relay tree 1202 and five groups of coils and associated cold cathode gas tubes. The translator is disclosed and described in detail in the above-cited Cahill et al. patent and will be only briefly described herein. Relay tree 1202 has 30 leads in cable 68 incoming from transverter 801 via translator connector 805 over which transverter 801 operates relays in relay tree 1202 in accordance with the line equipment location of the calling line as registered in the transverter calling line location registers 803. Relay tree 1202 has 1000 leads outgoing to 1000 equipment terminals each of which is assigned to a particular line. Of the 1000 outgoing leads from relay tree 1202, only leads 1203, 1204, 1205, 1206 and 1207 which terminate respectively on equipment terminals 1208, 1209, 1210, 1211 and 1212 are shown in Fig. 12. Relay tree 1202 also has one lead, lead 1213, which connects to surge circuit 1201. When transverter 801 operates relays in relay tree 1202 via cable 68 in accordance with the equipment location of a calling line, the operated relays in relay tree 1202 will close a circuit from the equipment terminal assigned to the calling line to the surge circuit 1201. From each of the equipment terminals assigned to an individual line, a jumper will be threaded through one coil in each of the five groups of coils to ground as shown by jumper 1214 in Fig. 12. Ten of these coils, coils I0 through I9 represent the ten digits each of which are assigned to represent a particular office code of a calling subscriber's directory number. Ten coils ITH0 through ITH9 represent the thousands digit of a calling subscriber's directory number and similarly coils IH0 through IH9, IT0 through IT9, and IU0 through IU9 represent respectively the hundreds, tens and units digits of a calling subscriber's directory number. The particular coil in each of the five groups of coils through which a jumper from any equipment terminal is threaded will depend upon the directory number assigned to the line represented by that equipment terminal. Each of the coils in Fig. 12 has an associated cold cathode gas tube and the winding of each coil is connected to the control anode of its associated gas tube. For example, coil I0 has associated with with it, gas tube GI0, coil ITH0 is associated with gas tube GITH0 etc. If a surge of oscillating current is sent through a jumper such as jumper 1214, an oscillating voltage is induced into the winding of the coils through which the jumper passes. This induced voltage ionizes the cold cathode gas tube associated with the coils and allows current to pass between the cathode and main anode of the ionized gas tubes. The main anodes of the gas tubes are connected to relays in the transverter calling line numerical designation registers 804 shown in block form in Fig. 8 via conductors in cable 69 and translator connector 805.

There are ten leads in cable 69, designated DOF0 through DOF9, connected to the office digit relays in the transverter calling line numerical designation registers 804 which indicate the ten digits assigned to represent different office codes of calling subscribers' directory numbers. There are also ten leads DTH0 through DTH9 in cable 69 connected to the thousands digit relays in the transverter calling line numerical designation registers 804 which indicate the thousands digit of a calling subscriber's directory number. Similarly leads DH0 through DH9, DT0 through DT9 and DU0 through DU9 in cable 69 connect to the hundreds, tens and units relays respectively in the transverter calling line numerical designation registers 804 which indicate respectively the hundreds, tens and units digits of a calling subscriber's directory number. A calling subscriber's directory number is therefore registered in the transverter calling line numerical designation registers 804 in the form of five digits: One to indicate the office code, and one each to indicate the thousands, hundreds, tens, and units digit of the calling subscriber's directory number.

When transverter 801 operates relays in relay tree 1202 in accordance with the location of a calling line as registered in calling line location register 802 as described above, a connection is completed from ground via a jumper threaded through one coil in each of the five groups of coils to the equipment terminal assigned to the particular calling line, through contacts of the operated relays in relay tree 1202 over lead 1213, through back contacts of relay STT in surge circuit 1201, to point 1215 in surge circuit 1201. This ground suddenly raises the potential at point 1215 from minus 48 volts to ground and this voltage change is carried through coupling condenser K2 and applied to the control anode of cold cathode gas tube GSST in surge circuit 1201 of Fig. 12. The voltage thus applied to the control anode of gas tube GSST causes this tube to ionize and pass current through the winding of relay SST. Relay SST in the surge circuit 1201 of Fig. 12 operates and closes a discharge path for the oscillatory discharge of capacitor K3 through inductance LO, through front contacts of relay STT over lead 1213, front contacts of the operated relays in relay tree 1202 to the equipment terminal assigned to the calling line, through the jumper connected to this terminal to ground. The surge current in the jumper induces a voltage in the output windings of the coils through which the jumper passes. The gas tubes associated with these coils will fire from this induced voltage and in turn will cause relays in the transverter calling line numerical designation registers 804 to operate. In this manner the translator receives the equipment location of a calling line and from this information determines the directory number assigned to the line and returns it to the transverter.

Assume for example that transverter 801 operates relays in relay tree 1202 which close a circuit from equipment terminal 1208 via lead 1203 through front contacts of operated relays in relay tree 1202, via lead 1213 to surge circuit 1201. In the manner described above an oscillatory surged current will pass through jumper 1214 which is connected to terminal 1208 and threaded through coils 1U2, 1T2, 1H2, 1TH2 and 1l to ground. This surge current will in turn cause gas tubes GIU2, GIT2, GIH2, GITH2 and GI1 to fire and pass current over leads DU2, DT2, DH2, DTH2, and DOF1 in cable 69 through translator connector 805 to operate relays in the transverter calling line numerical designation registers 804 and register the directory number 1-2222 of the calling line. The office code digit, that is the digit 1, of this number, may represent an office code such as CH–6 and therefore the directory number of the calling line would be CH 6–2222.

The translation above-described of equipment terminal 1208 was for a single or individual party line. The operation of relays in relay tree 1202 as above described will select a particular terminal of the one thousand equipment terminals which has been assigned to the subscriber on the calling line. However, in the case of multiparty lines this equipment terminal may represent as many as 20 subscribers on a multiparty line. Therefore, in order to obtain the directory number of a calling party station subscriber on a multiparty line, the selected equipment terminal which has been assigned to the multiparty line serving the calling party station subscriber line must be further translated in the party station translator of Fig. 16 in order to obtain the directory number of the particular calling subscriber on the multiparty line.

Figure 16:
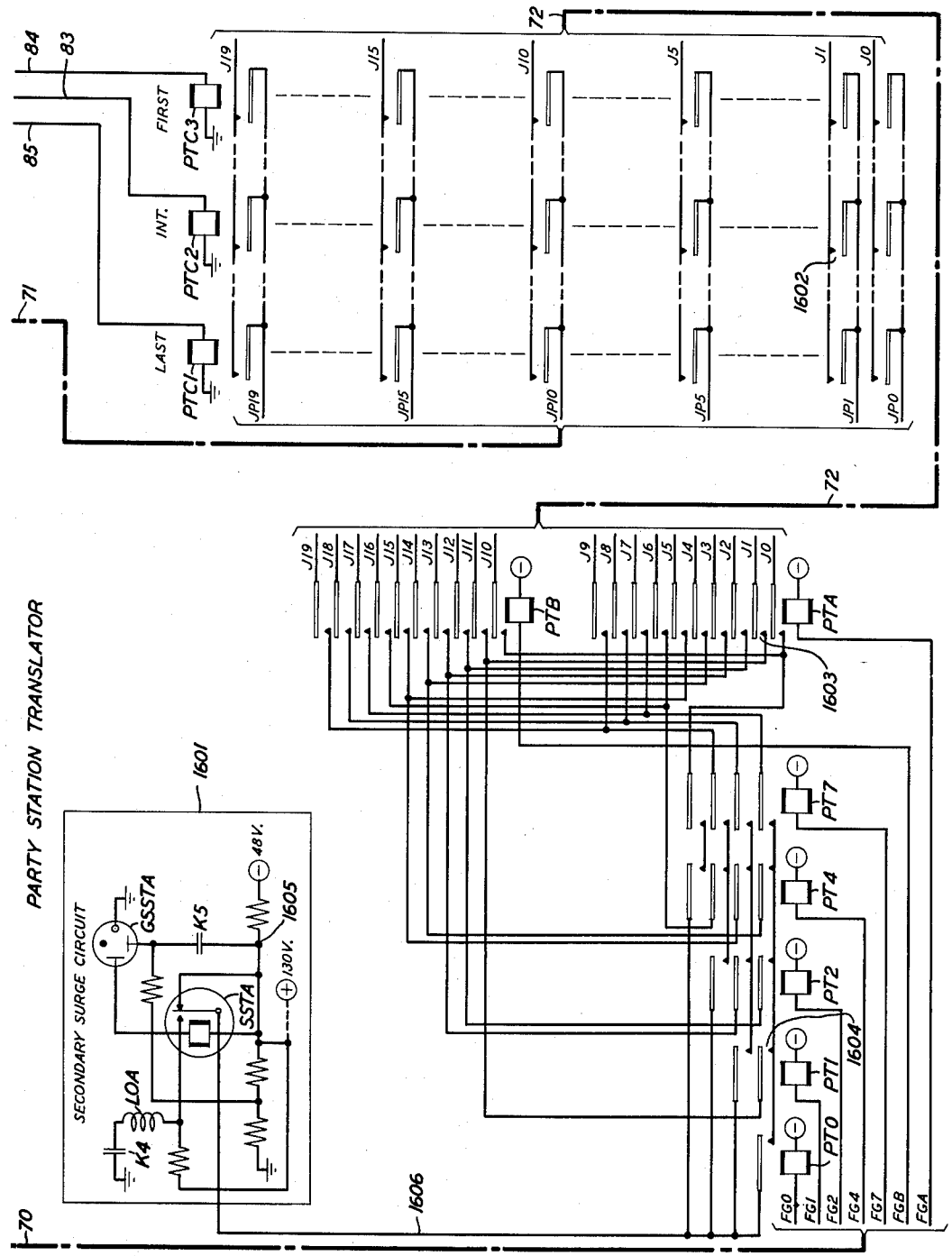
Fig. 16 illustrates in schematic form the party station translator which is added to the translator circuit of the automatic message accounting equipment shown in Fig. 12.

The party station translator shown in Fig. 16 comprises a secondary surge circuit enclosed within the box labeled "1601," a group of party station translator relays PT0, PT1, PT2, PT4, PT7, PTA and PTB which are operated by transverter 801 in accordance with the party station identity registered in the transverter party station register 802, and a plurality of PTC relays each of which is associated with a multiparty line whose equipment terminal terminates in the translator of Fig. 12. Fig. 16 shows 3 PTC relays, these relays are PTC1, PTC2, and PTC3 and are associated with three multiparty lines whose equipment terminals 1211, 1209 and 1210 respectively are three of the one thousand equipment terminals in the translator of Fig. 12. Every multiparty line whose equipment terminal is one of the one thousand equipment terminals in the translator of Fig. 12 will have an associated PTC relay in the party station translator of Fig. 16. Instead of threading a jumper from the multiparty line equipment terminals in Fig. 12 through the translator coils of Fig. 12 as is done for individual or single party lines, a lead is extended from each terminal through the winding of its associated PTC relay in the party station translator of Fig. 16 to ground. For example, multiparty line equipment terminal 1209 in Fig. 12 is connected through the winding of relay PTC2 in Fig. 16 to ground via lead 83. Multiparty line equipment terminal 1210 in Fig. 12 is connected through the winding relay PTC3 in Fig. 16 to ground via lead 84. Similarly multiparty line equipment terminal 1211 in Fig. 12 is connected through the winding of relay PTC1 in Fig. 16 to ground via lead 85.

When transverter 801 operates relays in relay tree 1201 in accordance with the location of a calling multiparty line as registered in calling line location registers 802 in the manner described above, a connection is completed from ground through the winding of the PTC relay in Fig. 16 associated with this multiparty line, to the multiparty line equipment terminal in Fig. 12 through the front contacts of the operated relays in relay tree 1202, over lead 1213, through back contacts of relay SST in surge circuit 1201 of Fig. 12 to point 1215 in surge circuit 1201. As described above this ground suddenly raises the potential of point 1215 from 48 volts to ground. This voltage change at point 1215 is carried through coupling condenser K2 and applied to the control anode of gas tube GSST in surge circuit 1201 of Fig. 12 which, as described above, will cause a discharge to be initiated in gas tube GSST. The discharge in gas tube GSST will in turn cause the operation of relay SST in surge circuit 1201. The operation of relay SST closes a circuit for the oscillatory discharge of condenser K3 through inductance LO, through front contacts of relay SST over the same path traced above through the winding of the PTC relay in Fig. 16 to ground. The oscillatory surge current from the discharge condenser K3 through inductance LO through the winding of the PTC relay as described above will have no effect upon the PTC relay. However, the PTC relay will operate over this same path through the front contacts of the SST relay in surge circuit 1201 to battery 1216 in surge circuit 1201. The operation of any of the PTC relays of Fig. 16 will close through the 20 leads J0 through J19 in cable 72 to the 20 leads JP0 through JP19 in cable 71 as shown in Fig. 16. Cable 71 extends leads JP0 through JP19 from the PTC relays of Fig. 16 to the 20 party line supplementary terminals PST0 through PST19 in the translator of Fig. 12.

Assume for example that equipment terminal 1209 of Fig. 12 has been assigned to calling line 301. Because calling line 301 is a multiparty line, terminal 1209 will represent the line equipment terminal for as many as 20 subscribers, station "A" being one of the possible 20 subscribers on the line. Instead of threading a jumper from terminal 1209 through the translator coils of Fig. 12 as is done for single party lines, terminal 1209 will be connected via lead 83 to its associated PTC relay, relay PTC2 in this case, in the party station translator of Fig. 16. Therefore when transverter 801 operates the relays in relay tree 1202 of Fig. 12 via translator connector 805 and cable 68 in accordance with the location of calling line 301 as registered in the transverter calling line location registers 803, a circuit is completed from ground through the winding of relay PTC2 associated with calling line 301 in Fig. 16, via lead 83 to equipment terminal 1209 in Fig. 12, via lead 1204 from equipment terminal 1209 through front contacts of the operated relays in relay tree 1202 of Fig. 12, via lead 1213, through back contacts of the SST relay in surge circuit 1201 to point 1215 in surge circuit 1201. As above described this ground at point 1215 in surge circuit 1201 suddenly raises the potential at point 1215 from —48 volts to ground and this voltage change is carried through coupling condenser K2 to the control anode of gas tube GSST. As described above gas tube GSST of Fig. 12 fires and operates relay SST which in turn closes a circuit through the front contacts of relay SST to connect the winding of relay PTC2 in Fig. 16 via the circuit traced above to battery 1216 in surge circuit 1201. Relay PTC2 will operate and close through the 20 leads J0 through J19 in cable 72 to the 20 leads, JP0 through JP19 in cable 71 as shown in Fig. 16.

In order for the translator of Fig. 12 and the party station translator of Fig. 16 to furnish transverter 801 the directory number of a calling subscriber on a multiparty line, they must be furnished the identity of the particular calling subscriber on the calling line. As described hereinbefore, the identity of the calling subscriber on multiparty calling line was obtained by the party station identifier circuit of Fig. 4 and the calling subscriber's identity was registered in the party station register of Fig. 5. This information was retained in the party station register of Fig. 5 until the marker determined that the information was needed for AMA charging purposes. The marker then caused the transfer of the identity of the calling subscriber from the party station register of Fig. 5 to the sender party station register 704 in sender 703. Subsequently the sender transferred this information to the transverter party station register 802 of transverter 801. When transverter 801 seizes the translator of Fig. 12 and the party station translator at Fig. 16 via translator connector 805 to obtain the directory number of the calling subscriber on a multiparty line, transverter 801 will transfer the identity of the calling subscriber on the multiparty line from transverter party station register 802 to the party station translator relays PT0, PT1, PT2, PT4, PT7, PTA, and PTB in the party station translator of Fig. 16 via translator connector 805 and cable 70.

As described hereinbefore, the circuit of the transverter party station registers 802 is similar to the circuit of the party register shown in Fig. 5, and as hereinbefore described, the registration of the identity of a particular calling party on a multiparty line will cause the operation of two of the relays S0, S1, S2, S4 and S7 of the transverter party station register 802 and either one of the two relays SA or SB. The operation of these relays in the transverter party station register 802 will place a ground on two of the leads FG0, FG1, FG2, FG4 and FG7 in cable 70 and a ground on either lead FGA or FGB of cable 70 to the party station translator relays of Fig. 16. The ground on these leads will cause the operation of the two of the relays PT0, PT1, PT2, PT4 and PT7 and either relay PTA or PTB of Fig. 16. The operation of the party station translator of Fig. 16 will close a circuit from point 1605 in the secondary surge circuit 1601 of the party station translator of Fig. 16 through back contacts of relay SSTA in secondary surge circuit 1606, through front contacts of two of the five relays PT0, PT1, PT2, PT4 and PT7 depending upon which two are operated through front contacts of either relay PTA or PTB depending upon which is operated to one of the 20 leads J0 through J19 in cable 72. Leads J0 through J19 are further extended by cable 72 through front contacts of an operated PTC relay in Fig. 16 over leads JP0 through JP19 in cable 71 to the 20 party line supplementary terminals PST0 through PST19, shown in Fig. 12. The 20 party line supplementary terminals PST0 through PST19 in Fig. 12 serve as equipment terminals for the 20 possible stations on a multiparty line. For example, terminal PST15 is equipment terminal for party 15 on any multiparty line. From each of the party line supplementary terminals PST0 through PST19 of Fig. 12 assigned to an individual party station subscriber on any party line, a jumper will be threaded through one coil in each of the five groups of coils to ground, as shown by jumper 1217, from party line supplementary terminal PST1 in Fig. 12. The particular coil in each of the five groups of coils through which a jumper from any party line supplementary terminal is threaded will depend upon the directory number assigned to the party subscriber represented by that party line supplementary terminal.

It will be recalled that the party station identifier of Fig. 4 operated relays SA, S0 and S1 in the party station register circuits of Fig. 5 thus indicating that the calling subscriber at station "A" on line 301 was party 1 on line 301. This identity, as mentioned above, was transferred to the transverter party station register 802 of transverter 801. The operation of relays SA, S0 and S1 in the transverter party station register 802 will as described above cause the operation of relays PTA, PT0 and PT1 in the party station translator of Fig. 16 via translator connector 805 and cable 70. Also, as described above, relay PTC2 in the party station translator of Fig. 16 was operated as a result of the operation of the relays in relay tree 1202 of Fig. 12 by transverter 801 in accordance with the location of calling line 301. The operation of relays PTA, PT0, PT1 and PTC2 will complete a circuit from ground via jumper 1217, through coils I5, ITH4, IH3, IT4, and IU3 to party line supplementary terminal PTS1 from this terminal via lead JP1 in cable 71, through front contacts 1602 of relay PTC2, via lead J1 in cable 72, through front contacts 1603 of relay PTA of Fig. 16, through front contacts 1604 of relay PT1, through front contacts of relay PT0, via lead 1606, through back contacts of relay SSTA in the secondary surge circuit 1601 of Fig. 16 to point 1605 in the secondary surge circuit 1601. The ground thus applied to point 1605 suddenly raises the potential of point 1605 from —48 volts to ground. This voltage change is carried through coupling condenser K5 and applied to the control anode of cold cathode gas tube GSSTA in secondary surge circuit 1601 of Fig. 16. This voltage applied to the control anode gas tube of GSSTA causes the tube to ionize and conduct current through the winding of relay SSTA in the secondary surge circuit 1601. Relay SSTA operates and closes a discharge path for the oscillatory discharge of condenser K4 through inductance LOA, through the front contacts of relay SSTA, over the path traced above, through jumper 1217 to ground. As described above in connection with the translation of an individual subscriber's line, the surge current in jumper 1217 induces a voltage in the output windings of the translator coils through which jumper 1217 is threaded. The voltage induced in these coils will cause their associated gas tubes to fire and as described above, will in turn cause relays in the transverter calling line numerical designation registers 804 to operate and register the directory number of the calling subscriber.

In the manner above described, transverter 801 transmits the line equipment location of calling line 301 to the translator of Fig. 12 and the identity of the calling party on line 301 (in this case station "A") to the party station translator of Fig. 16. The translator of Fig. 12, by operation of relays in relay tree 1202, connects primary surge circuit 1201 to equipment terminal 1209 in Fig. 12 which is the equipment terminal assigned to line 301. Equipment terminal 1209 is in turn connected to the relay PTC2 in Fig. 16 which is the PTC relay associated with line 301 and relay PTC2 operates as a result of being connected to primary surge circuit 1201. The party station translator of Fig. 16, by operation of party station translator relays, connects secondary surge circuit 1601 through front contacts of the operated PTC2 relay to party line supplementary equipment terminal PST1 in Fig. 12 which is the party line supplementary equipment terminal assigned to the party subscriber at station "A" on calling line 301. Party line supplementary equipment terminal PST1 is in turn connected to ground by means of jumper 1217 which is threaded through one coil in each of the few groups of translator coils of Fig. 12 which indicate the office code digit, thousands digit, hundreds digit, tens digit and units digit respectively of the directory number assigned to the subscriber at station "A" on line 301. As a result of being connected to ground through jumper 1217, secondary surge circuit 1601 will send a surge of current through jumper 1217 which induces a voltage in translator coils through which it is threaded. This induced voltage in these translator coils will cause their associated gas to break down. Therefore, a voltage will be induced in coils I5, ITH4, IH3, IT4 and IU3 through which jumper 1217 passes which in turn will cause gas tubes GI5, GITH4, GIH3, GIT4 and GIU3 to fire. The ionization of these gas tubes will cause current to flow over leads DOF5, DTH4, DH3, DT4 and DU3 in cable 69 through translator connector 805 to operate relays in the transverter calling line numerical designation registers 804 and register the directory numbers 54343 of the calling subscriber at station "A" on line 301. The office code digit, that is the digit 5 of this number, may represent an office code such as TA–3 and therefore the directory number of station "A" on line 301 would be TA 3–4343. In this manner the directory number of the calling subscriber at station "A" on line 301 is registered in the calling line numerical designation registers 804 of transverter 801. As soon as the registration of the directory number of the calling subscriber at station "A" in the transverter calling line numerical designation registers 804 is completed, the translator of Fig. 12, the party station translator of Fig. 16 and the translator connector 805 of Fig. 8 release.

Transverter 801 now has the directory number of the called subscriber at station "C" on line 302 and the directory number of the calling subscriber at station "A" on line 301, and therefore has all the information required to initiate the perforating of the initial entry on the central office AMA tape except the message billing index and the call identity index of the selected AMA intraoffice trunk of Fig. 20. Transverter 801 can engage the proper recorder such as recorder 807 of Fig. 8 because it has received the number of this recorder which serves the AMA intraoffice trunk of Fig. 20 from sender 703. The marker has previously primed sender 703 with the message billing index. Therefore, sender 703 can transmit the message billing index at the appropriate time directly to recorder 807 via transverter connector 705, cable 67, transverter 801 and cable 73. To obtain the call identity index, transverter 801 signals the AMA intraoffice trunk of Fig. 20 serving the call, to identify itself. This signaling is accomplished via cable 67, transverter connector 705, sender 703, sender link 706 and cable 64. The AMA intraoffice trunk of Fig. 20 then signals trunk identifier 806 of Fig. 8 via cable 74 to transmit the call identity index of this particular trunk directly to recorder 807. The physical action of perforating the initial entry on the tap is performed by recorder 807 under control of transverter 801.

After the marker has selected the AMA intraoffice trunk of Fig. 20 as described above, it will supply a ground on the C–RC lead in cable 53 from the marker switch operating circuits 903 over the selecting path traced above to the winding of relay 2007 in the trunk circuit of Fig. 20 through front contacts of relay 2002. Relay 2007 in operating locks operated to the ground supplied through front contacts 2024 of relay 2001 over a path traced from battery through the winding of relay 2007, through front contacts 2025 of relay 2007, through back contacts of tripping relay 2009, through front contacts 2024 of relay 2001 to ground.

The marker is now ready to operate the ringing selection switch of Fig. 14 in accordance with the ringing combination which it received, as described hereinbefore, from the number group circuit of Figs. 19 and 21 and registered in the marker ringing combination register relay RCT4 shown in Fig. 11. As described hereinbefore, the operation of relay RCT4 of Fig. 11 will ground leads RS4 and RS3 in cable 49. These leads are extended by cable 49, cable 2, trunk link connector 313 and cable 50 to the select magnets of the ringing selection switch of Fig. 14 and will operate select magnets SEL3 and SEL4.

The operation of relay 2007 in the AMA intraoffice trunk of Fig. 20 in response to ground on the C–RC lead in cable 53 from the marker, as above described, will close a circuit through front contacts 2026 of relay 2007 for the application of ground to lead HC in cable 75 to the ringing selection switch of Fig. 14. The closure of contacts 2026 of relay 2027 as above described will cause the operation of hold magnet HL9 in the ringing selection switch of Fig. 14 which is connected from battery to lead HC in cable 75. The circuit for the operation of hold magnet HL9 in the ringing selection switch of Fig. 14 may be traced from ground through front contacts 2024 in relay 2001, through back contacts 2027 of relay 2003, through front contacts 2026 of relay 2007 over lead HC in cable 75, through the winding of hold magnet HL9 in the ringing selection switch of Fig. 14 to battery. The operation of hold magnet HL9 in the ringing selection switch of Fig. 14 will complete a circuit for the ringing ground supply over lead RG from the ringing supply circuit of Fig. 13 through front contacts in hold magnet HL9 over lead RGC in cable 75 to the lower front contact of relay 2008 in the AMA intraoffice trunk of Fig. 20. The operation of select magnets SEL3 and SEL4 as above described also completes a circuit for the application of a ringing signal on lead RRC in cable 75 to the AMA intraoffice trunk of Fig. 20 as will be described below.

When the marker has completed its functions for this call, it will release relay 2002 in the AMA intraoffice trunk of Fig. 20. The release of relay 2002 will open leads C–F, C–S1 and C–RC, which extend to the marker via cable 53 and the selecting path traced above. The opening of the C-S1 lead, opens the operating circuit for relay 2001, however, relay 2001 does not release at this time as it is a slow release relay. The opening of the C-RC lead, opens the operating circuit for relay 2007, however, relay 2007 does not release as it is locked operated under control of tripping relay 2009, as described above. The release of relay 2002 of Fig. 20 will also remove ground from ground CI-FA in cable 54 and lead CO-FA in cable 55 to the trunk link circuit. Removal of ground of these two leads, that is, CI-FA and CO-FA will cause the trunk link circuit to complete the connections between the calling subscriber at station "A" on line 301 and the called subscriber at station "C" on line 302 to the AMA intraoffice trunk of Fig. 20. Upon completion of the connection between station "A" on line 301 and the AMA intraoffice trunk of Fig. 20, relay 2005 in the trunk will operate over the subscriber's loop to station "A". Relay 2005 in operating will reestablish a circuit to hold relay 2001 operated which as described above, lost its operating circuit when relay 2002 released. Relay 2001 is slow in releasing and will hold over this interval.

When the marker has completed the functions on this call, as described above, it disconnects from the sender which is connected to the trunk of Fig. 20. The sender then calls for the connection to the transverter to make the initial entry on the AMA central office tape. The C-TM lead in cable 64, from sender 703, via sender link 706, is connected through in the trunk of Fig. 20 to the CC-DJ lead in cable 74 which extends to trunk identifier 806 of Fig. 8. The CC-OT lead in cable 74 from the trunk of Fig. 20 to trunk identifier 806 is free of any potential in the trunk. The CC-RC lead in cable 74 to trunk identifier 806 is grounded through front contacts 2028 of relay 2010, back contacts 2029 of relay 2011, and back contacts 2030 of relay 2012 insuring that these relays are normal. The CC-TC lead in cable 74 to trunk identifier 806 is connected to battery through the winding of relay 2011. With these conditions present on these four leads, that is, leads CC-RC, CC-DJ, CC-TC and CC-OT which are individual to the trunk of Fig. 20, the transverter controls recorder 807 via cable 73 and the initial entry is made on the AMA central office tapes. When the initial entry is completed, ground is supplied to lead CC-TC in cable 74 from recorder 807, through trunk identifier 806 to operate relay 2011 in the AMA intraoffice trunk of Fig. 20. Relay 2011 of Fig. 20 operates and locks under control of relay 2010 from ground through front contacts 2031 of relay 2010. The operation of relay 2011 removes all potential from lead CC-TC in cable 74 to the trunk identifier 806 and removes ground from the CC-RC lead in cable 74 and extends this lead to a front contact of relay 2012. The removal of ground from the CC-RC lead and the opening of the CC-TC lead in cable 74 indicates the completion of the initial entry on the AMA central office tape and the AMA equipment causes the release of sender 703 by releasing sender link 706.

When the marker has completed its functions for this call, as described above, it also releases itself, the originating register, the party station identifier and the associated connectors from the connection. The dialing connection is thus disengaged and the subscribers at station "A" on line 301 and station "C" on line 302 are interconnected through the AMA intraoffice trunk of Fig. 20 and channels 39 and 40 of Fig. 3. The AMA intraoffice trunk of Fig. 20 now controls the ringing and supervision of the call.

The operation, as above described, of the two selecting magnets SEL3 and SEL4 in the ringing selection switch of Fig. 14 has selected a particular ringing signal which has an audio frequency component corresponding to the frequency of the vibratory element in called station "C" on line 302. In this particular case, the operation of the two select magnets SEL3 and SEL4 has completed a circuit from the secondary winding of transformer T19 in the ringing supply circuit of Fig. 13, over lead RR19, through cross point contacts 1404 and 1405 in the ringing selection switch of Fig. 14, over lead RRC in cable 75 to the upper front contact of relay 2008 in the AMA intraoffice trunk of Fig. 20. As above described, the operation of hold magnet HL9 in Fig. 14 completed a circuit from ringing ground lead RG in the ringing supply circuit of Fig. 13 to the lower front contact of relay 2008 in the trunk of Fig. 20. The operation of interrupter INT2 in the ringing supply circuit of Fig. 13 will connect a ground over lead IG through cross point contacts 1406 in the ringing selection switch of Fig. 14 over lead IGC in cable 75 to the AMA intraoffice trunk of Fig. 20. Ground on lead IGC in cable 75 will cause the operation of relay 2008 in the AMA intraoffice trunk circuit of Fig. 20. Relay 2008 in operating will complete a circuit from the primary winding of transformer TRC1 in Fig. 20 to the RRC and RGC leads in cable 75. In this manner the selected ringing signal which comprises a 20-cycle alternating-current signal having superimposed thereon a selected audio frequency signal is applied to the primary winding transformer TRC1. The secondary windings of transformer TRC1 are connected to the tip and ring conductors of called line 302. The connection to the tip conductor may be traced from ground through the upper secondary winding of transformer TRC1, through front contacts 2032 of relay 2007, to the tip conductor of the called line. The connection to the ring conductor of the called line may be traced from positive battery through the lower secondary winding of transformer TRC1, through front contacts 2033 of relay 2007 to the ring conductor of the called line. The ringing signal is, therefore, applied to the ring conductor of the called line in series with a positively poled battery. This ringing signal is applied for two seconds and off for four seconds. Interrupter INT2 in the ringing supply circuit of Fig. 13 will operate at this rate in order to provide a two-second ringing interval and a four-second silent interval. After the ringing interval is completed, interrupter INT2 in the ringing supply circuit of Fig. 13 releases and remains released for a four-second interval. The release of interrupter INT2 will remove ground from lead IGC in cable 75 which will release relay 2008. The release of relay 2008 will complete a circuit from ground through the primary winding of TRC2 through the upper back contacts of relay 2008, through the primary winding (which is utilized as a secondary winding now) of transformer TRC1 through the lower back contacts of relay 2008 to ground.

As described hereinbefore, the presence of the audio frequency component of the ringing signal applied to line 302 in coil P at station "C" causes vibratory element V in station "C" to vibrate and intermittently close vibratile contact X. As soon as vibratile contact X at station "C" closes, the positively poled 20-cycle ringing signal on the ring conductor on line 302 is connected to the control anode CA of gas tube GT in the subscriber's set at station "C" and will initiate a discharge through the tube. Current flowing through the main gap of gas tube GT in the subset at station "C" resulting from the breakdown of this tube will operate ringer RNG as hereinbefore described.

As hereinbefore described, when the subscriber at station "C" lifts his handset to answer the call, switch-hook contacts SH in his subset will convert the reed type selector in the subset to a self driven buzzer or oscillator which will be sustained in oscillation by the positively poled battery on the ring conductor of line 302 from the lower secondary winding of transformer TRC1 in the AMA intraoffice trunk of Fig. 20. While acting as a self driven buzzer or oscillator, the reed type selector in the subset at station "C" applies an audio frequency signal back on line 302 which is substantially a sine wave of the frequency of the vibratory element in the subset at station "C." This signal will be applied to the secondary winding of transformer TRC1 in the AMA intraoffice trunk of Fig. 20 and will be induced into the primary winding of this transformer. This induced signal in the primary winding of transformer TRC1 is in turn fed into the primary winding of transformer TRC2 where it is stepped up and applied to the control anode of gas tube GTAC in the trunk of Fig. 20. When this signal is applied to the control anode of gas tube GTAC, it causes the tube to ionize and condut current through the winding of tripping relay 2009. Tripping relay 2009 operates in response to the discharge in gas tube GTAC and opens the locking circuit for relay 2007. Relay 2007 releases and opens the operating circuit for hold maganet HL9 in the ringing selection switch of Fig. 14. The operation of tripping relay 2009 and the subsequent release of relay 2007 will move ringing current from the tip and ring conductors of called line 302 and complete a connection through the windings of relay 2006 over the tip and ring conductors of the called line to the called subscriber. Relay 2006 furnishes talking battery to the called subscriber through its windings and operates over the called subscriber's loop. The release of relay 2007 also completes the talking connection between the tip and ring conductors of line 301 from the calling subscriber at station "A" and the tip and ring conductors of line 302 to the called subscriber at station "C" through condensers CT and CR. The call will then be under the control of the supervisory relays in the AMA intraoffice trunk of Fig. 20.

As soon as the initial entry has been perforated on the AMA central office tape, the automatic message accounting equipment is released and the AMA intraoffice trunk of Fig. 20 controls the supervision of the call and the subsequent entries on the AMA central office tape. When the called subscriber at station "C" on line 302 answers, the AMA intraoffice trunk of Fig. 20 calls in its associated recorder 807 via cable 74 and trunk identifier 806 and recorder 804 perforates the "answer-time" entry on the AMA central office tape and then releases. When the calling subscriber at station "A" on line 301 disconnects after the call is completed, the AMA intraoffice trunk of Fig. 20 again calls in recorder 807 via cable 74 and trunk identifier 806 and recorder 807 perforates a "disconnect time" entry on the AMA central office tape. Both the "answer time" and "disconnect time" entries on the tape will have the same call identity index as the initial entry on the tape. Master timer 808 furnishes a means by which recorder 807 may determine the duration of the call. The operation of the AMA intraoffice trunk of Fig. 20, trunk identifier 806, transverter 801, recorder 807 and master timer 808 as they function to control and initiate the "answer time" and "disconnect time" entries on the AMA central office tape are described in detail in the previously cited Carpenter et al. application. It should be noted however, that in the Carpenter et al. application, the AMA intraoffice trunk described herein is designated "district junctor" and the trunk identifier described herein is designated "district identifier." The ringing selection switch of Fig. 14 will release when hold magnet HL9 releases after release of relay 2007 in the trunk circuit of Fig. 20. When the call is finished, the originating and terminating connections are broken as described in detail in the previously cited Carpenter et al. application and Busch patent and the AMA intraoffice trunk of Fig. 20 is released.

*Reverting call, detailed description*

Assume that the subscriber at station "A" on line 301 is calling the subscriber at station "B," which is also on line 301, and therefore the call will be an intraoffice reverting call. Assume further that the subscribers on line 301 have contracted for flat rate service, which means, as mentioned above, that the automatic message accounting equipment will not be involved as there is no need of a record of the call. After the calling subscriber at station "A" completes the dialing of the office code and numerical digits of the directory number of the subscriber at station "B," in the manner described hereinbefore, the originating register, shown in Fig. 6, will engage an idle marker, such as the marker shown in Figs. 9, 10 and 11 through originating register marker connector 701, shown in block form in Fig. 7. In the manner hereinbefore described, the originating register of Fig. 6 will transmit the line equipment location of calling line 301 to the marker calling line location registers of Fig. 10, the numerical digits of the directory number of the called subscriber at station "B" to the marker called line number registers of Fig. 10, the office code of the directory number of the called subscriber at station "B" to the marker code registers 902 of Fig. 9, the class of service information of calling line 301 to the marker calling line class registers 905 of Fig. 9 and the identity of the line link used in establishing the dialing connection. The registration of the identity of the particular party (in this case station "A") on line 301 which originated the call is retained in the party station register of Fig. 5 until the marker determines whether or not this information is needed.

The marker translates the office code of the called directory number of station "B," which is registered in marker code registers 902 of Fig. 9, and determines that the called number is in the same office as calling line 301. The registration of the called office code in the marker code register 902 in Fig. 9 causes a ground to be applied to the upper terminal of the winding of route relay RT, shown in Fig. 9. As described hereinbefore, route relay RT is the appropriate relay for controlling the routing of a call to a subscriber in the same office as the calling line (an intraoffice call). From the class of service information registered in the marker calling line class registers 905 of Fig. 9, the marker can determine whether calling line 301 is a flat rate or a message rate line. Under the assumed conditions the subscribers on line 301 have contracted for flat rate service, therefore, upon the registration of this class information in the marker calling line class registers 905 of Fig. 9, class relay CSFR of Fig. 9, which is a class relay for a flat rate line, will be operated by ground from the marker calling line class registers 905, through the winding of class relay CSFR to battery. Operation of class relay CSFR will apply a battery through the resistance R6, through front contacts of class relay CSFR, through the winding of route relay RT to the ground applied to the upper terminal of the winding of relay RT by code registers 902, as described above. The operation of relay RT in Fig. 9 will close a circuit from ground on the right-hand back contacts of relay GS in Fig. 9, through the right-hand front contacts of relay RT, over lead 911, to the marker switch operating circuits 903 of Fig. 9. Ground will also be applied through back contacts 906 of relay GS, through front contacts 907 of relay RT, over lead 912 to the marker class of call registers 904 shown in Fig. 9. The operation of relay RT will also close a circuit from ground through back contacts 908 of relay GS through front contacts 909 of relay RT through the winding of relay ITR1 to battery. Relay ITR1 operates and locks operated to ground at the back contact of relay ITA.

From the translation of the office code information of the directory number of the called subscriber at station "B" and the class of service information of calling line 301, the marker determines that the call which has been originated on line 301 is an intraoffice call and that it is a flat rate call and one for which the automatic message accounting equipment will not be required. The marker does not realize at this time that the called line and the calling line are the same and proceeds to set up the terminating and originating connections for a non-reverting intraoffice call in the manner hereinbefore described.

The marker functions in a manner similar to that described hereinbefore in establishing the terminating connection to a flat rate intraoffice trunk. Before the terminating connection can be set up, the marker must obtain the equipment location of the called line and the proper ringing combination for ringing the called station on this line. As described hereinbefore, the marker selects the proper number group, such as the number group shown in Figs. 19 and 21, through the number group connector of Fig. 15. The marker transmits the digits of the called subscriber's directory number to the selected number group. The selected number group in turn will translate this information into an equipment location in terms of line link frame number, horizontal group number, vertical group number and vertical file number and transmits this information back again to the marker where it is registered in the marker called line location register of Fig. 10, in the manner hereinbefore described. The marker also receives from the number group circuit of Figs. 19 and 21 the correct ringing combination for signaling the called station on the called line and registers this information in the marker ringing combination register relays of Fig. 11 in the manner above described.

While the marker is obtaining the called line location and ringing combination from the number group, as described above, it is also selecting an idle flat-rate intraoffice trunk in a manner similar to that described hereinbefore. After the marker receives the equipment location of the called line from the number group circuit of Figs. 19 and 21 and registers this information in the marker called line location register of Fig. 10 and during the time it is selecting an idle flat-rate intraoffice trunk, as above described, it will proceed as described hereinbefore, to make a comparison between the called line location and the calling line location. If these two equipment locations differ, the marker knows that it may proceed to complete the call over the selected flat-rate intraoffice trunk. However, if the calling line and called line equipment locations are the same, this will be a signal to the marker that the call which has been originated over calling line 301 is a reverting call and that the marker must then release the selected flat rate intraoffice trunk and proceeds to establish a reverting call over a reverting call trunk. The manner in which the marker compares the called line and calling line equipment locations is shown in abbreviated schematic form in Fig. 10. A more detailed description and disclosures of this feature of the marker is found in Patent 2,595,944 which issued to R. E. Hersey, May 6, 1952. After both locations are registered in their respective registers, shown in Fig. 10, a continuity check is made through the operated called line location register relays and the operated calling line location register relays. If the registration in both sets of registers is the same, ground will be supplied through front contacts of calling line location register relay FTN0 through all of the operated relays in both groups of registers to the winding of the RV relay of Fig. 10. Therefore, if the called line equipment location and the calling equipment location are the same, relay RV in Fig. 10 will be operated. Under the assumed conditions, the calling subscriber at station "A" on line 301 is calling a subscriber at station "B" on the same line and therefore the registration of the equipment locations for the calling line and the called line in the registers of Fig. 10 will be the same and relay RV will be operated, as described above.

Relay RV of Fig. 10 in operating extends a ground through front contacts 1001 of relay RV, over lead 79, through the right-hand front contacts of relay ITR1 of Fig. 9, through the winding of relay RAV of Fig. 10 to battery. Relay RAV operates and extends ground through its right-hand front contacts, through the left-hand front contacts of relay ITR1, to the winding of relay ITA. Relay ITA in operating opens the locking circuit traced above for relay ITR1. Relay RAV of Fig. 9 in operating also extends a ground through its left-hand front contacts, through front contacts 915 of relay RT, back contacts 916 of relay GS, through the winding of relay RA to battery. Relay RA operates and locks operated through its own front contacts and through the left-hand front contacts of relay RAV to ground. Relay RA in operating extends a ground through its right-hand front contacts through the winding of relay GS to battery. Relay GS operates and locks operated through its own right-hand front contacts. Relay GS in operating removes the ground from lead 911 extending to the marker switch operating circuits 903, through the right-hand front contacts of relay RT and removes ground from lead 912 extending to the marker class of call registers 904, through front contacts 907 of relay RT. Relay GS in operating also opens the operating circuit for relay ITR1 which extends from ground through back contacts 908 of relay GS, through front contacts 909 of relay RT, to the winding of relay ITR1. Relay ITR1 will release because both its operating path and locking path have been opened. The release of relay ITR1 will open the operating path for relay RAV over conductor 79, to front contacts 1001 of relay RV of Fig. 10. Relay RAV will release and in turn open the operating circuit for relay ITA which releases. Relay RAV in releasing also opens the locking circuit for relay RA which releases. Relay RA in releasing extends a ground through the right-hand back contacts of relay RA, through front contact 917 of relay GS, through front contacts 918 of relay RT, over lead 81, through front contact 1002 of relay RV of Fig. 9, over lead 80, through the left-hand front contacts of relay CSFR of Fig. 9 to the winding of relay RT1 and battery. Relay RT1 is a supplementary route relay which controls the reverting call trunk selecting circuits in the marker switch operating circuits 903 of Fig. 9. Relay RT1 operates and closes grounds through back contacts of relay GS1, over lead 914 to the marker class of call registers 904 and over lead 913 to the marker switch operating circuits 903. The removal of ground from lead 911, as above described, and the application of the ground over lead 913 to the marker switch operating circuits 903 will cause these circuits to release the selected flat rate intraoffice trunk and to proceed with the selection of a reverting call trunk, such as the trunk shown in Fig. 18.

Figure 18:
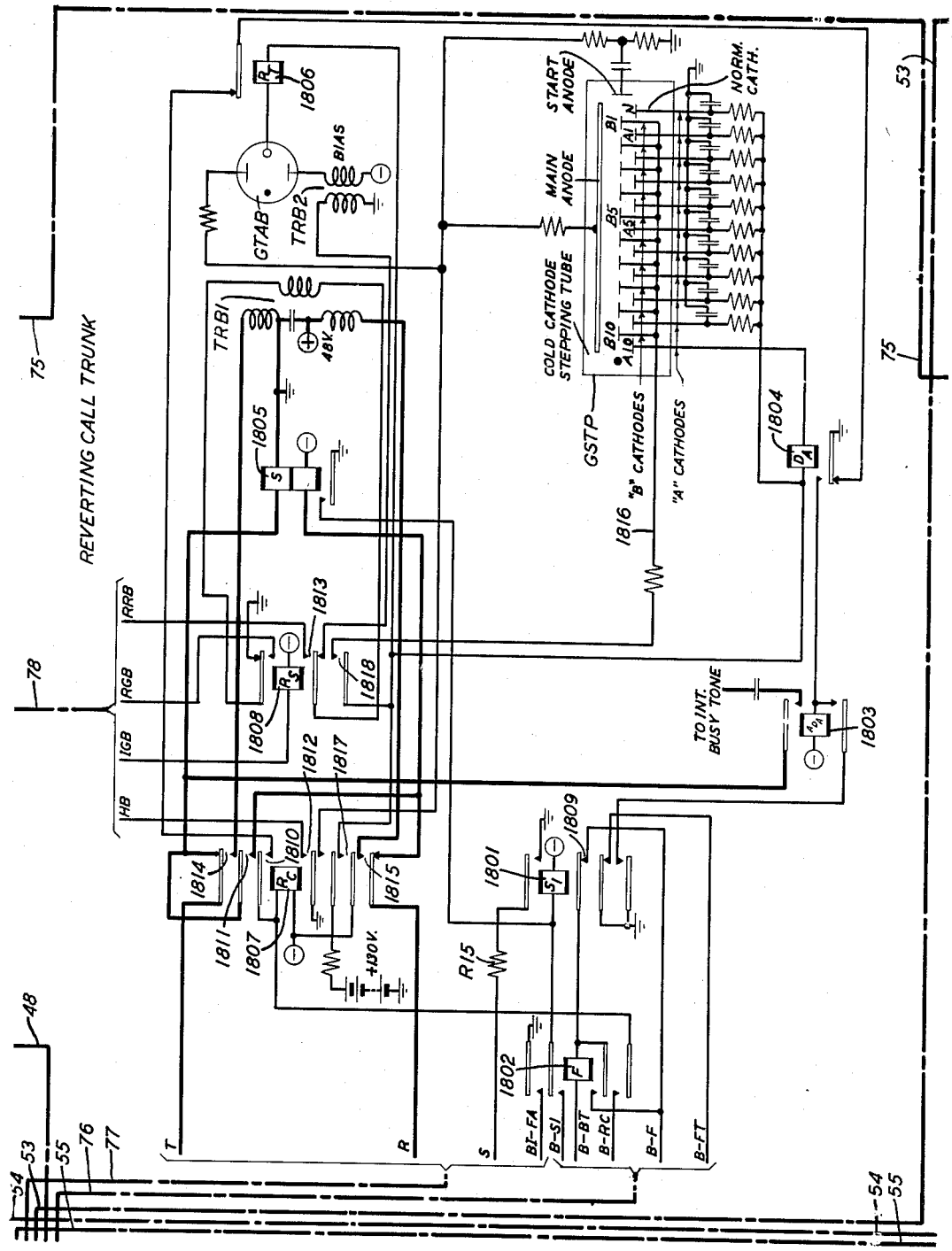
Fig. 18 shows in schematic form a reverting call trunk.

The ground applied to the marker switch operating circuits 903 shown in Fig. 9, via lead 913, as above described, will initiate the reverting call trunk selecting circuits of the marker. The selection of a reverting call trunk, such as the trunk shown in Fig. 18, is made by the marker switch operating circuits 903 over a selecting path comprising cable 35, cable 2, trunk link connector 313, cable 36 and cable 76. There is a frame test lead for each trunk link frame on which reverting call trunks appear. This FT lead, such as lead B–FT for the trunk of Fig. 18, and an F lead, such as lead B–F for the trunk of Fig. 18, which will be discussed below, are multipled between trunks in a cross-connecting field on the trunk link frame. Each idle trunk, such as the trunk shown in Fig. 18, supplies ground to the FT lead, lead B–FT for the trunk of Fig. 18, through normally closed back contacts of relay 1801. The ground on the B–FT lead is extended to the marker switch operating circuits 903 of Fig. 9 via the selecting path traced above. The marker knows that there is at least one idle reverting call trunk on each trunk link frame that has a grounded FT lead. The marker selects one of the trunk link frames, such as trunk link frame 312, with available trunks and supplies a ground via the selecting path traced above on the B–F lead in cable 76 to the trunk. Ground on the B–F lead from the marker via cable 76 will be extended to the right-hand terminal of the winding of relay 1801 in the reverting call trunk of Fig. 18, through back contacts 1809 of relay 1801. The marker selects the reverting call trunk of Fig. 18 by supplying battery over the selecting path traced above to the B-BT lead in cable 76 which operates relay 1802. Relay 1802 locks operated to the ground from the marker over the B-F lead in cable 76 and the selecting path traced above.

Relay 1802 in operating supplies a ground to the BI-FA lead in cable 77 which extends to the trunk link circuit and causes the trunk link circuit to perform the necessary functions in conjunction with the marker to establish the connection between the reverting call trunk of Fig. 18 and line 301. Relay 1802 in operating also extends the B-S1 lead in cable 76 to the winding of relay 1801. The marker switch operating circuits 903 will place a ground on the B-S1 lead which will operate relay 1801. Relay 1801 in operating makes the trunk busy by opening the B-F lead and removes the ground from the B-FT lead. Relay 1801 in operating also supplies 10-ohm ground to the sleeve conductor of line 301 through resistance R15 to hold the hold magnets operated and thus maintain a connection between line 301 and the reverting call trunk of Fig. 18.

The marker can proceed with the establishment of the connection between line 301 and the reverting call trunk of Fig. 18 because it knows the line equipment location of line 301. The marker determines from the information recorded in the calling line location registers of Fig. 10 that line 301 is located on line link frame 303. The marker switch operating circuits 903 of Fig. 9 will operate in conjunction with the marker calling line location registers of Fig. 10 to seize line link frame 303 on which line 301 is terminated via cable 38, cable 3 and line link connector 305 from the marker switch operating circuit 903 and cable 82, cable 3 and line link connector 305 from the marker calling line location register of Fig. 10. Before the marker releases the dialing connection which was established through channel 10, as described above, it determines whether there is an idle channel, such as channel 40, between line link frame 303 and trunk link frame 312. If there is an idle channel, such as channel 40 in Fig. 3, the dialing connection is released immediately enabling the marker to use the dialing connection line link as a part of the connection between line link frame 303 and trunk link frame 312, if necessary. The marker has received from the originating register the identity of this line link used in the dial tone connection. The connection between line 301, which serves both the calling subscriber and the called subscriber and the selected reverting call trunk of Fig. 18, is completed over channel 40 between line link frame 303 and trunk link frame 312 and cable 77 to the reverting call trunk of Fig. 18.

After the marker has selected the reverting called trunk of Fig. 18, as described above, and has completed a connection between this trunk and line 301, the marker will supply a ground on the B-RC lead in cable 76 from the marker switch operating circuits 903 of Fig. 9 over the selecting path traced above through front contacts of relay 1802 in the reverting call trunk of Fig. 18 to the winding of relay 1807 in the trunk. Relay 1807 operates and locks operated. The locking circuit for relay 1807 may be traced from battery through the winding of relay 1807, through front contacts 1810 of relay 1807, through back contacts of relay 1806, through back contacts of relay 1804 to ground. Relay 1807 in operating closes a circuit for the operation of relay 1805. The operating path for relay 1805 may be traced from battery through the lower winding of relay 1805, through front contacts 1811 of relay 1807, through the upper winding of relay 1805 to ground. Relay 1805 in operating supplies a locking ground for relay 1801. The operation of relay 1807 also closes the secondary windings of transformer TRB1, through to the tip and ring conductors in cable 77 which extend to line 301.

The marker is now ready to operate the ringing selection switch of Fig. 14 in accordance with the ringing combination which it received, as described above, from the number group circuit of Figs. 19 and 21 and registered in the marker ringing combination register relay RCT4, shown in Fig. 11. The operation of relay RCT4, as above described, will place a ground on leads RS4 and RS3 in cable 49 which extends via cable 49, cable 2, trunk link connector 313 and cable 50 to the select magnets in ringing selection switch of Fig. 14. Because the operation of relay RCT4 of Fig. 11 grounded leads RS4 and RS3, as above described, select magnets SEL3 and SEL4 in the ringing selection switch of Fig. 14 will be operated.

The operation of relay 1807 in the reverting called trunk of Fig. 18 in response to ground on lead B-RC in cable 77 from the marker, as above described, will close a circuit through front contacts 1812 of relay 1807 to lead HB in cable 78 to the ringing selection of Fig. 14. The closure of front contacts 1812 of relay 1807, as above described, will cause the operation of hold magnet HL4 in the ringing selection switch of Fig. 14 which is connected from battery to lead HB in cable 78. The operation of hold magnet HL4 in the ringing selection switch of Fig. 14 will complete a circuit for the ringing ground supply over lead RG from the ringing supply circuit of Fig. 13 through front contacts of hold magnet HL4 over lead RGB in cable 78 to the upper front contacts of relay 1808 in the reverting call trunk in Fig. 18. The operation of select magnets SEL3 and SEL4, as described above, completes a circuit for the application of a ringing signal on lead RRB in cable 78 to the reverting call trunk of Fig. 18, as will be described below.

When the marker has completed its functions for this call, it will release relay 1802 in the reverting call trunk of Fig. 18. The release of relay 1802 will open leads B-S1, B-F and B-RC which extend to the marker via cable 76 and the selecting path traced above. The opening of the B-S1 lead opens the operating circuit for relay 1801. However, relay 1801 does not release at this time as it is a slow releasing relay and furthermore is locked operated through front contacts of relay 1805. The opening of the B-RC lead opens the operating circuit for relay 1807. However, relay 1807 does not release as it is locked operated under control of tripping relay 1806 and relay 1804 as above described. The release of relay 1802 in Fig. 18 will also remove ground from lead BI-FA in cable 77 to the trunk link circuit. Removal from ground from lead BI-FA will cause the trunk link circuit to complete the connection between line 301 and the selected reverting call trunk of Fig. 18.

When the marker has completed its functions, as described above, on this call, it also releases itself, the originating register, the party station identifier and associated connectors from the connection. The subscribers at station "A" and station "B" on line 301 are interconnected for signaling and supervision purposes through the reverting calling trunk of Fig. 18, via channel 40 and cable 77. The reverting calling trunk of Fig. 18 now controls the ringing and supervision of the call.

The operation, as above described, of the two select magnets SEL3 and SEL4 in the ringing selection switch of Fig. 14 has selected a particular ringing signal which has an audio frequency component corresponding to the frequency of the vibratory element in called station "B" on line 301. In this case the operation of the two select magnets SEL3 and SEL4 has completed a circuit from the secondary winding of transformer T19 in the ringing supply circuit of Fig. 13 over lead RR19, through crosspoint contacts 1407 and 1408 in the ringing selection switch of Fig. 14, over lead RRB in cable 78, to front contacts 1813 of relay 1808 in the reverting call trunk of Fig. 18. As above described, the operation of hold magnet HL4 completed a circuit from the ringing ground lead RG in the ringing supply circuit of Fig. 13 to the upper front contact of relay 1808. The operation of interrupter INT2 in the ringing supply circuit of Fig. 13 will connect a ground over lead IG through cross-point contacts 1409 in the ringing selection switch of Fig. 14, over lead IGB in cable 78, to the reverting call trunk of Fig. 18. Ground on lead IGB in cable 78 will cause the operation of relay 1808 in the trunk circuit. Relay 1808 in operating will complete a circuit from the primary winding of transformer TRB1 to the RRB and RGA leads in cable 78. In this manner the selected ringing signal which comprises a 20-cycle alternating-current signal having superimposed thereon a selected audio frequency signal is applied to the primary winding of transformer TRB1. This ringing signal is then induced into the secondary windings of transformer TRB1 and applied across the tip and ring of the line. The connection to the tip conductor of the line may be traced from ground through the upper secondary winding of transformer TRB1, through front contacts 1814 of relay 1807 to the tip conductor of line 301. The connection to the ring conductor of the line may be traced from positive battery through the lower secondary winding of transformer TRB1, through front contacts 1815 of relay 1807 to the ring conductor of line 301. The ringing signal is therefore applied to the ring conductor of line 301 in series with a positively poled battery. The ringing signal is applied for two seconds and is off for four seconds. Interrupter INT2 in the ringing supply circuit of Fig. 13 will operate at this rate in order to provide a two-second ringing interval and a four-second silent interval. After a ringing interval is completed, interrupter INT2 in the ringing supply circuit of Fig. 13 releases and remains released for a four-second interval. The release of interrupter INT2 will remove ground from lead IGB in cable 78 which will release relay 1808. The release of relay 1808 will complete a circuit from ground through the primary winding of transformer TRB2, through the lower back contacts of relay 1808, through the primary winding (which is utilized as a secondary winding now) of transformer TRB1, through the upper back contacts of relay 1808 to ground.

As described hereinbefore the presence of the audio frequency component of the ringing signal applied to line 301 in coil P at station "B" causes vibratory element V in station "B" to vibrate and intermittently close vibratile contact X. As soon as vibratile contact X at station "B" closes, the positively poled 20-cycle ringing signal on the ring conductor of line 301 is connected to the control anode CA of gas tube GT in the subscriber's set at station "B" and will initiate a discharge through the tube. Current flowing through the main gap of gas tube GT in the subset at station "B" resulting from the breakdown of this tube will operate ringer RNG at station "B" as hereinbefore described. Varistor VR in the subset at station "A" on line 301 is poled so as to present a high impedance to the positively poled ringing current applied on line 301 so that the ringing current applied to the subset at station "B" will not be materially reduced by the shunting affect of the transmitter receiver dial TRD in the subset of station "A" which are bridged across line 301 by the switchhook contacts SH at station "A." The ringer at station "A" and all other stations on line 301 except station "B" will not be operated because the audio frequency component required for energizing the reed-type selectors in these stations has not been impressed upon line 301 and therefore the only station on line 301 which is signaled is station "B." Furthermore, it is not necessary for station "A" to hang up or replace his receiver during the signaling interval because as mentioned above, the varistor VR in the subset of station "A" prevents his transmitter receiver dial TRD from materially reducing the ringing current applied to station "B."

When relay 1807 in the reverting coil trunk of Fig. 18 operates in response to ground on the B–RC lead as described above, it supplies positive anode potential to the main anode of cold cathode gas tube GTAB in the reverting call trunk of Fig. 18 and to the main anode of cold cathode stepping tube GSTP in the trunk of Fig. 18. Relay 1807 in operating also supplies a positive potential to the start anode of cold cathode stepping tube GSTP. Cold cathode stepping tube GSTP is of the type disclosed and described in detail in Patent 2,575,370 which issued to M. A. Townsend, November 20, 1951. This tube acts as a counting tube and counts up to 10 applications of ringing current on the line, that is, tube GSTP counts 10 ringing intervals. If the called subscriber (in this case the subscriber at station "B" on line 301) does not answer by the time stepping tube GSTP has counted ten ringing intervals, the tube operates relay 1804 as will be described below. Relay 1804 in operating opens the locking circuit for relay 1807. Relay 1807 releases and opens the operating circuit for hold magnet HL4 in the ringing selection switch of Fig. 14. Relay 1807 in releasing also releases relay 1805. Relay 1805 will reoperate however over the tip and ring conductors of line 301 and the subscriber's loop at station "A." Relay 1805 in reoperating reestablishes the locking circuit for relay 1801. Relay 1801 is a slow release relay and holds over the interval between the release and reoperation of relay 1805. The operation of relay 1804 and the subsequent release of relay 1807 will remove the ringing current from the tip and ring conductors of line 301. The operation of relay 1804 also closes a ground through its front contacts to the winding of relay 1803. Relay 1803 operates and locks operated to ground through front contacts of relay 1801 and connects interrupted busy tone to the ring conductor of line 301 to indicate that the called subscriber, that is station "B," does not answer. Upon hearing this interrupted busy tone, the calling subscriber at station "A" will then hang up his receiver which will release relay 1805. Relay 1805 in releasing will also release relay 1801 which in turn will release relay 1803 and the trunk is restored to normal.

The operation of the cold cathode stepping tube GSTP in the reverting calling trunk of Fig. 18 will be briefly described. As mentioned above, the operation of relay 1807 sends a positive pulse to the start anode of stepping tube GSTP which causes the tube to break down to the normalizing cathode. The arc which results between the start anode and the normalizing cathode then immediately transfers to the main anode of stepping tube GSTP and remains established between the main anode and the normalizing cathode. When relay 1808 operates in response to ground over lead IGB, during a ringing interval as described above, a negative pulse is applied to stepping lead 1816, through front contacts 1817 of relay 1807, front contacts 1818 of relay 1808 and over lead 1816 to the B cathodes of stepping tube GSTP. This negative pulse causes the nearest B cathode (in this case cathode B1) to steal the arc from the normalizing cathode of stepping tube GSTP. As soon as relay 1808 releases at the termination of the ringing interval the negative voltage on pulsing lead 1816 is removed and the A1 cathode steals the arc. The arc then remains established between the main anode and the A1 cathode. When the next ringing interval occurs and relay 1808 operates in response to ground lead IGB, a negative pulse is again applied to the stepping lead 1816 of stepping tube GSTP and the nearest B cathode (in this case cathode B2) steals the arc from the A1 cathode. When the negative voltage is again removed from lead 1816 at the termination of this ringing interval the A2 cathode then seizes the arc. Therefore upon each application of negative voltage to stepping lead 1816 the nearest B cathode in stepping tube GSTP will seize the arc previously established between the main anode and one of the A cathodes and upon the removal of the negative voltage from stepping lead 1816 the arc will transfer to the next A cathode in succession. These steps continue for ten applications of ringing current to the line unless the subscriber answers before the tenth ringing interval and trips the ringing current as will be described below. In other words each negative pulse applied to lead 1816 through front contacts 1818 of relay 1808 will transfer the arc a step at a time down the cathodes of cold cathode stepping tube GSTP until the arc reaches the tenth A cathode, that is cathode A10. When the arc is established between the main anode and cathode A10 of stepping tube GSTP, a circuit will be completed through the winding of relay 1804 which as described above, operates to trip the ringing current and to operate relay 1803 which in turn applies an interrupted busy tone to the line.

Returning again to the called subscriber at station "B." As hereinbefore described when the subscriber at station "B" lifts his handset to answer the call, the switchhook contacts SH in his subset will convert the reed-type selector in his subset to a self driven buzzer or oscillator which will be sustained in oscillation by the positively poled battery on the ring conductor of line 301 from the lower secondary winding of transformer TRB1 in the reverting call trunk of Fig. 18. While acting as a self-driven buzzer or oscillator, the reed-type selector in the subset at station "B" applies an audio frequency signal back on line 301 which is substantially a sine wave of the frequency of the vibratory element in the subset at station "B." This signal will be applied to the secondary windings of transformer TRB1 in the reverting call trunk of Fig. 18 and will be induced into the primary winding of this transformer. This induced signal in the primary winding of transformer TRB1 is in turn fed into the primary winding of transformer TRB2 where it is stepped up and applied to the control anode of gas tube GTAB in the trunk circuit of Fig. 18. When this signal is applied to the control anode of gas tube GTAB it causes the tube to ionize and conduct current through the winding of tripping relay 1806. Tripping relay 1806 operates in response to the discharge in gas tube GTAB and opens the locking circuit for relay 1807. Relay 1807 releases and opens the operating circuit for hold magnet HL4 in the ringing selection switch of Fig. 14. The operation of tripping relay 1806 and the subsequent release of relay 1807 will remove ringing current from the tip and ring conductors of call 301 and will release relay 1805. After the release of relay 1807, relay 1805 will reoperate over the tip and ring conductors of line 301 and the subscriber's loop at station "B." Relay 1805 in operating furnishes talking battery to the line through its windings. Relay 1801 is a slow release relay and holds over the interval between the release and reoperation of relay 1805 above described. If the called subscriber at station "B" answers before the tenth ringing interval has occurred, the release of relay 1807 will remove the anode potentials from cold cathode stepping tube GSTP, and this tube will be returned to normal.

When the calling and called subscribers on line 301 have completed the call and replaced their receivers, relay 1805 will release and in turn release relay 1801 and the reverting call trunk of Fig. 18 will be restored to normal.

What is claimed is:

1. In a telephone system, a plurality of subscriber lines including a party line having a plurality of stations connected thereto, said stations adapted to originate and receive calls, said lines characterized by class codes representing the class of service for which the subscribers connected thereto have contracted, said party line being characterized by a party line class code of said class codes, selective signaling means at each of said stations adapted to transmit on said party line a different distinctive signal, a class code register representing the class code of said party line and operable in response to a call originated from any of said stations over said party line, energizing means responsive to the operation of said class code register for energizing the selective signaling means at a calling one of said stations, means including the selective signaling means at said calling one of said stations when energized by said energizing means for applying to said party line the different distinctive signal of said calling one of said stations and means for detecting said different distinctive signal of said calling one of said stations on said party line to identify said calling one of said stations.

2. In a telephone system, a plurality of subscriber lines including party lines having a plurality of party stations connected thereto, said party stations adapted to originate and receive calls, said lines characterized by class codes representing the class of service for which the subscribers connected thereto have contracted, said party lines being characterized by a party line class code of said class codes, selective signaling control means at each of said party stations, each of said selective signaling control means at said party stations on one of said party lines adapted to be energized by a different energizing signal, a plurality of class code registers including a party line class code register, each of said code registers representing one of the said class codes of said lines and each of said code registers operable in response to a call originated over any one of said lines which is characterized by the class code it represents, energizing means responsive to the operation of said party line class code register when a call is originated from a calling one of said party stations over one of said party lines for applying to said one party line the energizing signal of said calling one of said party stations, means including said selective signaling control means at said calling one of said party stations when energized by said energizing means for applying to said one party line a distinctive identifying signal, detecting means for detecting said distinctive identifying signal on said one party line to identify said calling one of said party stations and further means responsive to said detecting means for removing said distinctive identifying signal from said one party line after the identification of said calling one of said party stations has been completed.

3. A telephone system comprising a central office, a plurality of outlying stations connected with said office by means of subscriber lines, certain of said subscriber lines being party lines each having a plurality of party stations connected thereto, all of said stations being adapted to originate and receive calls, said subscriber lines characterized by class codes representing the class of service for which the subscribers connected thereto have contracted, said party lines being characterized by a party line class code of said class codes, a vibratory element at each of said party stations, each of said vibratory elements at said party stations on the same party line being tuned to vibrate at a different frequency, a plurality of class code registers in said central office including a party line class code register, each of said class code registers representing one of the said class codes of said lines and each of said class code registers operable in response to a call originated over any one of said lines which is characterized by the class code it represents, energizing means at said central office responsive to the operation of said party line class code register when a call is originated from one of said party stations over one of said party lines to cause the vibratory element at the calling one of said party stations to vibrate at its tuned frequency, means at said calling one of said party stations when the vibratory element thereat is set into vibration by said energizing means for applying to said one party line a distinctive identifying signal the frequency of which is peculiar to the said calling one of said party stations, detecting means at said central office for detecting said distinctive identifying signal on said one party line and identifying said calling one of said party stations and further means at said central office responsive to said detecting means for halting the vibration of the vibratory element at the said calling one of said party stations after said calling one of said party stations has been identified to remove said distinctive identification signal from said one party line.

4. In a telephone system, a central office, a plurality of subscriber lines connected to said central office, certain of said lines being common party lines, each of said common party lines having a plurality of party stations connected thereto, said stations being adapted to originate and receive calls, said subscriber lines characterized by class codes representing the class of service for which the subscribers connected thereto have contracted, said common party lines being characterized by a party line class code of said class codes, each of said party stations being equipped with a tuned reed selector, each of said tuned reed selectors at said party stations on the same common party line being tuned to vibrate at a distinctive frequency peculiar to the party station at which it is located and differing from the distinctive frequencies peculiar to all other party stations on the said same common party line, a plurality of class code registers in said central office including a party line class code register, each of said class code registers representing one of the said class codes of said lines and each of said class code registers operable in response to a call originated over any one of said lines which is characterized by the class code it represents, signaling means in said central office responsive to the operation of said party line class code register when a call is originated from one of said party stations over one of said common party lines to transmit over said one common party line signals of all the distinctive frequencies peculiar to all of the party stations connected thereto to cause the reed type selectors at all of said party stations on said one common party line to vibrate at their distinctive frequencies, means in said central office for removing said signals of all the distinctive frequencies from said one common party line after a predetermined interval, means at said calling one of said party stations including the tuned reed selector thereat when set in vibration by said signaling means for applying to said one common party line a distinctive identifying signal the frequency of which is peculiar to said calling one of said party stations, detecting means at said central office for detecting said distinctive identifying signal on said one common party line to identify said calling one of said party stations and further means in said central office for halting the vibration of the tuned reed selector at said calling one of said party stations to remove said distinctive identifying signal from said one common party line.

5. In a telephone switching system of the crossbar type, a central office, a plurality of subscriber lines connected to said central office, certain of said lines being party lines each having a plurality of party stations connected thereto, said stations being adapted to originate and receive calls, said subscriber lines characterized by class codes representing the class of service for which the subscribers connected thereto have contracted, said party lines being characterized by a party line class code of said class codes, each of said party stations being equipped with a tuned reed selector, each of said tuned reed selectors at said party stations on the same party line being tuned to vibrate at a distinctive frequency peculiar to the party station at which it is located and differing from the distinctive frequencies peculiar to all other party stations on the said same party line, a marker in said central office, said marker having a plurality of class code registers including a party line class code register, each of said class code registers in said marker representing one of the said class codes of said lines and each of said class code registers operable when said marker is connected to a calling one of said lines which is characterized by the class code it represents, means in said central office under control of a calling one of said party stations to connect said marker with the calling party line serving said calling one of said party stations and to operative in said marker the party line class code register, an originating register in said central office, a party station indentifier in said central office, a multifrequency signal generating means in said central office adapted to generate the distinctive frequency signals of all party stations connected to a party line, means in said central office responsive to the operation of said party line class code register in said marker for connecting said multifrequency signal generating means to the calling party line serving said calling one of said party stations to transmit over said calling party line the distinctive frequency signals peculiar to all of the party stations connected thereto, switching means in said central office for disconnecting said calling party line serving said calling one of said party stations from said multifrequency signal generating means after a predetermined interval and connecting said calling party line to said party station identifier, means at said calling one of said party stations including the tuned reed selector thereat when set in vibration by the distinctive frequency signal peculiar thereto received over said calling party line from said multifrequency signal generating means for converting the selector thereat into an oscillator and to apply back on said calling party line from said oscillator at said calling one of said party stations a distinctive identifying signal of the frequency peculiar to said calling one of said party stations, means in said party station identifier for detecting the distinctive identifying signal peculiar to said calling of said party stations received over said calling party line and registering the identity of said calling one of said party stations in registers of said originating register circuit and means in said party station identifier responsive to the detection of said distinctive identifying signal peculiar to said calling one of said party stations for halting further osscillation of the tuned reed selector in said calling one of said party stations.

6. A telephone subscriber station subset comprising, a transmitter, a receiver, a ringer, a set of switchhook contacts, selective means adapted to be energized by a distinctive signal peculiar to the subscriber's station at which said subset is located, means controlled by said selective means when energized for completing a low impedance circuit for the operation of said ringer, means including said selective means when energized and controlled by said set of switchhook contacts for generating an identifying signal peculiar to the subscriber's station at which said subset is located and means controlled by said set of switchhook contacts for offering a high impedance to ringing current and a low impedance to talking current through said transmitter and said receiver.

7. A telephone subscriber station subset comprising, a transmitter, a receiver, a ringer, a set of switchhook contacts, a reed type selector adapted to be energized by a distinctive signal peculiar to the subscriber's station at which said subset is located, means controlled by said reed type selector when energized by said distinctive signal for completing a low impedance circuit for the operation of said ringer, means including said reed type selector when energized by said distinctive signal for generating an identifying signal peculiar to the subscriber's station at which said subset is located and rectifying means in series with said transmitter and said receiver for offering a high impedance to ringing current and low impedance to talking current when said set of switchhook contacts are closed.

8. A telephone subscriber station subset comprising, a transmitter, a receiver, a ringer, a set of switchhook contacts, a vibratory element tuned to vibrate at a distinctive frequency peculiar to the subscriber's station at which said subset is located, a coil positioned with respect to said vibratory element so as to cause said element to vibrate at said distinctive frequency when a signal of said distinctive frequency is impressed upon said coil, vibratile contacts operable to close when said vibratory element vibrates at said distinctive frequency, a gaseous discharge device comprising a cathode, an anode and a control electrode, means controlled by the closure of said vibratile contacts for applying a potential to said control electrode to cause a discharge to be initiated between said cathode and said anode in said discharge device, means responsive to a discharge in said discharge device for completing a low impedance circuit for the operation of said ringer, means controlled by said set of switchhook contacts to close a circuit for sustaining the vibration of said vibratory element after said signal of said distinctive frequency is removed from said coil, means controlled by said vibratory element when sustained in vibration for generating an identifying signal the frequency of which is peculiar to the subscriber's station at which said subset is located and a varistor in series with said transmitter and said receiver poled to present a high impedance to current of one polarity and a low impedance to current of opposite polarity when said set of switchhook contacts are closed.

9. In a telephone system, a plurality of stations on a common party line, said stations adapted to originate and receive calls, control means at each of said stations adapted to be energized by a different energizing signal, a responder operated by a calling signal from one of said stations for applying to said line the energizing signal of the called one of said stations, a signal applier at said called one of said stations controlled by the control means thereat when energized for applying to said line a distinctive identifying signal, and a signal disconnector operated by said distinctive identifying signal for removing the energizing signal of said called one of said stations from said line.

10. In a telephone system, a plurality of stations on a common party line, each of said stations adapted to originate and receive calls, selective control means at each of said stations, each of said selective control means adapted to be energized by a distinctive signal peculiar to the station at which it is located, means responsive to a signal from a calling one of said stations for applying to said line the called station distinctive signal peculiar to the called one of said stations, means at said called one of said stations controlled by the selective control means thereat when energized by the called station distinctive signal on said line for applying back on said line a distinctive identifying signal peculiar to the called one of said stations and means responsive to said distinctive identifying signal on said line from said called one of said stations for removing said called station distinctive signal from said line.

11. In a telephone system, a plurality of stations on a common party line, each of said stations adapted to originate and receive calls, a vibratory element at each of said stations, each of said vibratory elements being turned to vibrate at a different frequency, means responsive to a calling signal from a calling one of said stations for applying to said line an energizing signal of the frequency to which the vibratory element at the called one of said stations is tuned to cause the vibratory element thereat to vibrate, means at said called one of said stations controlled by the vibratory element thereat when vibrating for operating the ringer at said called one of said stations, further means at said called one of said stations controlled by the vibratory element thereat when vibrating for applying back on said line a distinctive identifying signal and means responsive to said identifying signal for removing said energizing signal from said line.

12. In a telephone system, a plurality of subscriber lines including party lines having a plurality of party stations connected thereto, each of said party stations being equipped with a tuned reed selector, each of said tuned reed selectors at said party stations on the same party line adapted to be energized by a different energizing signal, means responsive to a signal from a calling one of said party stations on one of said party lines for applying to the called one of said party lines the energizing signal of the called one of said party stations, means at said called one of said party stations controlled by the tuned reed selector thereat when energized for operating the ringer at said called one of said party stations, further means at said called one of said party stations controlled by the tuned reed selector thereat when energized for applying back on said called one of said party lines a distinctive identifying signal and means responsive to said distinctive identifying signal on said called one of said party lines for removing said energizing signal of said called one of said party stations from said called one of said party lines.

13. In a telephone system, a central office, a plurality of subscriber lines connected to said central office, certain of said lines being common party lines, each of said common party lines having a plurality of party stations, each of said party stations being equipped with a tuned reed selector, each of said tuned reed selectors at said party stations on the same common party line being tuned to vibrate at a distinctive frequency peculiar to the party station at which it is located and differing from the distinctive frequencies peculiar to all other party stations on the said same common party line, an intraoffice trunk in said office, means in said office responsive to a calling signal from one of said stations on a calling one of said party lines when originating a call to another of said stations on a called one of said party lines for connecting the calling party line and the called party line to said intraoffice trunk, a ringing signal generator in said office, a plurality of distinctive signal generators in said office the frequency of each corresponding to the frequency peculiar to a different one of said party stations on said common party line, means in said office for superimposing the distinctive signal peculiar to the called party station from a selected one of said distinctive signal generators on the ringing signal from said ringing signal generator and transmitting the combined signal to said intraoffice trunk, an interrupter in said office, means in said intraoffice trunk controlled by said interrupter for repeatedly applying said combined signal to said called party line for a specific ringing interval and removing said combined signal from said called party line for a specific silent interval, means at said called party station on said called party line controlled by the tuned reed selector thereat when energized by the distinctive signal component of said combined signal applied on said called party line during said ringing interval for applying the ringing signal component of said combined signal on said called party line to the ringer at said called party station to operate said ringer, means at said called party station including the tuned reed selector thereat when energized by the distinctive signal component of said combined signal for generating locally during a silent interval of said combined signal a distinctive identifying signal of the frequency peculiar to said called party station when the subscriber at said called party station answers the call, means including said called party line for transmitting said distinctive identifying signal generated at said called party station to said intraoffice trunk and means in said intraoffice trunk responsive to said distinctive identifying signal from said called party station for removing said combined signal from said called party line and for applying battery to said called party line.

14. In a telephone system, a central office, a plurality of party stations connected to a common party line of said office, each of said stations adapted to originate and receive calls, each of said stations being equipped with a selective control means, each of said selective control means adapted to be energized by a distinctive signal the frequency of which is peculiar to the station at which it is installed, a reverting call trunk in said office, means in said office responsive to a calling signal from one of said stations when originating a call to another of said stations for connecting said common party line to said trunk, a ringing signal generator in said office, a plurality of distinctive signal generators in said office the frequency of each corresponding to the frequency peculiar to a different one of said stations, means in said office for superimposing the distinctive signal peculiar to the called station from a selected one of said distinctive signal generators on the ringing signal from said ringing signal generator and transmitting the combined signal to said trunk, an interrupter in said office, means in said office controlled by said interrupter for applying said combined signal to said party line for a specific ringing interval and removing said combined signal from said party line for a specific silent interval, means at said called station controlled by the selective control means thereat when energized by the distinctive signal component of said combined signal applied on said line during said ringing interval for applying the ringing signal component of said combined signal on said line to the ringer at said called station, means at the calling station on said party line for preventing the transmitter and receiver elements of said calling station from shunting said combined signal applied on said party line during said ringing interval, means at said called station including the selective control means thereat when energized for generating locally during a silent interval of said combined signal a distinctive identifying signal of the frequency peculiar to said called station when the subscriber at said called station answers the call originated at said calling station, means including said line for transmitting said distinctive identifying signal generated at said called station to said trunk, means in said trunk responsive to said distinctive identifying signal from said called station for removing said combined signal from said line and for applying battery to said line.

15. In a telephone system having a plurality of lines and switching means for interconnecting any two of said lines, a signaling means for applying a ringing signal to a called one of said lines, timing means for removing said ringing signal from said called one of said lines after a predetermined interval and further means controlled by said timing means for applying a tone signal to the calling one of said lines to indicate to the calling subscriber on said calling one of said lines that the called subscriber does not answer.

16. In a telephone system having a plurality of lines including a party line having a plurality of party stations thereon, a signaling means for applying a ringing signal to said party line for signaling a called one of said party stations, means controlled by said called one of said party stations for removing said ringing signal from said line when said called one of said party stations answers the call, timing means for removing said ringing signal from said party line after a predetermined interval if said called one of said stations fails to answer the call and further means controlled by said timing means for applying a tone signal to said line to indicate to the calling party station on said line that the called one of said party stations does not answer.

17. In a telephone system, a plurality of stations on a common party line, each of said stations adapted to originate and receive calls, each of said stations comprising a set of switchhook contacts, a ringer and a selective control means, each of said selective control means adapted to be energized by a different energizing signal, a signaling means for applying to said line a combined signal comprising the energizing signal of a called one of said stations superimposed upon a ringing signal, means at said called one of said stations controlled by the selective control means thereat when energized by the energizing signal component of said combined signal on said line for applying the ringing signal component of said combined signal on said line to the ringer in said called one of said stations to operate said ringer, means at said called one of said stations including the selective control means thereat when energized and controlled by the operation of the set of switchhook contacts thereat when the called subscriber at said called one of said stations answers the call for applying to said line a distinctive identifying signal, means responsive to said distinctive identifying signal on said line for disconnecting said signaling means from said line to remove said combined signal therefrom, timing means for disconnecting said signaling means from said line after a predetermined interval if the called subscriber at said called one of said stations fails to answer the call and further means controlled by said timing means for applying to said line a tone signal to indicate to the calling subscriber at the calling one of said stations that the subscriber at the called one of said stations does not answer.

18. In a call data recording telephone system, a frame, a plurality of subscriber lines connected to said frame, each of said subscriber lines having a different terminal designation on said frame individual to each of said lines, certain of said lines being party lines, each of said party lines having a plurality of party stations thereon, each of said party stations on the same party line having an identification designation individual to each of said party stations, a first means responsive to calls originated from said party stations for registering the terminal designation of the party line serving the calling one of said party stations, further means responsive to calls originated from said party stations for identifying the calling one of said party stations, registering means controlled by said further means for registering the identification designation of the calling one of said party stations, an inductive translator for translating the terminal designations of said lines and the identification designations of said party stations into directory designations of said party stations, a second means jointly controlled by said first means and said registering means for actuating said translator to cause said translator to translate the identification designation individual to a calling one of said party stations and the terminal designation individual to the party line serving said calling one of said party stations into the directory designation of said calling one of said party stations and means controlled by said translator for recording the translated directory designation of calling party stations.

19. In a call data recording telephone system, a frame, a plurality of subscriber stations connected with said frame by means of metallic lines, each of said subscriber stations having an individual directory designation, certain of said subscriber stations being party stations on common party lines and others of said subscriber stations being individual stations on individual lines, each of said lines having an individual different terminal designation on said frame, each of said party stations on the same common party line further having a different party identification designation, a first means responsive to a call originated from a calling subscriber station for registering the terminal designation of the line serving said calling subscriber station, a second means responsive to a call originated from a calling subscriber station for determining whether the line serving said calling subscriber station is a party line or an individual line, a third means controlled by said second means when a call is originated from a calling one of said party stations over one of said common party lines for identifying said calling one of said party stations, registering means controlled by said third means for registering the party identification designation of said calling one of said party stations, an inductive translator controlled by said first means for translating the terminal designation of individual lines serving calling individual stations into directory designations, means for further controlling said inductive translator jointly by said first means and said registering means for translating the party identification of calling party stations and the terminal designation of common party lines serving calling party stations into directory designations, and means controlled by said translator for recording the translated directory designations of calling subscribers' stations.

20. A device in a call data recording telephone system for translating the equipment terminal designations of individual lines of said telephone system into given directory designations and for translating the party identification designations of party stations and the equipment terminal designations of party lines serving said party stations in said telephone system into given directory designations which comprises a plurality of coils, a conductor for each station of said telephone system selectively threaded through the cores of said coils in accordance with the given directory designations of each of said stations, a first means responsive to calls originated from calling stations for registering the equipment terminal designation of the line serving the calling one of said stations, a second means controlled by said first means when operated in response to a call originated over one of said individual lines for selectively energizing the one conductor individual to the station served by said one of said individual lines, thereby to induce a potential in each of the coils through the core of which said one conductor is threaded, a third means responsive to calls originated from calling party stations over said party lines for identifying the calling party station originating the call, a fourth means controlled by a said third means for registering the party identification designation of said party station originating the call, a fifth means jointly controlled by said first means when operated in response to a call originated over one of said party lines and said fourth means when operated in response to a call originated from one of said party stations for selectively energizing the one conductor individual to said one of said party stations, thereby to induce a potential in each of the coils through the core of which said last-named one conductor is threaded and means responsive to the induced potentials in said coils for indicating the directory designation of calling stations.

References Cited in the file of this patent

UNITED STATES PATENTS

| | | |
|---|---|---|
| 1,852,647 | Gooderham | Apr. 5, 1932 |
| 2,281,508 | Lundstrom | Apr. 28, 1942 |
| 2,283,610 | Mohr | May 19, 1942 |
| 2,410,520 | Ostline | Nov. 5, 1946 |
| 2,532,125 | Singer | Nov. 28, 1950 |
| 2,580,095 | Holden | Dec. 25, 1951 |
| 2,589,800 | Goodale, Jr., et al. | Mar. 18, 1952 |
| 2,599,097 | Entz et al. | June 3, 1952 |
| 2,604,545 | Inglis et al. | July 22, 1952 |
| 2,614,176 | Dimond | Oct. 14, 1952 |
| 2,672,515 | Barlow | Mar. 16, 1954 |